United States Patent
Wan et al.

(10) Patent No.: US 10,254,948 B2
(45) Date of Patent: Apr. 9, 2019

(54) REDUCED-SIZE USER INTERFACES FOR DYNAMICALLY UPDATED APPLICATION OVERVIEWS

(71) Applicant: Apple Inc., Cupertino, CA (US)

(72) Inventors: Wan Si Wan, Sunnyvale, CA (US); Gary Ian Butcher, San Jose, CA (US); Imran Chaudhri, San Francisco, CA (US); Alan C. Dye, San Francisco, CA (US); Craig M. Federighi, Los Altos Hills, CA (US); Christopher Patrick Foss, San Francisco, CA (US); Jonathan P. Ive, San Francisco, CA (US); Stephen O. Lemay, Palo Alto, CA (US); Kevin Lynch, Woodside, CA (US); Natalia Maric, San Francisco, CA (US); Gregory Novick, Santa Clara, CA (US); Jeff Williams, Pleasanton, CA (US); Christopher Wilson, San Francisco, CA (US); Lawrence Y. Yang, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/822,769

(22) Filed: Aug. 10, 2015

(65) Prior Publication Data

US 2016/0062589 A1    Mar. 3, 2016

Related U.S. Application Data

(60) Provisional application No. 62/129,801, filed on Mar. 7, 2015, provisional application No. 62/044,993, filed on Sep. 2, 2014.

(51) Int. Cl.
*G06F 3/0488* (2013.01)
*G06F 3/0481* (2013.01)
(Continued)

(52) U.S. Cl.
CPC ......... *G06F 3/0488* (2013.01); *G06F 3/0416* (2013.01); *G06F 3/0483* (2013.01);
(Continued)

(58) Field of Classification Search
CPC .................... G06F 3/0488; G06F 3/04817
(Continued)

(56) References Cited

U.S. PATENT DOCUMENTS 5,208,790 A    5/1993  Sato
5,455,808 A    10/1995 Grupp et al.
(Continued)

FOREIGN PATENT DOCUMENTS

AU    2010249319 A1    6/2012
AU    2015101019 A4    9/2015
(Continued)

OTHER PUBLICATIONS

Non Final Office Action received for U.S. Appl. No. 14/503,072, dated Jan. 26, 2015, 12 pages.
(Continued)

*Primary Examiner* — Roland J Casillas
(74) *Attorney, Agent, or Firm* — Dentons US LLP

(57) ABSTRACT

An electronic device with a touch-sensitive display can detect a contact with the display, and in response to detecting the contact, the device can display a user interface screen representing a corresponding application. The user interface screen can include an affordance for launching the application, and a set of information obtained from the application, where the set of information is updated in accordance with data from the application.

42 Claims, 37 Drawing Sheets

(51) Int. Cl.
*G06F 9/451* (2018.01)
*G06F 3/0483* (2013.01)
*G06F 9/44* (2018.01)
*G06F 3/041* (2006.01)

(52) U.S. Cl.
CPC ........ *G06F 3/04817* (2013.01); *G06F 9/4443* (2013.01); *G06F 9/451* (2018.02); *G06F 2203/04105* (2013.01)

(58) Field of Classification Search
USPC .......................................................... 715/835
See application file for complete search history.

(56) References Cited

U.S. PATENT DOCUMENTS

| | | |
|---|---|---|
| 5,508,979 A | 4/1996 | Eisenegger |
| 5,659,693 A | 8/1997 | Hansen et al. |
| 5,825,353 A | 10/1998 | Will |
| 5,845,257 A | 12/1998 | Fu et al. |
| 5,892,519 A | 4/1999 | Hirai |
| 5,986,655 A | 11/1999 | Chiu et al. |
| 5,999,195 A | 12/1999 | Santangeli |
| 6,266,098 B1 | 7/2001 | Cove et al. |
| 6,279,018 B1 | 8/2001 | Kudrolli et al. |
| 6,323,846 B1 | 11/2001 | Westerman et al. |
| 6,359,839 B1 | 3/2002 | Schenk et al. |
| 6,441,824 B2 | 8/2002 | Hertzfeld |
| 6,449,219 B1 | 9/2002 | Hepp et al. |
| 6,452,597 B1 | 9/2002 | Goldberg et al. |
| 6,477,117 B1 | 11/2002 | Narayanaswami et al. |
| 6,496,780 B1 | 12/2002 | Harris et al. |
| 6,556,222 B1 | 4/2003 | Narayanaswami |
| 6,570,557 B1 | 5/2003 | Westerman et al. |
| 6,661,438 B1 | 12/2003 | Shiraishi et al. |
| 6,662,023 B1 | 12/2003 | Helle |
| 6,677,932 B1 | 1/2004 | Westerman |
| 6,728,533 B2 | 4/2004 | Ishii |
| 6,809,724 B1 | 10/2004 | Shiraishi et al. |
| 6,871,076 B2 | 3/2005 | Samn |
| 7,081,905 B1 | 7/2006 | Raghunath |
| 7,130,664 B1 | 10/2006 | Williams |
| 7,203,380 B2 | 4/2007 | Chiu et al. |
| 7,257,254 B2 | 8/2007 | Tunney |
| 7,479,949 B2 | 1/2009 | Jobs et al. |
| 7,515,509 B2 | 4/2009 | Klein |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,751,285 B1 | 7/2010 | Cain |
| 7,843,769 B2 | 11/2010 | Ishida et al. |
| 7,844,914 B2 | 11/2010 | Andre et al. |
| 7,898,542 B1 | 3/2011 | Yu et al. |
| 7,957,762 B2 | 6/2011 | Herz et al. |
| 8,006,002 B2 | 8/2011 | Kalayjian et al. |
| 8,050,997 B1 | 11/2011 | Nosek et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,462,997 B2 | 6/2013 | Pettit et al. |
| 8,479,122 B2 | 7/2013 | Hotelling et al. |
| 8,543,081 B2 | 9/2013 | Scott et al. |
| 8,584,031 B2 | 11/2013 | Moore et al. |
| 8,595,649 B2 | 11/2013 | Sherrard et al. |
| 8,666,361 B2 | 3/2014 | Chu et al. |
| 8,675,084 B2 | 3/2014 | Bolton et al. |
| 8,732,609 B1 | 5/2014 | Bayersdorfer et al. |
| 8,884,874 B1* | 11/2014 | Kim .................. G06F 3/017 345/156 |
| 8,963,894 B2 | 2/2015 | Klassen et al. |
| 8,996,639 B1 | 3/2015 | Faaborg et al. |
| 9,070,092 B2 | 6/2015 | Chou et al. |
| 9,173,052 B2 | 10/2015 | Hauser et al. |
| 9,244,562 B1 | 1/2016 | Rosenberg et al. |
| 9,459,781 B2 | 10/2016 | Wilson et al. |
| 9,547,425 B2 | 1/2017 | Wilson et al. |
| 2002/0015024 A1 | 2/2002 | Westerman et al. |
| 2002/0054066 A1 | 5/2002 | Kikinis et al. |
| 2002/0054541 A1 | 5/2002 | Hall |
| 2002/0131331 A1 | 9/2002 | Molander |
| 2003/0002391 A1 | 1/2003 | Biggs |
| 2003/0027621 A1 | 2/2003 | Libby et al. |
| 2003/0067497 A1 | 4/2003 | Pichon |
| 2003/0074647 A1 | 4/2003 | Andrew |
| 2003/0164847 A1 | 9/2003 | Zaima et al. |
| 2003/0214885 A1 | 11/2003 | Powell et al. |
| 2004/0001105 A1 | 1/2004 | Chew et al. |
| 2004/0021699 A1 | 2/2004 | Fildebrandt |
| 2004/0168107 A1 | 8/2004 | Sharp et al. |
| 2004/0192332 A1 | 9/2004 | Samn |
| 2004/0218472 A1 | 11/2004 | Narayanaswami et al. |
| 2005/0041667 A1 | 2/2005 | Miller et al. |
| 2005/0094492 A1 | 5/2005 | Rosevear |
| 2005/0125744 A1 | 6/2005 | Hubbard et al. |
| 2005/0187873 A1 | 8/2005 | Labrou et al. |
| 2005/0190059 A1 | 9/2005 | Wehrenberg |
| 2005/0191159 A1 | 9/2005 | Benko |
| 2005/0200611 A1 | 9/2005 | Goto et al. |
| 2005/0278757 A1 | 12/2005 | Grossman et al. |
| 2006/0017692 A1 | 1/2006 | Wehrenberg et al. |
| 2006/0026536 A1 | 2/2006 | Hotelling et al. |
| 2006/0033724 A1 | 2/2006 | Chaudhri et al. |
| 2006/0035628 A1 | 2/2006 | Miller et al. |
| 2006/0035632 A1 | 2/2006 | Sorvari et al. |
| 2006/0055700 A1 | 3/2006 | Niles et al. |
| 2006/0085765 A1 | 4/2006 | Peterson et al. |
| 2006/0197753 A1 | 9/2006 | Hotelling |
| 2006/0214935 A1 | 9/2006 | Boyd et al. |
| 2006/0294025 A1 | 12/2006 | Mengerink |
| 2007/0006096 A1 | 1/2007 | Kim et al. |
| 2007/0082707 A1 | 4/2007 | Flynt et al. |
| 2007/0094330 A1 | 4/2007 | Russell |
| 2007/0101279 A1 | 5/2007 | Chaudhri et al. |
| 2007/0135043 A1 | 6/2007 | Hayes et al. |
| 2007/0162872 A1 | 7/2007 | Hong et al. |
| 2007/0236475 A1 | 10/2007 | Wherry |
| 2007/0239754 A1 | 10/2007 | Schnitman |
| 2007/0279190 A1 | 12/2007 | Lugt et al. |
| 2008/0046839 A1 | 2/2008 | Mehra et al. |
| 2008/0082930 A1 | 4/2008 | Omernick et al. |
| 2008/0127268 A1 | 5/2008 | Bergeron et al. |
| 2008/0155428 A1 | 6/2008 | Lee |
| 2008/0168396 A1 | 7/2008 | Matas et al. |
| 2008/0192021 A1 | 8/2008 | Lim et al. |
| 2008/0215240 A1 | 9/2008 | Howard et al. |
| 2008/0246778 A1 | 10/2008 | Ham et al. |
| 2008/0320391 A1 | 12/2008 | Lemay et al. |
| 2009/0036165 A1 | 2/2009 | Brede |
| 2009/0059730 A1 | 3/2009 | Lyons et al. |
| 2009/0100342 A1 | 4/2009 | Jakobson |
| 2009/0164923 A1 | 6/2009 | Ovi |
| 2009/0178007 A1 | 7/2009 | Matas et al. |
| 2009/0199130 A1 | 8/2009 | Tsern et al. |
| 2009/0205041 A1 | 8/2009 | Michalske |
| 2009/0231356 A1 | 9/2009 | Barnes et al. |
| 2009/0249247 A1 | 10/2009 | Tseng et al. |
| 2009/0254624 A1 | 10/2009 | Baudin et al. |
| 2009/0287470 A1 | 11/2009 | Farnsworth et al. |
| 2009/0300146 A1 | 12/2009 | Park et al. |
| 2009/0305732 A1 | 12/2009 | Marcellino et al. |
| 2009/0319467 A1 | 12/2009 | Berg et al. |
| 2009/0327886 A1 | 12/2009 | Whytock et al. |
| 2010/0026640 A1 | 2/2010 | Kim et al. |
| 2010/0064255 A1 | 3/2010 | Rottler et al. |
| 2010/0082481 A1 | 4/2010 | Lin et al. |
| 2010/0110082 A1 | 5/2010 | Myrick et al. |
| 2010/0123724 A1 | 5/2010 | Moore et al. |
| 2010/0141606 A1 | 6/2010 | Bae et al. |
| 2010/0156833 A1 | 6/2010 | Kim et al. |
| 2010/0157742 A1 | 6/2010 | Relyea et al. |
| 2010/0217657 A1 | 8/2010 | Gazdzinski |
| 2010/0223145 A1 | 9/2010 | Dragt |

(56) References Cited

U.S. PATENT DOCUMENTS

| | | |
|---|---|---|
| 2010/0226213 A1 | 9/2010 | Drugge |
| 2010/0235726 A1 | 9/2010 | Ording et al. |
| 2010/0243516 A1 | 9/2010 | Martin et al. |
| 2010/0251176 A1 | 9/2010 | Fong et al. |
| 2010/0267362 A1 | 10/2010 | Smith et al. |
| 2010/0281374 A1 | 11/2010 | Schulz et al. |
| 2010/0295789 A1* | 11/2010 | Shin .................. G06F 1/1626 345/168 |
| 2011/0016425 A1 | 1/2011 | Homburg et al. |
| 2011/0018695 A1 | 1/2011 | Bells et al. |
| 2011/0022472 A1 | 1/2011 | Zon et al. |
| 2011/0025719 A1 | 2/2011 | Yanase |
| 2011/0029870 A1 | 2/2011 | May et al. |
| 2011/0078624 A1 | 3/2011 | Missig et al. |
| 2011/0083111 A1 | 4/2011 | Forutanpour et al. |
| 2011/0088086 A1 | 4/2011 | Swink et al. |
| 2011/0138329 A1 | 6/2011 | Wells et al. |
| 2011/0151415 A1 | 6/2011 | Darling |
| 2011/0157046 A1 | 6/2011 | Lee et al. |
| 2011/0179372 A1 | 7/2011 | Moore et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202883 A1 | 8/2011 | Oh et al. |
| 2011/0205851 A1 | 8/2011 | Harris |
| 2011/0251892 A1 | 10/2011 | Laracey et al. |
| 2011/0265002 A1 | 10/2011 | Hong et al. |
| 2011/0296324 A1 | 12/2011 | Goossens et al. |
| 2011/0316858 A1 | 12/2011 | Shen et al. |
| 2011/0320938 A1 | 12/2011 | Schorsch |
| 2012/0001922 A1 | 1/2012 | Escher et al. |
| 2012/0016678 A1 | 1/2012 | Gruber et al. |
| 2012/0026110 A1 | 2/2012 | Yamano |
| 2012/0028707 A1 | 2/2012 | Raitt et al. |
| 2012/0059787 A1 | 3/2012 | Brown et al. |
| 2012/0084729 A1 | 4/2012 | Lin |
| 2012/0089507 A1 | 4/2012 | Zhang et al. |
| 2012/0092383 A1 | 4/2012 | Hysek et al. |
| 2012/0110438 A1 | 5/2012 | Peraza et al. |
| 2012/0117507 A1 | 5/2012 | Tseng et al. |
| 2012/0124499 A1 | 5/2012 | Tsai |
| 2012/0154293 A1 | 6/2012 | Hinckley et al. |
| 2012/0159380 A1* | 6/2012 | Kocienda ............ G06F 3/04886 715/783 |
| 2012/0167008 A1* | 6/2012 | Zaman .................. G06F 3/048 715/814 |
| 2012/0197743 A1 | 8/2012 | Grigg et al. |
| 2012/0223935 A1 | 9/2012 | Renwick |
| 2012/0243735 A1 | 9/2012 | Wu |
| 2012/0254804 A1 | 10/2012 | Sheha et al. |
| 2012/0258684 A1 | 10/2012 | Franz et al. |
| 2012/0290449 A1 | 11/2012 | Mullen et al. |
| 2012/0304084 A1 | 11/2012 | Kim et al. |
| 2012/0310760 A1 | 12/2012 | Phillips et al. |
| 2012/0322370 A1 | 12/2012 | Lee |
| 2012/0322371 A1 | 12/2012 | Lee |
| 2012/0324390 A1 | 12/2012 | Tao |
| 2013/0014019 A1 | 1/2013 | Kim et al. |
| 2013/0024781 A1 | 1/2013 | Douillet et al. |
| 2013/0024802 A1 | 1/2013 | Zeng |
| 2013/0050263 A1 | 2/2013 | Khoe et al. |
| 2013/0055147 A1 | 2/2013 | Vasudev et al. |
| 2013/0057566 A1 | 3/2013 | Kriese et al. |
| 2013/0067391 A1 | 3/2013 | Pittappilly et al. |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0085931 A1 | 4/2013 | Runyan et al. |
| 2013/0097566 A1 | 4/2013 | Berglund |
| 2013/0103519 A1 | 4/2013 | Kountotsis et al. |
| 2013/0107674 A1 | 5/2013 | Gossweiler, III et al. |
| 2013/0110719 A1 | 5/2013 | Carter et al. |
| 2013/0116967 A1 | 5/2013 | Akcasu et al. |
| 2013/0117383 A1 | 5/2013 | Hymel |
| 2013/0141365 A1 | 6/2013 | Lynn et al. |
| 2013/0141371 A1 | 6/2013 | Hallford et al. |
| 2013/0143512 A1 | 6/2013 | Hernandez et al. |
| 2013/0169870 A1 | 7/2013 | Lee et al. |
| 2013/0191785 A1 | 7/2013 | Rampson et al. |
| 2013/0205194 A1 | 8/2013 | Decker et al. |
| 2013/0215044 A1 | 8/2013 | Ahn et al. |
| 2013/0225118 A1 | 8/2013 | Jang et al. |
| 2013/0234929 A1 | 9/2013 | Libin |
| 2013/0234969 A1 | 9/2013 | Yeh et al. |
| 2013/0244615 A1 | 9/2013 | Miller et al. |
| 2013/0254705 A1* | 9/2013 | Mooring ............... G06F 3/0488 715/784 |
| 2013/0263043 A1 | 10/2013 | Sarbin |
| 2013/0275875 A1 | 10/2013 | Gruber et al. |
| 2013/0295872 A1 | 11/2013 | Guday et al. |
| 2013/0304651 A1 | 11/2013 | Smith et al. |
| 2013/0326418 A1 | 12/2013 | Utsuki et al. |
| 2013/0332358 A1 | 12/2013 | Zhao et al. |
| 2013/0332364 A1 | 12/2013 | Templeton et al. |
| 2014/0013414 A1 | 1/2014 | Bruck |
| 2014/0022183 A1 | 1/2014 | Ayoub et al. |
| 2014/0028735 A1 | 1/2014 | Williams et al. |
| 2014/0055388 A1* | 2/2014 | Yook .................... G06F 3/0416 345/173 |
| 2014/0055495 A1 | 2/2014 | Kim et al. |
| 2014/0058935 A1 | 2/2014 | Mijares et al. |
| 2014/0059493 A1 | 2/2014 | Kim |
| 2014/0068751 A1 | 3/2014 | Last et al. |
| 2014/0074570 A1 | 3/2014 | Hope et al. |
| 2014/0074716 A1 | 3/2014 | Ni |
| 2014/0082533 A1 | 3/2014 | Kelley |
| 2014/0101056 A1 | 4/2014 | Wendling |
| 2014/0122331 A1 | 5/2014 | Vaish et al. |
| 2014/0123005 A1 | 5/2014 | Forstall et al. |
| 2014/0126336 A1 | 5/2014 | Goeller et al. |
| 2014/0129441 A1 | 5/2014 | Blanco et al. |
| 2014/0129959 A1 | 5/2014 | Battles et al. |
| 2014/0143145 A1 | 5/2014 | Kortina et al. |
| 2014/0143678 A1 | 5/2014 | Mistry et al. |
| 2014/0143682 A1 | 5/2014 | Druck |
| 2014/0143737 A1 | 5/2014 | Mistry et al. |
| 2014/0149878 A1 | 5/2014 | Mischari et al. |
| 2014/0155031 A1 | 6/2014 | Lee et al. |
| 2014/0157167 A1 | 6/2014 | Zhu |
| 2014/0157321 A1 | 6/2014 | Kurita |
| 2014/0164955 A1 | 6/2014 | Thiruvidam et al. |
| 2014/0173439 A1 | 6/2014 | Gutierrez et al. |
| 2014/0181219 A1 | 6/2014 | Wang et al. |
| 2014/0189577 A1 | 7/2014 | Shuttleworth et al. |
| 2014/0189584 A1* | 7/2014 | Weng ................... G06F 3/04883 715/808 |
| 2014/0195972 A1 | 7/2014 | Lee et al. |
| 2014/0229752 A1 | 8/2014 | Lee |
| 2014/0244165 A1 | 8/2014 | Bells |
| 2014/0245177 A1 | 8/2014 | Maklouf |
| 2014/0250374 A1 | 9/2014 | Ohki et al. |
| 2014/0250391 A1* | 9/2014 | Jong .................... G06F 3/0483 715/763 |
| 2014/0258935 A1 | 9/2014 | Nishida et al. |
| 2014/0267303 A1 | 9/2014 | Larkin et al. |
| 2014/0279442 A1 | 9/2014 | Luoma et al. |
| 2014/0279556 A1 | 9/2014 | Priebatsch et al. |
| 2014/0282103 A1 | 9/2014 | Crandall |
| 2014/0282254 A1 | 9/2014 | Feiereisen et al. |
| 2014/0289660 A1 | 9/2014 | Min |
| 2014/0304664 A1 | 10/2014 | Lee et al. |
| 2014/0310618 A1 | 10/2014 | Venkatesh |
| 2014/0325384 A1 | 10/2014 | Kobayashi |
| 2014/0325408 A1 | 10/2014 | Leppanen et al. |
| 2014/0337791 A1* | 11/2014 | Agnetta ................ G06F 3/0481 715/784 |
| 2014/0347289 A1* | 11/2014 | Suh ........................ G06F 3/017 345/173 |
| 2014/0380229 A1 | 12/2014 | Volodin et al. |
| 2015/0022438 A1 | 1/2015 | Hong |
| 2015/0100537 A1 | 4/2015 | Grieves et al. |
| 2015/0100621 A1 | 4/2015 | Pan |
| 2015/0106752 A1 | 4/2015 | Yang |
| 2015/0113468 A1 | 4/2015 | Clark |

(56) References Cited

U.S. PATENT DOCUMENTS

| | | |
|---|---|---|
| 2015/0117162 A1 | 4/2015 | Tsai |
| 2015/0143234 A1 | 5/2015 | Norris, III |
| 2015/0160806 A1 | 6/2015 | Fey et al. |
| 2015/0160856 A1 | 6/2015 | Jang et al. |
| 2015/0185703 A1 | 7/2015 | Tanaka |
| 2015/0195179 A1 | 7/2015 | Skare et al. |
| 2015/0301608 A1 | 10/2015 | Nagaraju et al. |
| 2015/0312175 A1 | 10/2015 | Langholz |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0048283 A1 | 2/2016 | Yang et al. |
| 2016/0098137 A1 | 4/2016 | Kim et al. |
| 2016/0117147 A1 | 4/2016 | Zambetti et al. |
| 2016/0193502 A1 | 7/2016 | Kim et al. |
| 2016/0259542 A1 | 9/2016 | Chaudhri et al. |
| 2016/0261675 A1 | 9/2016 | Block et al. |
| 2016/0358311 A1 | 12/2016 | Chen et al. |
| 2017/0010677 A1 | 1/2017 | Roh et al. |
| 2017/0068407 A1 | 3/2017 | Wilson et al. |
| 2017/0068439 A1 | 3/2017 | Mohseni |
| 2017/0123640 A1 | 5/2017 | Wilson et al. |
| 2017/0134321 A1 | 5/2017 | Ushio et al. |
| 2018/0081515 A1 | 3/2018 | Block et al. |

FOREIGN PATENT DOCUMENTS

| | | |
|---|---|---|
| CA | 2781636 A1 | 7/2010 |
| CA | 2792987 A1 | 10/2011 |
| CH | 707412 A2 | 6/2014 |
| CN | 1536511 A | 10/2004 |
| CN | 101098535 A | 1/2008 |
| CN | 101382438 A | 3/2009 |
| CN | 101627349 A | 1/2010 |
| CN | 101702112 A | 5/2010 |
| CN | 101819486 A | 9/2010 |
| CN | 101981987 A | 2/2011 |
| CN | 102687176 A | 9/2012 |
| CN | 102790826 A | 11/2012 |
| CN | 103399480 A | 11/2013 |
| CN | 103562832 A | 2/2014 |
| CN | 103607660 A | 2/2014 |
| CN | 103713843 A | 4/2014 |
| CN | 103902165 A | 7/2014 |
| CN | 205608658 U | 9/2016 |
| EP | 0831629 A2 | 3/1998 |
| EP | 1052566 A1 | 11/2000 |
| EP | 1659504 A2 | 5/2006 |
| EP | 1674889 A1 | 6/2006 |
| EP | 1674977 A2 | 6/2006 |
| EP | 1777611 A1 | 4/2007 |
| EP | 1832969 A2 | 9/2007 |
| EP | 2040146 A2 | 3/2009 |
| EP | 2194508 A1 | 6/2010 |
| EP | 2204702 A1 | 7/2010 |
| EP | 2302493 A2 | 3/2011 |
| EP | 2312512 A1 | 4/2011 |
| EP | 2413577 A1 | 2/2012 |
| EP | 2423810 A1 | 2/2012 |
| EP | 2437148 A2 | 4/2012 |
| EP | 2551784 A1 | 1/2013 |
| EP | 2602759 A2 | 6/2013 |
| EP | 2615607 A2 | 7/2013 |
| EP | 2653961 A1 | 10/2013 |
| EP | 2677775 A1 | 12/2013 |
| EP | 2720126 A1 | 4/2014 |
| EP | 2725537 A1 | 4/2014 |
| EP | 2733598 A2 | 5/2014 |
| EP | 2738640 A1 | 6/2014 |
| EP | 2821912 A1 | 1/2015 |
| GB | 2370208 A | 6/2002 |
| GB | 2475669 A | 6/2011 |
| JP | 55-80084 A | 6/1980 |
| JP | 8-110955 A | 4/1996 |
| JP | 2003-296246 A | 10/2003 |
| JP | 2004-519033 A | 6/2004 |
| JP | 2005-532607 A | 10/2005 |
| JP | 2005-339017 A | 12/2005 |
| JP | 2008-097202 A | 4/2008 |
| JP | 2009-147889 A | 7/2009 |
| JP | 2012123475 A | 6/2012 |
| JP | 2012-147432 A | 8/2012 |
| JP | 2014-216868 A | 11/2014 |
| KR | 20150001287 A | 1/2015 |
| TW | 498240 B | 8/2002 |
| TW | 200512616 A | 4/2005 |
| TW | 200850058 A | 12/2008 |
| TW | 201232486 A | 8/2012 |
| TW | M435665 U | 8/2012 |
| TW | 201419115 A | 5/2014 |
| WO | 99/66394 A1 | 12/1999 |
| WO | 99/66395 A2 | 12/1999 |
| WO | 01/71433 A1 | 9/2001 |
| WO | 02/054157 A1 | 7/2002 |
| WO | 2004/056107 A1 | 7/2004 |
| WO | 2006/037545 A2 | 4/2006 |
| WO | 2006/112641 A1 | 10/2006 |
| WO | 2007/018881 A2 | 2/2007 |
| WO | 2010/017627 A1 | 2/2010 |
| WO | 2010039337 A2 | 4/2010 |
| WO | 2011/130849 A8 | 5/2012 |
| WO | 2013023224 A2 | 2/2013 |
| WO | 2013/051048 A1 | 4/2013 |
| WO | 2013/169842 A2 | 11/2013 |
| WO | 2013/169849 A2 | 11/2013 |
| WO | 2013/169851 A2 | 11/2013 |
| WO | 2013/169870 A1 | 11/2013 |
| WO | 2013/169875 A2 | 11/2013 |
| WO | 2013/169877 A2 | 11/2013 |
| WO | 2013/169882 A2 | 11/2013 |
| WO | 2014/024000 A1 | 2/2014 |
| WO | 2014/078114 A1 | 5/2014 |
| WO | 2014/078965 A1 | 5/2014 |
| WO | 2014/105276 A1 | 7/2014 |
| WO | 2014/105279 A1 | 7/2014 |
| WO | 2016/036522 A2 | 3/2016 |

OTHER PUBLICATIONS

Non Final Office Action received for U.S. Appl. No. 14/503,296, dated Jan. 30, 2015, 16 pages.
Non-Final Office Action received for U.S. Appl. No. 14/503,372, dated Dec. 5, 2014, 11 pages.
Non-Final Office Action received for U.S. Appl. No. 14/503,381, dated May 13, 2015, 13 pages.
Non-Final Office Action received for U.S. Appl. No. 14/599,425, dated Mar. 17, 2015, 16 pages.
Office Action received for Australian Patent Application No. 2015100734, dated Jul. 29, 2015, 5 pages.
Kamijo, Noboru, "Next Generation Mobile System—WatchPad1. 5", Available at "http://researcher.ibm.com/researcher/view_group_subpage.php?id=5617", retrieved on Jul. 4, 2015, 2 pages.
Lemay et al., U.S Appl. No. 60/936,562, filed Jun. 20, 2007, titled "Portable Multifunction Device, Method, and Graphical User Interface for Playing Online Videos", 61 pages.
NDTV, "Sony SmartWatch 2 Launched in India for Rs. 14,990", available at "http://gadgets.ndtv.com/others/news/sony-smartwatch-2-launched-in-india-for-rs-14990-420319", Sep. 18, 2013, 4 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
Yang et al., U.S Appl. No. 62/004,886, filed May 29, 2014, titled "User Interface for Payments", 198 pages.

(56) References Cited

OTHER PUBLICATIONS

International Search Report and Written Opinion received for PCT Patent Application No. PCT/US2015/019321, dated Jun. 3, 2015, 11 pages.
Apple, "iPhone User's Guide", 2007, 137 pages.
Headset Button Controller v7.3 APK Full App Download for Andriod, Blackberry, iPhone, Jan. 27, 2014, 11 pages.
Colt, Sam, "Here's One Way Apple's Smartwatch Could Be Better Than Anything Else", Business Insider, Aug. 21, 2014, pp. 1-4.
International Search Report and Written Opinion received for PCT Patent Application No. PCT/US2015/019322, dated Jun. 18, 2015, 16 pages.
Final Office Action received for U.S. Appl. No. 14/503,296, dated Jul. 2, 2015, 7 pages.
Yang et al., "U.S Appl. No. 62/006,211, filed Jun. 1 2014, titled Displaying Options, Assigning Notification, Ignoring Messages, and Simultaneous User Interface Displays in a Messaging Application", 254 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/019298, dated Jul. 13, 2015, 17 pages.
Fuji Film, "Taking Pictures Remotely : Free iPhone/Android App Fuji Film Camera Remote", Available at <http://app.fujifilm-dsc.com/en/camera_remote/guide05.html>, Apr. 22, 2014, 3 pages.
Playmemories Camera Apps, "PlayMemories Camera Apps Help Guide", Available at <https://www.playmemoriescameraapps.com/portal/manual/IS9104-NPIA09014_00-F00002/en/index.html>, 2012, 3 pages.
Techsmith, "Snagit 11—Snagit 11.4 Help", Available at <http://assets.techsmith.com/Downloads/ua-tutorials-snagit-11/Snagit_11.pdf>, Jan. 2014, 146 pages.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Final Office Action received for U.S. Appl. No. 14/503,072, dated Sep. 1, 2015, 16 pages.
International Search Report and Written Opinion received for PCT Patent Application No. PCT/US2015/033380, dated Aug. 10, 2015, 13 pages.
Non Final Office Action received for U.S. Appl. No. 14/815,890, dated Oct. 19, 2015, 5 pages.
Non-Final Office Action received for U.S. Appl. No. 14/815,898, dated Dec. 1, 2015, 22 pages.
Non-Final Office Action received for U.S. Appl. No. 14/815,907, dated Jan. 12, 2016, 22 pages.
Non-Final Office Action received for U.S. Appl. No. 14/815,909, dated Nov. 27, 2015, 12 pages.
Office Action received for Australian Patent Application no. 2015101019, dated Oct. 14, 2015, 3 pages.
Office Action received for Australian Patent Application No. 2015101020, dated Oct. 26, 2015, 8 pages.
Office Action received for Australian Patent Application No. 2015101183, dated Nov. 6, 2015, 4 pages.
Office Action received for Chinese Patent Application No. 201520595384.6, dated Dec. 9, 2015, 4 pages. (2 pages of English Translation and 2 pages of Official Copy).
Office Action received for Chinese Patent Application No. 201520595385.0, dated Dec. 9, 2015, 4 pages (2 pages of English Translation and 2 pages of Official Copy).
Office Action received for Chinese Patent Application No. 201520595408.8, dated Dec. 9, 2015, 4 pages. (2 pages of English Translation and 2 pages of Official Copy).

Office Action received for Chinese Patent Application No. 201520595538.1, dated Dec. 9, 2015, 4 pages (2 pages of English Translation and 2 pages of Official Copy).
Office Action received for Chinese Patent Application No. 2015206791980, dated Nov. 18, 2015, 4 pages (2 pages English Translation and 2 pages Official copy).
Office Action received for Denmark Patent Application No. PA201570496, dated Oct. 29, 2015, 6 pages.
Office Action received for Denmark Patent Application No. PA201570497, dated Oct. 30, 2015, 6 pages.
Office Action received for Denmark Patent Application No. PA201570499, dated Nov. 3, 2015, 7 pages.
Office Action received for Denmark Patent Application No. PA201570498, dated Oct. 30, 2015, 7 pages.
International Search Report and Written Opinion received for PCT Patent Application No. PCT/US2015/034604, dated Nov. 9, 2015, 30 pages.
Invitation to Pay Additional Fees and Partial International Search Report received for PCT Patent Application No. PCT/US2015/034604, dated Sep. 4, 2015, 6 pages.
International Search Report and Written Opinion received for PCT Patent Application No. PCT/US2015/034606, dated Dec. 2, 2015, 17 pages.
Invitation to Pay Additional Fees and Partial International Search Report received for PCT Patent Application No. PCT/US2015/034606, dated Sep. 9, 2015, 6 pages.
Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/044473, dated Nov. 3, 2015, 5 pages.
Invitation to Pay Additional Fees received for PCT Patent Application No. PCT/US2015/044485, dated Nov. 3, 2015, 7 pages.
Invitation to Pay Additional Fees received for US Patent Application No. PCT/US2015/046262, dated Nov. 23, 2015, 7 pages.
International Search Report and Written Opinion received for PCT Patent Application No. PCT/US2015/044517, dated Oct. 28, 2015, 13 pages.
APK ROOT, "Butterfly 3D Live Wallpaper 1.0 APK", available at <http://apk-root.blogspot.in/2015/09/download-butterfly-3d-live-wallpaper-10.html/>, Feb. 26, 2013, 7 pages.
Avdonin, Nikita, "Astroviewer 3D", available at <https://www.youtube.comjwatch?v=zY0tslx3JHY/>, Nov. 5, 2013, 2 pages.
Evgenyevich, Sergey, "Earth & Moon in HD Gyro 3D", available at <https://www.youtube.com/watch?v=IRwNcaSYrls/>, Dec. 1, 2013, 4 pages.
Airshow, "Airshow App for Mobile Devices", available at <http://www.livingearthapp.com/>, 2012, 4 pages.
"Living Earth", available at: http;//www.livingcarthapp.com/, 2014, 6 pages.
"Link to Wayback Machine with link to Google Play showing different layouts of complications associated with a clock face", retrieved from <https://play.google.com/store/apps/details?id=com.levelup.beautifulwidgets.free&hl=da > Sep. 9, 2013, 6 pages.
"Sun Set Solar Image Clock" available at <https://web.archive.orgjweb/20140719005410/http://www.sunsetclock.com/>, 2013, 5 pages.
Viticci, Frederico, "Checking Time Zones with Living Earth", MacStories, available at <https://www.macstories.net/reviews/checking-time-zones-with-living-earth/>, Dec. 11, 2013, 5 pages.
UIKIT User Interface Catalog, "Page Controls", available online at <0140703123442/https:/Ideveloper.apple.com/library/ios/documentation/userexperience/ conceptual/UIKitUI Cat . . . >, Dec. 16, 2013, 4 pages.
Office Action received for Chinese Patent Application No. 201520594249.X, dated Dec. 9, 2015, 4 pages (2 pages of English Translation and 2 pages of Official Copy).
Intention to Grant received for Danish Patent Application No. PA201570496, dated Feb. 17, 2016, 6 pages.
International Search Report and Written Opinion received for PCT Patent Application No. PCT/US2015/034607, dated Dec. 1, 2015, 23 pages.
Restriction Requirement received for U.S. Appl. No. 14/815,890, dated Feb. 22, 2016, 5 pages.

(56) References Cited

OTHER PUBLICATIONS

Office Action received for Australian Patent Application No. 2015101019, dated Feb. 12, 2016, 4 pages.
Office Action received for Denmark Patent Application No. PA201570495, dated Oct. 29, 2015, 7 pages.
Office Action received for Australian Patent Application No. 2015101019, dated Apr. 7, 2016, 4 pages.
Office Action received for Chinese Patent Application No. 2015206791980, dated Mar. 7, 2016, 6 pages (4 pages of English Translation and 2 pages of Official Copy).
Horowitz, Paul, "Always Show Scroll Bars in Mac OS X", OSX Daily, retrieved from the Internet: URL:http:jjosxdaily.com/2011/08/03/show-scroll-bars-mac-os-x-lion/, 2011, 3 pages.
Intention to Grant received for Denmark Patent Application No. PA201570563, dated Mar. 17, 2016, 7 pages.
Office Action received for Danish Patent Application No. PA201570667, dated Apr. 1, 2016, 7 pages.
International Search Report and Written Opinion received for PCT Patent Application No. PCT/US2015/044473, dated Feb. 12, 2016, 24 pages.
International Search Report and Written Opinion received for PCT Patent Application No. PCT/US2015/044485, dated Feb. 9, 2016, 27 pages.
International Search Report and Written Opinion received for PCT Patent Application No. PCT/US2015/046262, dated Mar. 15, 2016, 34 pages.
Invitation to Pay Additional fees received for PCT Patent Application No. PCT/US2015/053353, dated Jan. 21, 2016, 7 pages.
Final Office Action received for U.S. Appl. No. 14/815,879, dated Mar. 24, 2016, 46 pages.
Non Final Office Action received for U.S. Appl. No. 14/815,879, dated Nov. 6, 2015, 35 pages.
Castellini, Rick, "Google Earth", retrieved from https://www.youtube.com/watch?v=bgjMSBXsFZQ, Feb. 12, 2013, 3 pages.
Nova, "Tour of the Solar System", retrieved from http://www.pbs.org/wgbh/nova/space/tour-solar-system.html, May 24, 2013, 14 pages.
Office Action received for Australian Patent Application No. 2015101021, dated Oct. 28, 2015, 10 pages.
Office Action received for Australian Patent Application No. 2015101021, dated Apr. 26, 2016, 4 pages.
Office Action received for Chinese Patent Application No. 201520595384.6, dated Mar. 25, 2016, 3 pages (1 page of English Translation and 2 pages of Official copy).
Office Action received for Chinese Patent Application No. 201520594249.X, dated Mar. 25, 2016, 3 pages (1 page of English Translation and 2 pages of Official copy).
Office Action received for Chinese Patent Application No. 201520595385.0, dated Mar. 25, 2016, 3 pages (1 page of English Translation and 2 pages of Official copy).
Office Action received for Chinese Patent Application No. 201520595408.8, dated Mar. 25, 2016, 3 pages (1 page of English Translation and 2 pages of Official copy).
Office Action received for Chinese Patent Application No. 201520595538.1, dated Mar. 25, 2016, 3 pages (1 page of English Translation and 2 pages of Official copy).
Final Office Action received for U.S. Appl. No. 14/815,898, dated Jun. 9, 2016, 19 pages.
"Google Earth 7.0.1.8244", retrieved from the Internet: http://dl.google.com/dl/earth/client/ge7/release_7_0_1/googleearth-win-bundle-7.0.1.8244.exe, Oct. 29, 2012, 1 page.
Notice of Allowance received for Chinese Patent Application No. 201520594249.X, dated Jul. 12, 2016, 4 pages (2 pages of English Translation and 2 pages of Official Copy).
Notice of Allowance received for Danish Patent Application No. PA201570496, dated Apr. 18, 2016, 2 pages.
Notice of Allowance received for Danish Patent Application No. PA201570563, dated May 24, 2016, 2 pages.
Notice of Allowance received for U.S. Appl. No. 14/815,907, dated Jul. 28, 2016, 9 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Chinese Patent Application No. 201520679198.0, dated Jun. 24, 2016, 5 pages (3 pages of English Translation and 2 pages of Official Copy).
Office action received for Danish Patent Application No. PA201570495, dated May 4, 2016, 8 pages.
Office Action received for Danish Patent Application No. PA201570497, dated May 17, 2016, 6 pages.
Office Action received for Danish Patent Application No. PA201570498, dated Jun. 2, 2016, 8 pages.
Office Action received for Danish Patent Application No. PA201570499, dated Jun. 16, 2016, 8 pages.
"Pentax K20D Operating Manual", available at: http://www.ricoh-imaging.eu/en/operating-manuals-download.html, 2008, pp. 173-174.
Pre-Interview First Office Action received for U.S. Appl. No. 14/815,890, dated May 26, 2016, 4 pages.
Non Final Office Action received for U.S. Appl. No. 14/833,014, dated Mar. 21, 2016, 26 pages.
ISO 9241-13:1998, "Ergonomic requirements for office work with visual display terminals (VDTs)", Part 13: User guidance, International Standard ISO, vol. 9241-13, Jul. 15, 1998, 1 page.
Nerdtalk, "The Best Android Clock Widgets", available at: https://www.youtube.com/watch?v=E1bAprWByfU, Apr. 25, 2011, 1 page.
Zukerman, Erez, "6 Beautiful, Interesting & Versatile Timer Apps [Android]", available at: http://www.makeuseof.com/tag/beautiful-interesting-versatile-timer-apps-android/, May 18, 2012, 5 pages.
Notice of Allowance received for Danish Patent Application No. PA201570667, dated Nov. 11, 2016, 2 pages.
Office Action received for Danish Patent Application No. PA201570667, dated Sep. 2, 2016, 2 pages.
Office Action received for Taiwanese Patent Application No. 104128705, dated Aug. 29, 2016, 18 pages (7 pages of English Translation and 11 pages of Official Copy).
Corrected Notice of Allowance received for U.S. Appl. No. 14/815,879, dated Jul. 13, 2017, 3 pages.
Non-Final Office Action received for U.S. Appl. No. 14/821,667, dated Jul. 14, 2017, 12 pages.
Office Action received for Japanese Patent Application No. 2017-505450, dated Jun. 20, 2017, 8 pages (4 pages of English Translation and 4 pages of Official Copy).
Office Action received for Korean Patent Application No. 10-2017-7005939, dated Jun. 30, 2017, 6 pages (2 pages of English Translation and 4 pages of Official copy).
"Android Wear walkthrough", Available online at: https://www.youtube.com/watch?v=4xntpZac4sw, Jun. 30, 2014, 1 page.
"LG G Watch—Designs | Watch Faces", Available online at: https://www.youtube.com/watch?v=yqxzqdi_MSE, Jul. 27, 2014, 1 page.
Office Action received for Danish Patent Application No. PA201570499, dated Nov. 1, 2017, 6 pages.
"Samsung Gear Live—Designs | Watch Faces", Available online at: https://www.youtube.com/watch?v=fFjtVAxyimE, Jul. 26, 2014, 1 page.
Bogdanov, Alexei, "SKMEI 1016", XP054977588, Available online at <URL:https://www.youtube.com/watch?v=E4q4Fug05Fw>, Jun. 21, 2014, 2 pages (see attached 37 CFR § 1.98(a) (3)).
Corrected Notice of Allowance received for U.S. Appl. No. 14/815,879, dated Jul. 28, 2017, 3 pages.
Final Office Action received for U.S. Appl. No. 14/841,402, dated Aug. 25, 2017, 17 pages.
"Kidizoom Smartwatch", Available online at <URL:https://www.vtechnl.com/media/downloads/Kidizoom-Smart-Watch.pdf>, Jun. 24, 2014, 23 pages.

(56) References Cited

OTHER PUBLICATIONS

"New, but unsigned—Easy StopWatch for Symbian", XP55393563, Available online at <http://www.allaboutsymbian.com/flow/item/19490_New_but_unsigned-Easy_StopWatc.php>, Mar. 15, 2014, 15 pages.
Notice of Allowance received for Taiwanese Patent Application No. 104124962, dated Jul. 27, 2017, 3 pages (Official Copy only) (see attached 37 CFR § 1.98(a) (3)).
Notice of Allowance received for Taiwanese Patent Application No. 104124995, dated Jul. 27, 2017, 3 pages (Official Copy only) (see attached 37 CFR § 1.98(a) (3)).
Rehman, A, "Install Android 4.2 Gesture-Based Keyboard & Clock App on Jelly Bean 4.1 or Higher", Available online at <http://www.addictivetips.com/android/install-android-4-2-keyboard-clock-app-apk-on-jelly-bean-4-1-/>, Nov. 3, 2012, 4 pages.
Search Report and Opinion received for Netherlands Patent Application No. 2015242, dated Jul. 4, 2017, 20 pages (10 pages of English Translation of Search Opinion and 10 pages of official Copy).
Search Report and Opinion received for Netherlands Patent Application No. 2018531, dated Jul. 27, 2017, 14 pages (6 pages of English Translation and 8 pages of Official Copy).
Search Report and Opinion received for Netherlands Patent Application No. 2015364, dated Jul. 4, 2017, 12 pages (5 pages of English Translation of Search Opinion and 7 pages of official Copy).
"UIKit User Interface Catalog: Page Controls", available at:—https://web.archive.org/web/20140703123442/https://developer.apple.com/library/ios/documentation/userexperience/conceptuai/UIKitUICatalog/UIPageControl.htm, 2014, 4 pages.
Advisory Action received for U.S. Appl. No. 14/815,898, dated Aug. 30, 2016, 3 pages.
Advisory Action received for U.S. Appl. No. 14/833,014, dated Jan. 27, 2017, 3 pages.
Cyr, Jim, "Apple Watch—Customize Modular Watch Face", available online at: https://www.youtube.com/watch?v=02W93HbKIK8, May 13, 2015, 2 pages.
"Deluxe Moon—Guide", available online at:—https://web.archive.org/web/20130520161057/http://www.lifewaresolutions.com/deluxe_moon_guide_ip.html, May 20, 2013, 5 pages.
Final Office Action received for U.S. Appl. No. 14/815,890, dated Nov. 21, 2016, 18 pages.
Final Office Action received for U.S. Appl. No. 14/833,014, dated Oct. 26, 2016, 32 pages.
First Action Interview received for U.S. Appl. No. 14/815,890, dated Aug. 12, 2016, 3 pages.
Geek, "How to Put the Day of the Week into the Windows Taskbar Clock", available online at: https://www.howtogeek.com/194103/how-to-put-the-day-of-the-week-into-the-windows-taskbar-clock/, 2014, 4 pages.
"Google Earth on Android—AndroidCentral.com", available online at:—https://www.youtube.com/watch?v=1WxN1RunrE4, Feb. 22, 2010, 1 page.
Gottabemobile, "How to Change Watch Faces on Android Wear", available online at URL:https://www.youtube.com/watch?v=B8iRGkGq6a8, Jul. 9, 2014, 4 pages.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/044473, dated Mar. 2, 2017, 20 pages.
International Preliminary Report on Patentability received for PCT Patent Application No. PCT/US2015/044485, dated Mar. 2, 2017, 20 pages.
International Preliminary Report on Patentability received for PCT Patent Application No. PCT/US2015/044517, dated Mar. 16, 2017, 10 pages.
International Preliminary Report on Patentability received for PCT Patent Application No. PCT/US2015/046262, dated Mar. 16, 2017, 26 pages.
International Search Report and Written Opinion received for PCT Patent Application No. PCT/US2015/053353, dated May 9, 2016, 21 pages.
International Search Report and Written Opinion received for PCT Patent Application No. PCT/US2016/017271, dated Sep. 1, 2016, 18 pages.
International Search Report and Written Opinion received for PCT Patent Application No. PCT/US2016/021403, dated May 12, 2016, 23 pages.
International Search Report and Written Opinion received for PCT Patent Application No. PCT/US2016/035090, dated Oct. 4, 2016, 17 pages.
Invitation to Pay Additional Fees received for PCT Patent Application No. PCT/US2016/017271, dated May 25, 2016, 7 pages.
Invitation to Pay Additional Fees received for PCT Patent Application No. PCT/US2016/035090, dated Jul. 15, 2016, 2 pages.
"MS Excel 2013", Jan. 29, 2013, 2 pages.
Non-Final Office Action received for U.S. Appl. No. 14/815,879, dated Dec. 15, 2016, 33 pages.
Non-Final Office Action received for U.S. Appl. No. 14/839,889, dated Mar. 7, 2017, 26 pages.
Non-Final Office Action received for U.S. Appl. No. 14/841,402, dated Jan. 25, 2017, 18 pages.
Notice of Allowance received for Danish Patent Application No. PA201570495, dated Feb. 22, 2017, 1 page.
Notice of Allowance received for Taiwanese Patent Application No. 104128684, dated Feb. 23, 2017, 3 pages (Official Copy only) (see attached 37 CFR § 1.98(a) (3)).
Notice of Allowance received for U.S. Appl. No. 14/815,898, dated Dec. 5, 2016, 3 pages.
Notice of Allowance received for U.S. Appl. No. 14/815,898, dated Oct. 24, 2016, 14 pages.
Notice of Allowance received for U.S. Appl. No. 14/815,907, dated Nov. 30, 2016, 2 pages.
Notice of Allowance received for U.S. Appl. No. 14/815,909, dated Sep. 6, 2016, 2 pages.
Office Action received for Australian Patent Application No. 2015298710, dated Feb. 15, 2017, 2 pages.
Office Action received for Australian Patent Application No. 2016100765, dated Aug. 5, 2016, 2 pages.
Office Action received for Australian Patent Application No. 2016100765, dated Dec. 16, 2016, 3 pages.
Office Action received for Chinese Patent Application No. 201520595384.6, dated Dec. 30, 2016, 2 pages (Official Copy only) (see attached 37 CFR § 1.98(a) (3)).
Office Action received for Chinese Patent Application No. 201520595384.6, dated Jul. 22, 2016, 3 pages (1 page of English Translation and 2 pages of Official Copy).
Office Action received for Chinese Patent Application No. 201520595385.0, dated Dec. 30, 2016, 2 pages (Official Copy only) (see attached 37 CFR § 1.98(a) (3)).
Office Action received for Chinese Patent Application No. 201520595385.0, dated Jul. 22, 2016, 3 page (1 page of English Translation and 2 pages of Official Copy).
Office Action Received for Chinese Patent Application No. 201520595408.8, dated Dec. 30, 2016, 2 pages (Official Copy Only) (see attached 37 CFR § 1.98(a) (3)).
Office Action received for Chinese Patent Application No. 201520595408.8, dated Jul. 25, 2016, 3 pages (1 page of English Translation and 2 pages of Official Copy).
Office Action received for Chinese Patent Application No. 201520595538.1, dated Dec. 30, 2016, 2 pages (Official Copy only) (see attached 37 CFR § 1.98(a) (3)).
Office Action received for Chinese Patent Application No. 201520595538.1, dated Jul. 22, 2016, 3 pages (1 page of English Translation and 2 pages of Official copy).

(56) References Cited

OTHER PUBLICATIONS

Office Action received for Danish Patent Application No. PA201570495, dated Dec. 9, 2016, 2 pages.
Office Action received for Danish Patent Application No. PA201570497, dated Feb. 21, 2017, 3 pages.
Office Action received for Danish Patent Application No. PA201570497, dated Nov. 15, 2016, 2 pages.
Office Action received for Danish Patent Application No. PA201570498, dated Feb. 6, 2017, 2 pages.
Office Action received for Danish Patent Application No. PA201570499, dated Feb. 14, 2017, 2 pages.
Office Action received for Danish Patent Application No. PA201670319, dated Aug. 2, 2016, 6 pages.
Office Action received for Danish Patent Application No. PA201670319, dated Nov. 24, 2016, 7 pages.
Office Action received for Danish Patent Application No. PA201670320, dated Aug. 4, 2016, 9 pages.
Office Action received for Danish Patent Application No. PA201670320, dated Dec. 5, 2016, 4 pages.
Office Action received for Dutch Patent Application No. 2015245, dated Jan. 24, 2017, 11 pages (1 page of English Translation and 10 pages of Official Copy).
Office Action received for Netherlands Patent Application No. 2015239, dated Oct. 28, 2016, 13 pages (5 pages of English Translation and 8 pages of Official Copy).
Office Action Received for Taiwanese Patent Application No. 104124962, dated Nov. 29, 2016, 6 pages (3 pages of English Translation and 3 pages of Official Copy).
Office Action received for Taiwanese Patent Application No. 104124998, dated Nov. 29, 2016, 6 pages (3 pages of English Translation and 3 pages of Official Copy).
Office Action received for Taiwanese Patent Application No. 104124963, dated Jan. 5, 2017, 11 pages (5 pages of English Translation and 6 pages of Official Copy).
Office Action received for Taiwanese Patent Application No. 104124995, dated Dec. 1, 2016, 6 pages (3 pages of English Translation and 3 pages of Official Copy).
Office Action received for Taiwanese Patent Application No. 104124997, dated Dec. 8, 2016, 12 pages (5 pages of English Translation and 7 pages of Official Copy).
Office Action received for Taiwanese Patent Application No. 104126627, dated Nov. 29, 2016, 9 pages (4 pages of English Translation and 5 pages of Official Copy).
Office Action received for Taiwanese Patent Application No. 104128684, dated Nov. 8, 2016, 24 pages (9 pages of English Translation and 15 pages of Official Copy).
Office Action received for Taiwanese Patent Application No. 104128705, dated Mar. 16, 2017, 3 pages (Official copy only) (see attached 37 CFR § 1.98(a) (3)).
Search Report and Opinion Received for Dutch Patent Application No. 2015232, dated Jan. 25, 2017, 9 pages (1 page of English Translation and 8 pages of Official Copy).
SmartWatch, "App Earth Space HD Live Wallpaper APK for Smart Watch", Version 1.7, Android version 2.2, Aug. 27, 2013, 1 page.
"Solar Walk Free", Vito Technology, Jun. 19, 2014, 9 pages (1 page of English Translation and 8 pages of Official Copy).
Viticci, Federico, "Checking Time Zones with Living Earth", MacStories, Dec. 11, 2013, 5 pages.
Corrected Notice of Allowance received for U.S. Appl. No. 14/815,879, dated Sep. 21, 2017, 2 pages.
International Preliminary Report on Patentability received for PCT Patent Application No. PCT/US2015/053353, dated Sep. 21, 2017, 15 pages.
International Preliminary Report on Patentability received for PCT Patent Application No. PCT/US2016/017271, dated Sep. 21, 2017, 13 pages.
International Preliminary Report on Patentability received for PCT Patent Application No. PCT/US2016/021403, dated Sep. 21, 2017, 21 pages.
Notice of Allowance received for Taiwanese Patent Application No. 104124963, dated Sep. 28, 2017, 5 pages. {See Communication under 37 CFR § 1.98(a) (3)}.
Notice of Allowance received for Taiwanese Patent Application No. 104124998, dated Mar. 31, 2017, 3 pages (Official copy only) (see attached 37 CFR § 1.98(a)(3)).
Office Action received for Australian Patent Application No. 2015298710, dated Apr. 13, 2017, 3 pages.
Office Action received for Taiwanese Patent Application No. 104132636, dated Mar. 23, 2017, 25 pages (10 pages of English Translation and 15 pages of Official copy).
Non Non Final Office Action received for U.S. Appl. No. 14/815,890, dated Jun. 6, 2017, 19 pages.
Sony, "Live View™ Micro Display", Extended User Guide, Aug. 2010, 27 pages.
Sony, "Sony SmartWatch", User Guide, Dec. 2011, 18 pages.
Notice of Allowance received for Taiwanese Patent Application No. 104124997, dated Jun. 16, 2017, 5 pages (1 page of English Translation of Search Report and 4 pages of Official Copy).
Notice of Allowance received for U.S. Appl. No. 14/815,879, dated Jun. 26, 2017, 8 pages.
Office Action received for Chinese Patent Application No. 201621208900.6, dated Apr. 26, 2017, 2 pages (Official Copy only) (see attached 37 CFR § 1.98(a) (3)).
Office Action received for Danish Patent Appliation No. PA201670319, dated Jun. 21, 2017, 6 pages.
Office Action received for Danish Patent Application No. PA201670320, dated Jul. 3, 2017, 4 pages.
Notice of Allowance received for U.S. Appl. No. 14/839,889, dated Oct. 30, 2017, 16 pages.
Office Action received for Danish Patent Application No. PA201570497, dated Oct. 24, 2017, 2 pages.
Office Action received for Danish Patent Application No. PA201570498, dated Oct. 26, 2017, 5 pages.
Corrected Notice of Allowance received for U.S. Appl. No. 14/841,402, dated May 4, 2018, 2 pages.
Examiner's Answer to Appeal Brief received for U.S. Appl. No. 14/833,014, dated Nov. 2, 2017, 48 pages.
Final Office Action received for U.S. Appl. No. 14/815,890, dated Feb. 26, 2018, 20 pages.
Final Office Action received for U.S. Appl. No. 14/821,667, dated Apr. 26, 2018, 13 pages.
International Preliminary Report on Patentability received for PCT Patent Application No. PCT/US2016/035090, dated Dec. 14, 2017, 14 pages.
Invitation to Pay Additional Fee received for European Patent Application No. 15747595.5, dated Feb. 9, 2018, 6 pages.
Non-Final Office Action received for U.S. Appl. No. 14/841,606, dated Dec. 7, 2017, 30 pages.
Notice of Allowance received for Japanese Patent Application No. 2017-505450, dated Mar. 9, 2018, 10 pages (7 pages of English Translation and 3 pages of Official Copy).
Notice of Allowance received for Korean Patent Application No. 10-2017-7005939, dated Mar. 30, 2018, 5 pages (2 pages of English Translation and 3 pages of Official Copy).
Notice of Allowance received for U.S. Appl. No. 14/841,402, dated Apr. 26, 2018, 16 pages.
Office Action received for European Patent Application No. 15730924.6, dated Dec. 12, 2017, 8 pages.
Office Action received for Chinese Patent Application No. 201510479088.4, dated Mar. 12, 2018, 20 pages (6 pages of English Translation and 14 pages of Official Copy).
Office Action received for Chinese Patent Application No. 201510481525.6, dated Nov. 29, 2017, 9 pages (3 pages of English Translation and 6 pages of Official Copy).
Office Action received for Chinese Patent Application No. 201510483268.X, dated Dec. 1, 2017, 11 pages (5 pages of English Translation and 6 pages of Official Copy).
Office action received for Chinese Patent Application No. 201510483305.7, dated Dec. 1, 2017, 13 pages (5 pages of English Translation and 8 pages of Official Copy).

(56) References Cited

OTHER PUBLICATIONS

Office Action received for Chinese Patent Application No. 201510557356.X, dated Dec. 29, 2017, 11 pages (5 pages of English Translation and 6 pages of Official Copy).

Office Action received for Danish Patent Application No. PA201670320, dated Jan. 18, 2018, 2 pages.

Office Action received for European Patent Application No. 15730925.3, dated Apr. 12, 2018, 8 pages.

Office Action received for German Patent Application No. 112015003083.2, dated Mar. 9, 2018, 12 pages (5 pages of English Translation and 7 pages of Official Copy).

Office Action received for Japanese Patent Application No. 2017-510631, dated Mar. 2, 2018, 12 pages (7 pages of English Translation and 5 pages of Official Copy).

Office Action received for Taiwanese Patent Application No. 104126627, dated Oct. 16, 2017, 7 pages (3 pages of English Translation and 4 pages of Official Copy).

Office Action received for Taiwanese Patent Application No. 104132636, dated Oct. 31, 2017, 10 pages (4 pages of English Translation and 6 pages of Official Copy).

Tweedie, Steven, "Create and Customize Your Own Emojis with 'Makemoji' for.iPhone", Available online at: http://www.businessinsider.com/create-custom-emojis-with-makemoji-app-2014-8, Aug. 19, 2014, 6 pages.

Whitwam, Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.

Notice of Allowance received for Netherland Patent Application No. 2019753, dated Jul. 6, 2018, 6 pages (2 pages of English Translation and 4 pages of Official copy).

Office Action received for Australian Patent Application No. 2016229847, dated Jul. 3, 2018, 4 pages.

Office Action received for European Patent Application No. 15759998.6, dated Jul. 16, 2018, 6 pages.

Decision to Grant received for Danish Patent Application No. PA201670320, dated Oct. 18, 2018, 2 pages.

Office Action received for Chinese Patent Application No. 201510481525.6, dated Aug. 29, 2018, 10 pages (5 pages of English Translation and 5 pages of Official copy).

Office action received for Chinese Patent Application No. 201510483305.7, dated Aug. 31, 2018, 10 pages (5 pages of English Translation and 5 pages of Official copy).

Office Action received for Japanese Patent Application No. 2017-545918, dated Sep. 14, 2018, 12 pages (7 pages of English Translation and 5 pages of Official copy).

Office Action received for Korean Patent Application No. 10-2017-7024570, dated Sep. 28 2018, 14 pages (6 pages of English Translation and 8 pages of Official copy).

Intention to Grant received for Danish Patent Application No. PA201670320, dated May 17, 2018, 2 pages.

Office Action received for Chinese Patent Application No. 201510484514.3, dated Apr. 4, 2018, 12 pages (5 pages of English Translation and 7 pages of Official Copy).

Office Action received for Netherland Patent Application No. 2019753, dated Apr. 12, 2018, 8 pages (3 page of English Translation and 5 pages of Official Copy).

Decision on Opposition received for Australian Patent Application No. 2015298710, dated Aug. 20, 2018, 20 pages.

Final Office Action received for U.S. Appl. No. 14/841,606, dated Sep. 7, 2018, 34 pages.

Feldman, Ari, "Excerpts from: Designing Arcade Computer Game Graphics", Available online at: http://www.phatcode.net/res/269/files/dacgg.pdf, Jan. 1, 2001, 35 pages.

Office Action received for Danish Patent Application No. PA201570499, dated Jun. 19, 2018, 4 pages.

Office Action received for European Patent Application No. 15747595.5, dated Jun. 27, 2018, 8 pages.

"Reuse Animations—Synfig Animation Studio", Available online at: https://wiki.synfig.org/index.php?title=Doc:Reuse_Animations&oldid=18173, May 20, 2013, 5 pages.

Summons to Attend Oral Proceedings received for European Patent Application No. 15730924.6, mailed on Jun. 13, 2018, 10 pages.

"Tropical Fish 14", Available online at: https://www.turbosguid.com/3d-models/tropical-fish-3d-model/388510, Feb. 4, 2008, 2 pages.

Non-Final Office Action received for U.S. Appl. No. 15/352,215, dated Sep. 20, 2018, 31 pages.

Notice of Acceptance received for Australian Patent Application No. 2016229847, dated Sep. 12, 2018, 3 pages.

Office Action received for Australian Patent Application No. 2015298710, dated Sep. 24, 2018, 4 pages.

Office Action received for Taiwanese Patent Application No. 104126627, dated Aug. 30, 2018, 22 pages (9 pages of English Translation and 13 pages of Official Copy).

\* cited by examiner

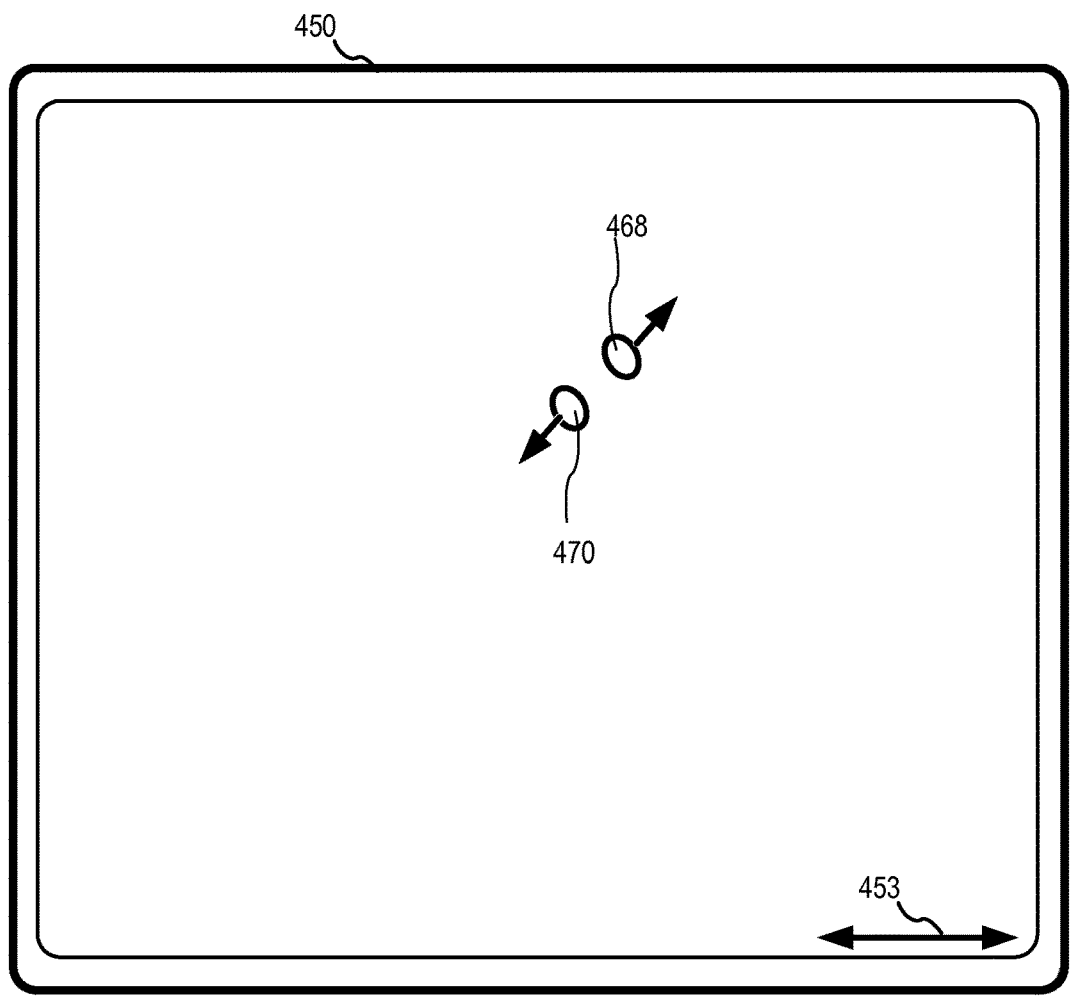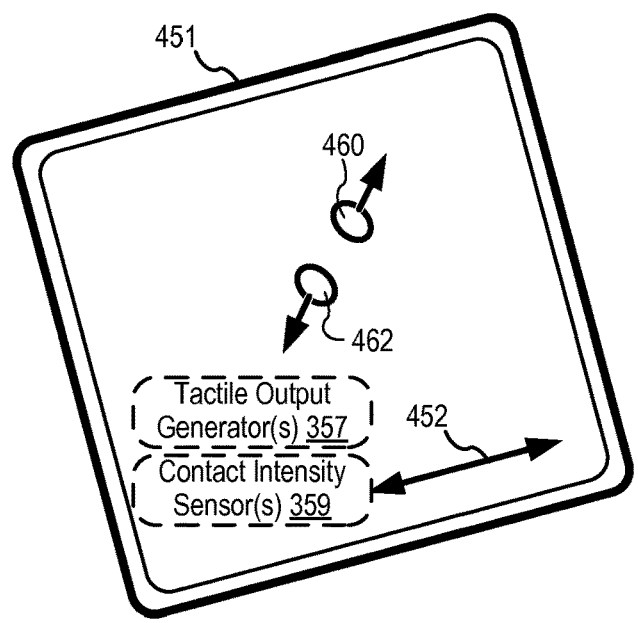
FIG. 4B

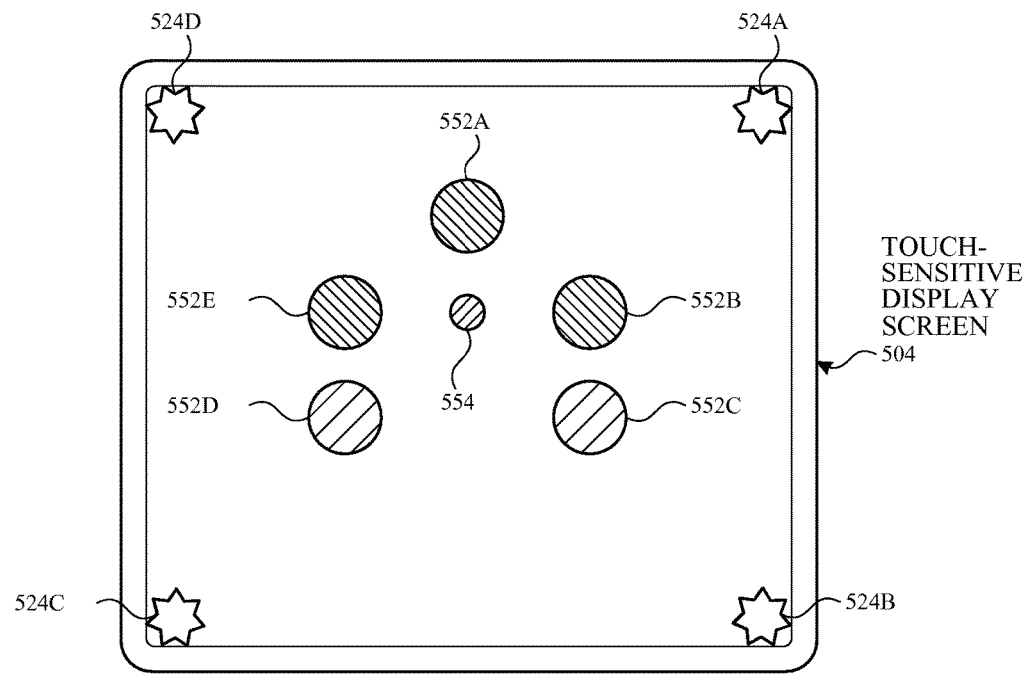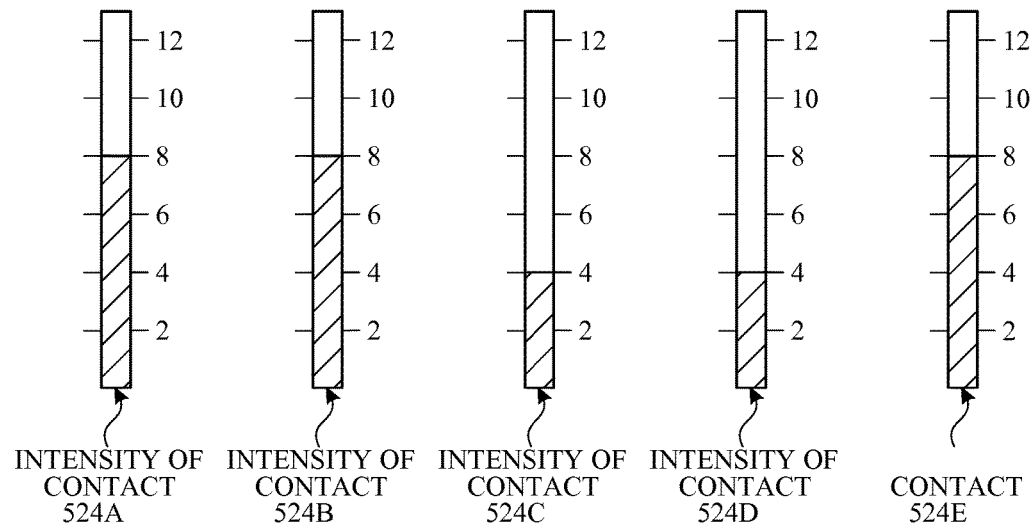
*FIG. 5D*

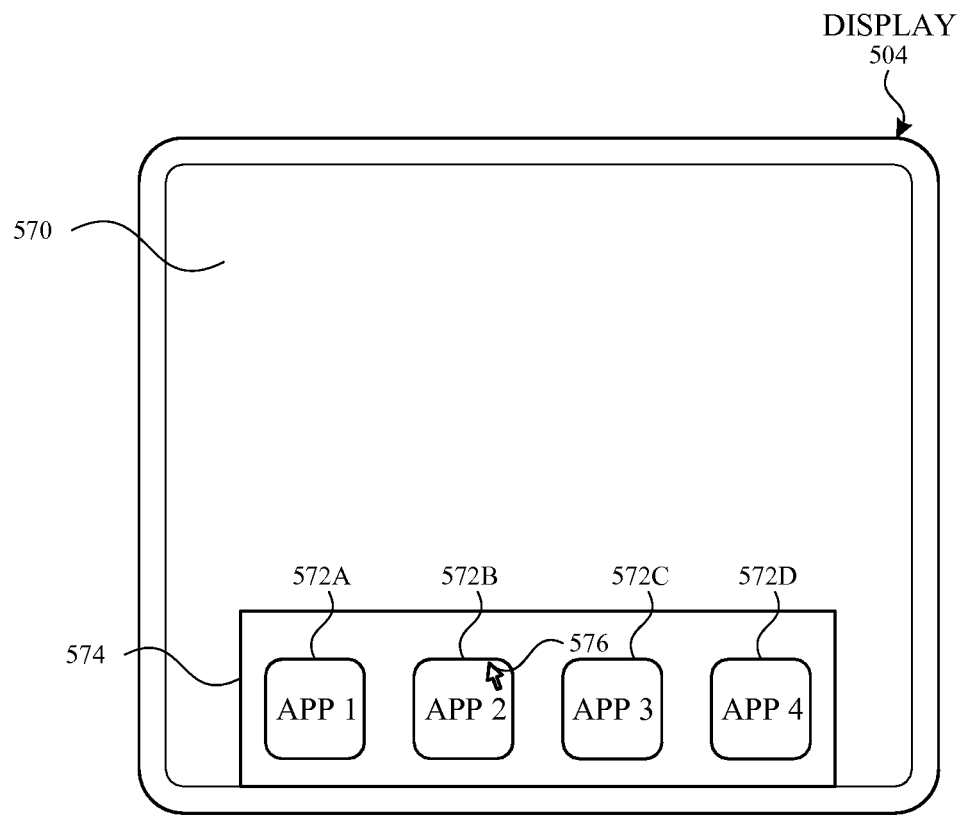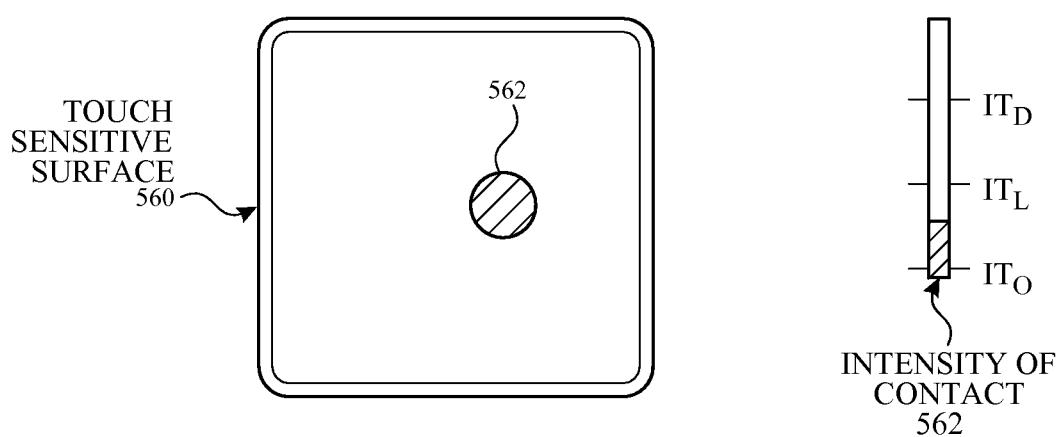
FIG. 5E

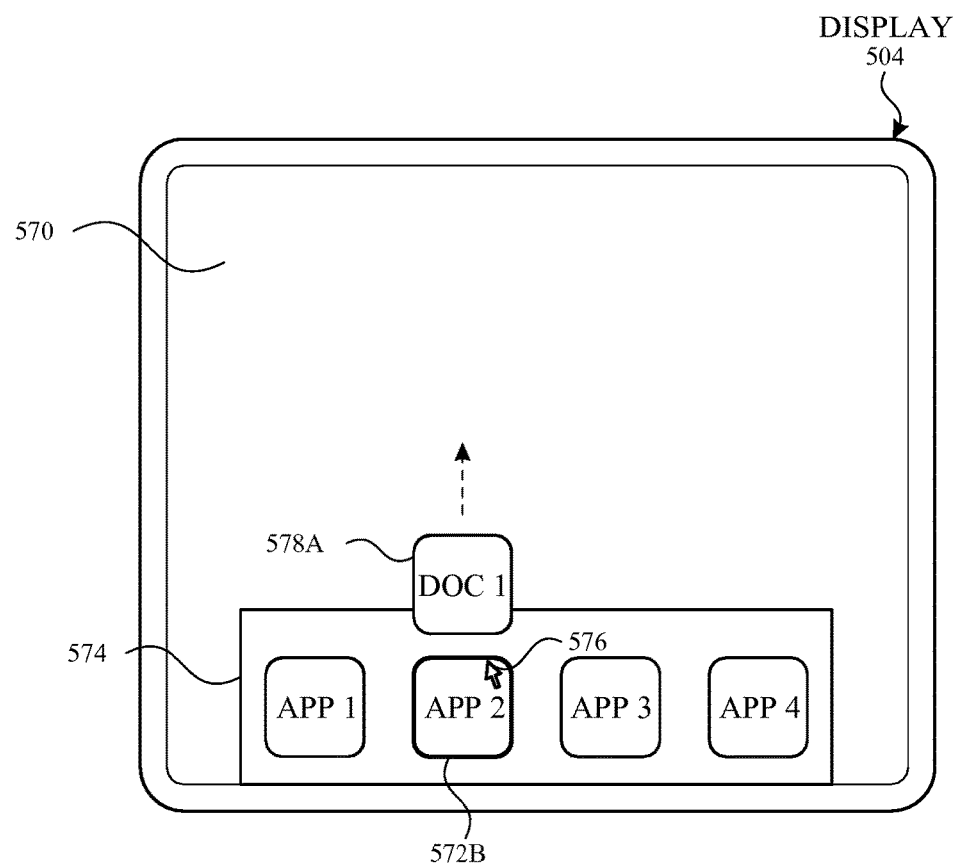
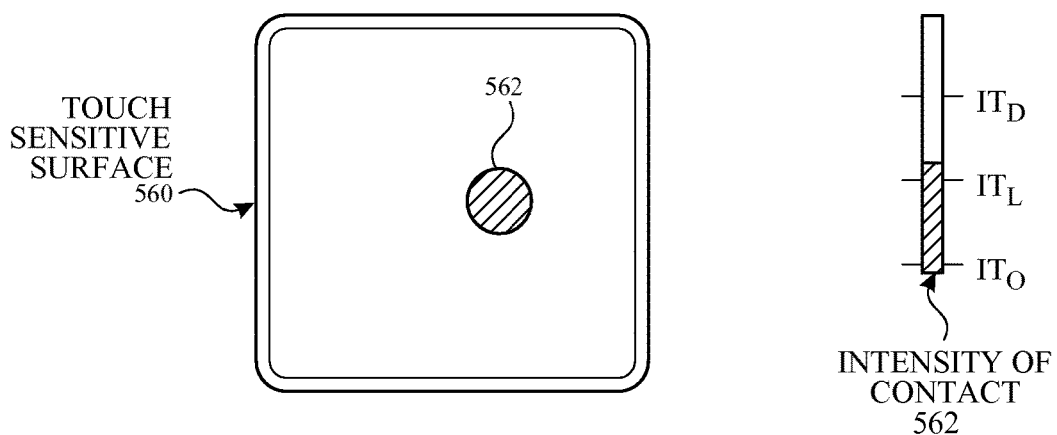
*FIG. 5F*

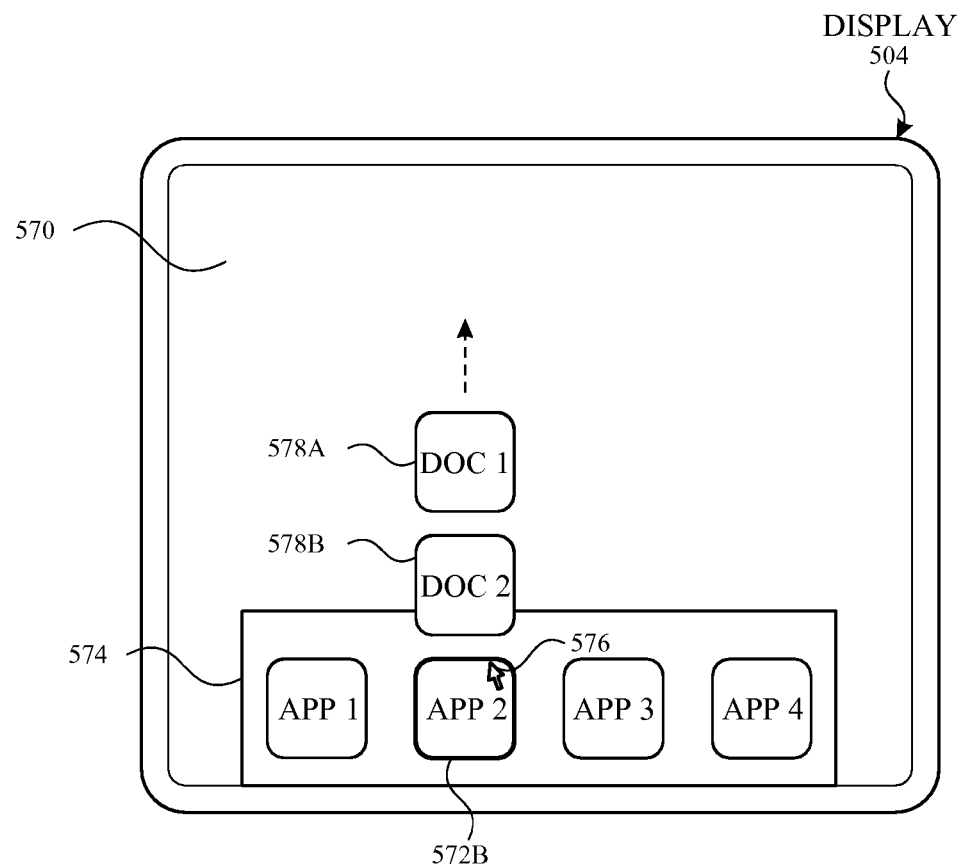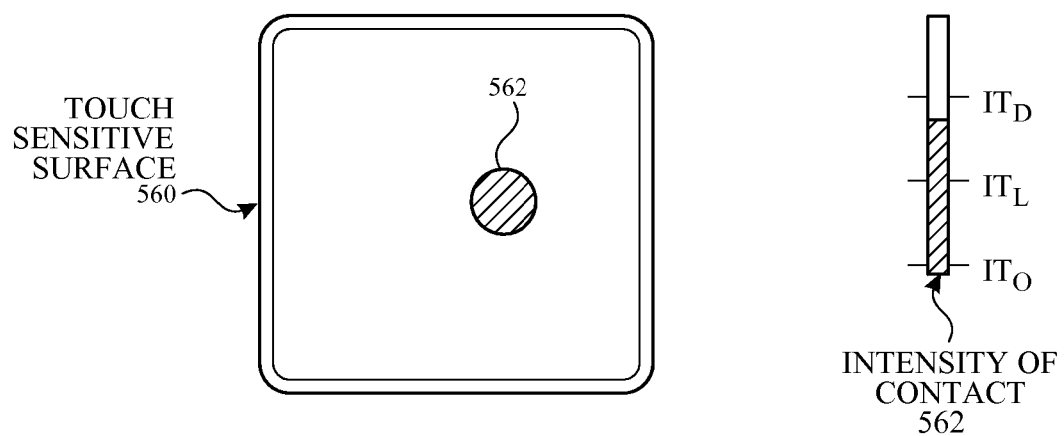
FIG. 5G

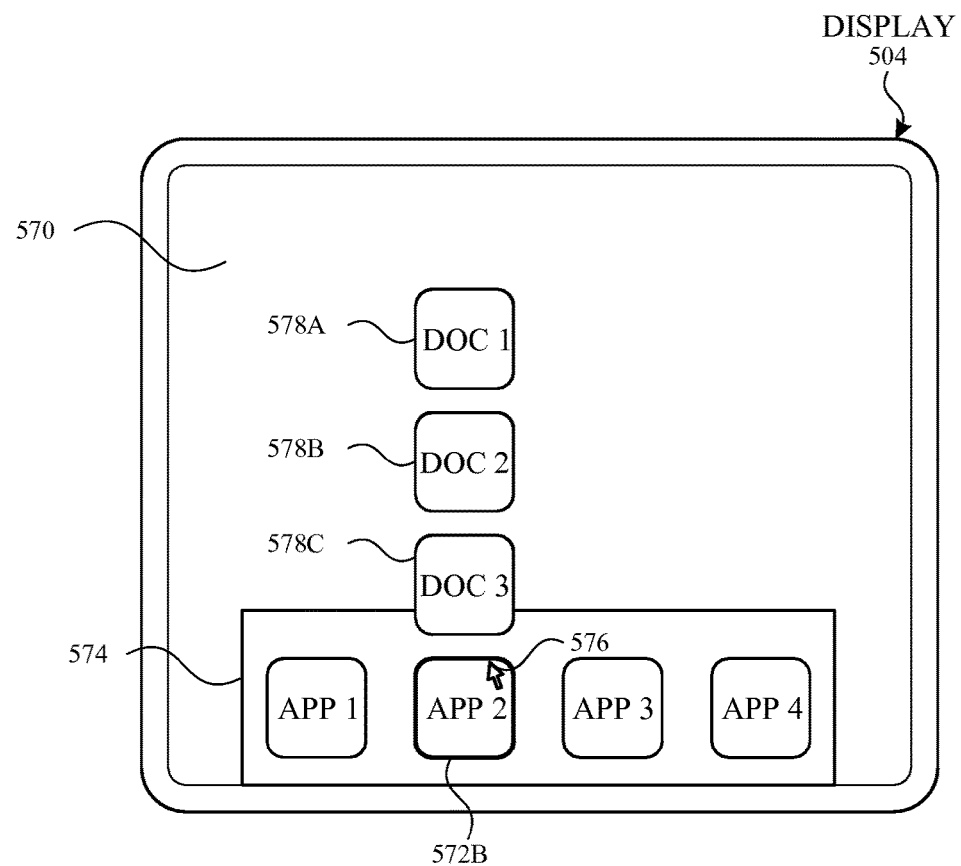
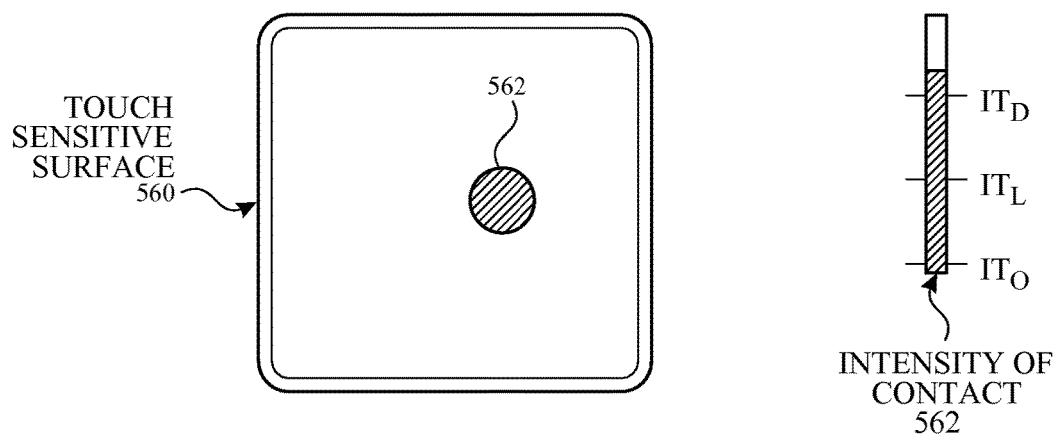
*FIG. 5H*

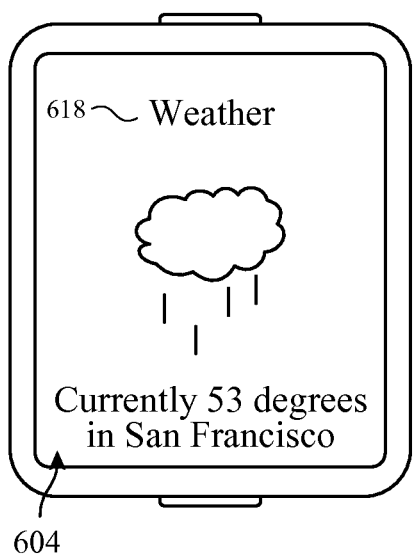
*FIG. 8A*  *FIG. 8B*

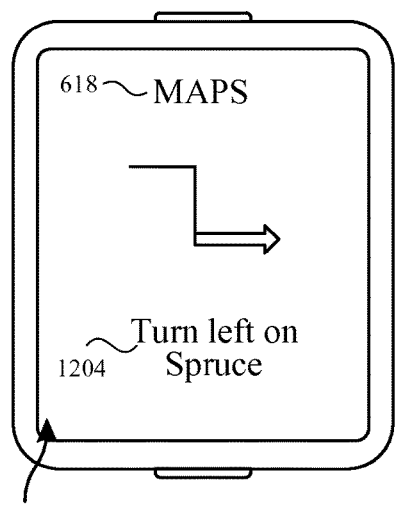
1202  *FIG. 12A*
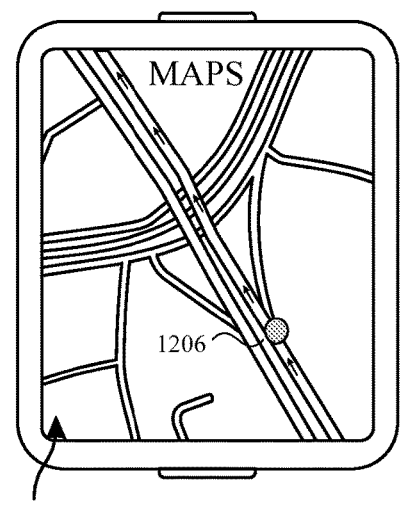
1202  *FIG. 12B*
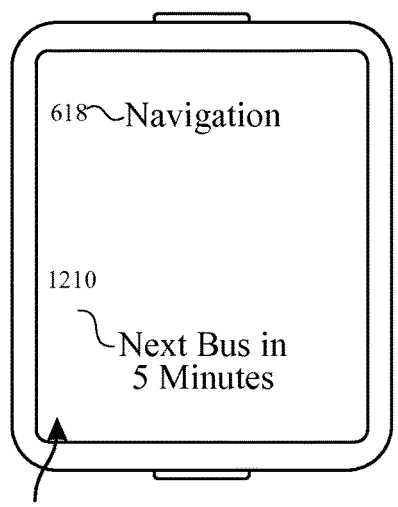
1208  *FIG. 12C*
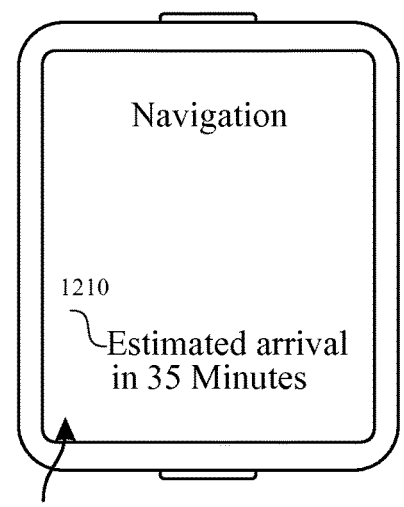
1208  *FIG. 12D*

2000

```
┌─────────────────────────────────────────────────────────────┐
│                          2002                                │
│              Detect a contact with the display               │
└─────────────────────────────────────────────────────────────┘
                              │
                              ▼
┌─────────────────────────────────────────────────────────────┐
│                          2004                                │
│                                                              │
│  In response to detecting the contact, display a user        │
│  interface screen representing a corresponding application.  │
│  The user interface screen comprises an affordance for       │
│  launching the application and a set of information          │
│  obtained from the application. The set of information is    │
│  updated in accordance with data from the application.       │
│                                                              │
│  ┌ ─ ─ ─ ─ ─ ─ ─ ─ ─ ─ ─ ─ ─ ─ ─ ─ ─ ─ ─ ─ ─ ─ ─ ─ ─ ─ ┐    │
│    Optionally, detect a second contact on the display at     │
│  │ a location corresponding to the user interface screen.│   │
│    In response to detecting the second contact, display      │
│  │ a second set of information obtained from the         │   │
│    application. The second set of information is updated     │
│  │ in accordance with data from the application.         │   │
│  └ ─ ─ ─ ─ ─ ─ ─ ─ ─ ─ ─ ─ ─ ─ ─ ─ ─ ─ ─ ─ ─ ─ ─ ─ ─ ─ ┘    │
└─────────────────────────────────────────────────────────────┘
```

2202
Detect a first contact on the display

---

2204

In response to detecting the contact, display a first user interface screen of an ordered set of user interface screens. The set of user interface screens represent a set of applications. The first user interface screen comprises a first affordance for launching a first application of the set of applications, and a first set of information obtained from the first application. The first set of information is updated in accordance with data from the first application.

---

2206
Detect a second contact on the display

---

2208
In response to detecting the second contact, determine whether the characteristic intensity of the second contact is above a threshold intensity

---

2210
In accordance with a determination that the characteristic intensity of the second contact is above the threshold intensity, display a user interface for reordering the set of user interface screens

---

2212
In accordance with a determination that the characteristic intensity of the second contact is below the threshold intensity, and in response to detecting the second contact at a location on the display corresponding to the first affordance, launch the first application.

*FIG. 22*

REDUCED-SIZE USER INTERFACES FOR DYNAMICALLY UPDATED APPLICATION OVERVIEWS

CROSS-REFERENCE TO RELATED APPLICATIONS

This application claims priority to U.S. Provisional Patent Application Ser. No. 62/129,801, titled "Reduced-Size User Interfaces for Dynamically Updated Application Overviews" filed Mar. 7, 2015 and U.S. Provisional Patent Application Ser. No. 62/044,993, titled "Reduced-Size User Interfaces for Dynamically Updated Application Overviews" filed Sep. 2, 2014, the contents of which are hereby incorporated by reference in their entirety.

This application relates to U.S. Provisional Patent Application Ser. No. 62/044,953 titled "Reduced-Size Notification Interface," filed Sep. 2, 2014; U.S. Provisional Patent Application Ser. No. 62/129,849 titled "User Interactions for a Mapping Application," filed Sep. 2, 2014; U.S. Provisional Patent Application Ser. No. 62/044,944 titled "User Interactions for a Mapping Application," filed Mar. 8, 2015; International Patent Application Serial No. PCT/US2013/040061, titled "Device, Method, and Graphical User Interface for Displaying User Interface Objects Corresponding to an Application," filed May 8, 2013; and International Patent Application Serial No. PCT/US2013/069483, titled "Device, Method, and Graphical User Interface for Transitioning Between Touch Input to Display Output Relationships," filed Nov. 11, 2013. These applications are incorporated herein by reference in their entirety.

FIELD

The disclosed examples relate generally to user interfaces of electronic devices.

BACKGROUND

Reduced-size personal electronic devices, such as devices that are smaller than cellular phones, may be used for viewing, monitoring, or interacting with a variety of applications executing on the personal electronic device or on an external device. User interfaces that are suitable for viewing application information on reduced-size personal electronic devices are desirable.

BRIEF SUMMARY

In accordance with some embodiments, a method is performed at an electronic device with a touch-sensitive display. The method includes detecting a contact with the touch-sensitive display, and in response to detecting the contact, displaying a user interface screen representing a corresponding application. The user interface screen comprises an affordance for launching the application, and a set of information obtained from the application, wherein the set of information is updated in accordance with data from the application.

In accordance with some embodiments, a method is performed at an electronic device with a touch-sensitive display. The method includes detecting a contact on the touch-sensitive display, and in response to detecting the contact, obtaining contextual data representing a context of the device. The method also includes displaying a user interface screen representing a corresponding application, wherein the application is selected based on the contextual data. The user interface screen comprises an affordance for launching the application, and a set of information obtained from the application, wherein the set of information is updated in accordance with data from the application.

In accordance with some embodiments, a method is performed at an electronic device with a touch-sensitive display, wherein the touch-sensitive display comprises one or more sensors to detect the intensity of contacts with the touch-sensitive display. The method includes detecting a first contact on the touch-sensitive display, and in response to detecting the first contact, displaying a first user interface screen of an ordered set of user interface screens, wherein the set of user interface screens represents a set of applications. The first user interface screen comprises: a first affordance for launching a first application of the set of applications, and a first set of information obtained from the first application, wherein the first set information is updated in accordance with data from the first application. The method also includes detecting a second contact on the touch-sensitive display, and in response to detecting the second contact, determining whether a characteristic intensity of the second contact is above a threshold intensity. The method includes, in accordance with a determination that the characteristic intensity of the second contact is above the threshold intensity, displaying a user interface for reordering the set of user interface screens, and in accordance with a determination that the characteristic intensity of the second contact is below the threshold intensity, and in response to detecting the second contact at a location on the touch-sensitive display corresponding to the first affordance, launching the first application.

In accordance with some embodiments, a non-transitory computer-readable storage medium storing one or more programs comprising instructions is disclosed. The instructions, when executed by one or more processors of an electronic device with a touch-sensitive display cause the electronic device to: detect a contact with the touch-sensitive display, and in response to detecting the contact, display a user interface screen representing a corresponding application. The user interface screen comprises an affordance for launching the application, and a set of information obtained from the application, wherein the set of information is updated in accordance with data from the application.

In accordance with some embodiments, a non-transitory computer-readable storage medium storing one or more programs comprising instructions is disclosed. The instructions, when executed by one or more processors of an electronic device with a touch-sensitive display cause the electronic device to: detect a contact on the touch-sensitive display, and in response to detecting the contact, obtain contextual data representing a context of the device and display a user interface screen representing a corresponding application, wherein the application is selected based on the contextual data. The user interface screen comprises an affordance for launching the application, and a set of information obtained from the application, wherein the set of information is updated in accordance with data from the application.

In accordance with some embodiments, a non-transitory computer-readable storage medium storing one or more programs comprising instructions is disclosed. The instructions, when executed by one or more processors of an electronic device with a touch-sensitive display having one or more sensors to detect the intensity of contacts with the touch-sensitive display, cause the electronic device to: detect a first contact on the touch-sensitive display, and in response to detecting the first contact, display a first user interface screen of an ordered set of user interface screens, wherein the set of user interface screens represents a set of applications, wherein the first user interface screen comprises: a first affordance for launching a first application of the set of applications, and a first set of information obtained from the first application, wherein the first set information is updated in accordance with data from the first application; detect a second contact on the touch-sensitive display, and in response to detecting the second contact, determine whether a characteristic intensity of the second contact is above a threshold intensity; in accordance with a determination that the characteristic intensity of the second contact is above the threshold intensity, display a user interface for reordering the set of user interface screens, and in accordance with a determination that the characteristic intensity of the second contact is below the threshold intensity, and in response to detecting the second contact at a location on the touch-sensitive display corresponding to the first affordance, launch the first application.

In accordance with some embodiments, a transitory computer-readable storage medium storing one or more programs comprising instructions is disclosed. The instructions, when executed by one or more processors of an electronic device with a touch-sensitive display cause the electronic device to: detect a contact with the touch-sensitive display, and in response to detecting the contact, display a user interface screen representing a corresponding application. The user interface screen comprises an affordance for launching the application, and a set of information obtained from the application, wherein the set of information is updated in accordance with data from the application.

In accordance with some embodiments, a transitory computer-readable storage medium storing one or more programs comprising instructions is disclosed. The instructions, when executed by one or more processors of an electronic device with a touch-sensitive display cause the electronic device to: detect a contact on the touch-sensitive display, and in response to detecting the contact, obtain contextual data representing a context of the device and display a user interface screen representing a corresponding application, wherein the application is selected based on the contextual data. The user interface screen comprises an affordance for launching the application, and a set of information obtained from the application, wherein the set of information is updated in accordance with data from the application.

In accordance with some embodiments, a transitory computer-readable storage medium storing one or more programs comprising instructions is disclosed. The instructions, when executed by one or more processors of an electronic device with a touch-sensitive display, wherein the touch-sensitive display comprises one or more sensors to detect the intensity of contacts with the touch-sensitive display, cause the electronic device to: detect a first contact on the touch-sensitive display, and in response to detecting the first contact, display a first user interface screen of an ordered set of user interface screens, wherein the set of user interface screens represents a set of applications, wherein the first user interface screen comprises: a first affordance for launching a first application of the set of applications, and a first set of information obtained from the first application, wherein the first set information is updated in accordance with data from the first application; detect a second contact on the touch-sensitive display, and in response to detecting the second contact, determine whether a characteristic intensity of the second contact is above a threshold intensity; in accordance with a determination that the characteristic intensity of the second contact is above the threshold intensity, display a user interface for reordering the set of user interface screens, and in accordance with a determination that the characteristic intensity of the second contact is below the threshold intensity, and in response to detecting the second contact at a location on the touch-sensitive display corresponding to the first affordance, launch the first application.

An electronic device, comprising: a touch-sensitive display; one or more processors; a memory; and one or more programs, wherein the one or more programs are stored in the memory and configured to be executed by the one or more processors, the one or more programs including instructions for: detecting a contact with the touch-sensitive display, and in response to detecting the contact, displaying a user interface screen representing a corresponding application; the user interface screen comprises an affordance for launching the application, and a set of information obtained from the application, wherein the set of information is updated in accordance with data from the application.

An electronic device, comprising: a touch-sensitive display; one or more processors; a memory; and one or more programs, wherein the one or more programs are stored in the memory and configured to be executed by the one or more processors, the one or more programs including instructions for: detecting a contact on the touch-sensitive display, and in response to detecting the contact, obtaining contextual data representing a context of the device; displaying a user interface screen representing a corresponding application, wherein the application is selected based on the contextual data, wherein the user interface screen comprises an affordance for launching the application, and a set of information obtained from the application, wherein the set of information is updated in accordance with data from the application.

An electronic device, comprising: a touch-sensitive display comprising one or more sensors to detect the intensity of contacts with the touch-sensitive display; one or more processors; a memory; and one or more programs, wherein the one or more programs are stored in the memory and configured to be executed by the one or more processors, the one or more programs including instructions for: detecting a first contact on the touch-sensitive display, and in response to detecting the first contact, displaying a first user interface screen of an ordered set of user interface screens, wherein the set of user interface screens represents a set of applications; the first user interface screen comprises: a first affordance for launching a first application of the set of applications, and a first set of information obtained from the first application, wherein the first set information is updated in accordance with data from the first application; detecting a second contact on the touch-sensitive display, and in response to detecting the second contact, determining whether a characteristic intensity of the second contact is above a threshold intensity; in accordance with a determination that the characteristic intensity of the second contact is above the threshold intensity, displaying a user interface for reordering the set of user interface screens, and in accordance with a determination that the characteristic intensity of the second contact is below the threshold intensity, and in response to detecting the second contact at a location on the touch-sensitive display corresponding to the first affordance, launching the first application.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 5D illustrates assigning an aggregate intensity to contacts.

FIGS. 5E-5H illustrate detection of a gesture having an intensity of contact.

FIGS. 8A-8B illustrate exemplary user interfaces.

FIGS. 12A-12D illustrate exemplary user interfaces.

FIG. 20 illustrates an exemplary process for managing application overview screens.

FIG. 22 illustrates an exemplary process for managing application overview screens.

DESCRIPTION OF EMBODIMENTS

Figure 1A:
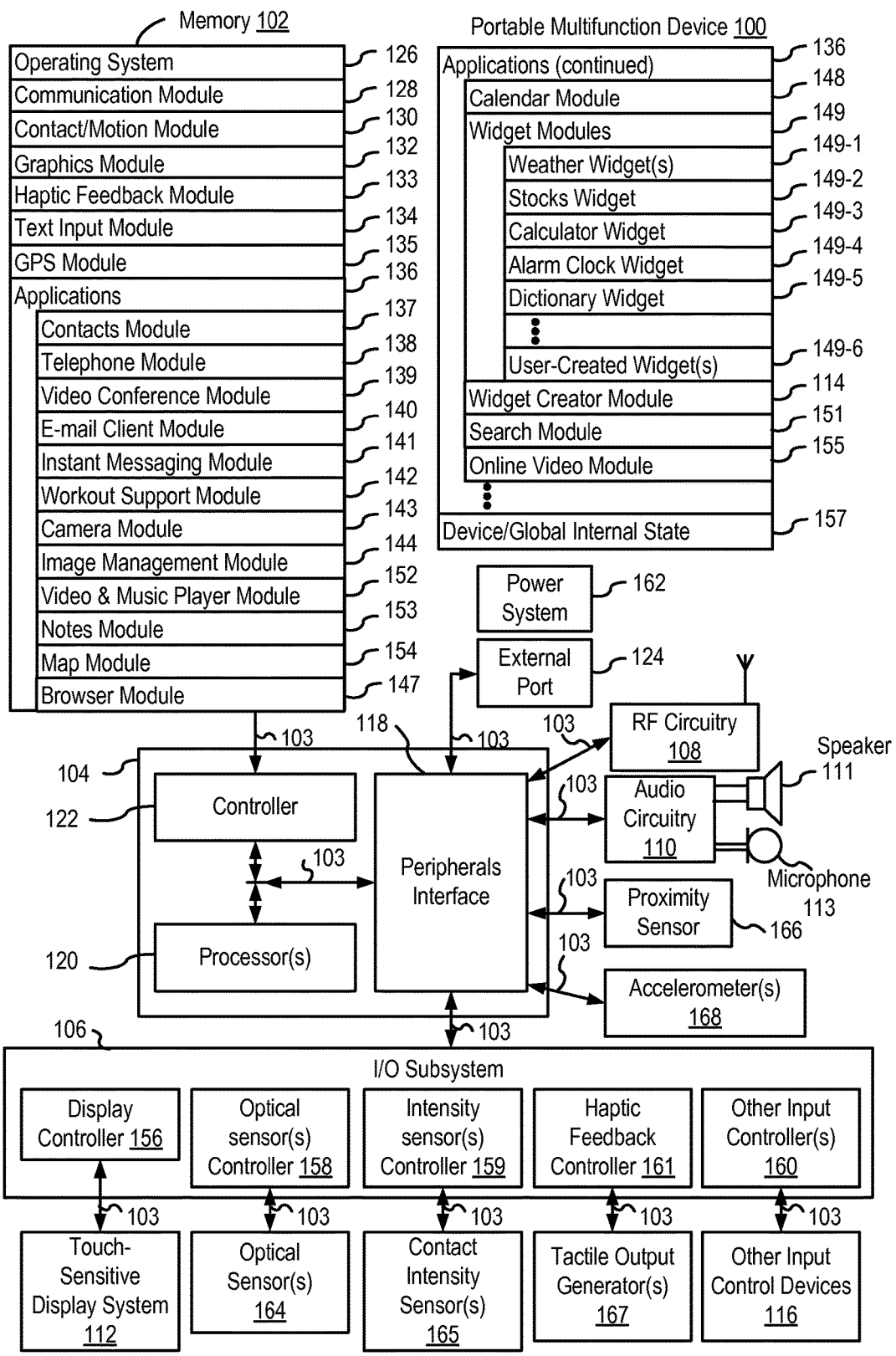
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

A reduced-size personal electronic device that is configured to be worn by a user can enable a user to view, monitor, or interact with a variety of applications executing on the personal electronic device or on an external electronic device in communication with the personal electronic device. However, the small screen size of a personal electronic device may make it impractical or awkward to view full application interfaces. Instead, a user may wish to view only the most important or relevant information generated by an application, such as a "snapshot" or overview, of the application. Such an overview can display information obtained from the application without being part of the application itself. In some cases, an overview can allow a user to interact with the application without having to launch the application on the personal electronic device, increasing both user and device efficiency. Such techniques can reduce the cognitive burden on a user who accesses information obtained from a variety of applications, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for viewing information obtained from a variety of applications. FIGS. 6A-19 illustrate exemplary user interfaces for viewing overview screens and interacting with applications via the overview screens. The user interfaces in the figures are also used to illustrate the processes described below, including the processes in FIGS. 20-22.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
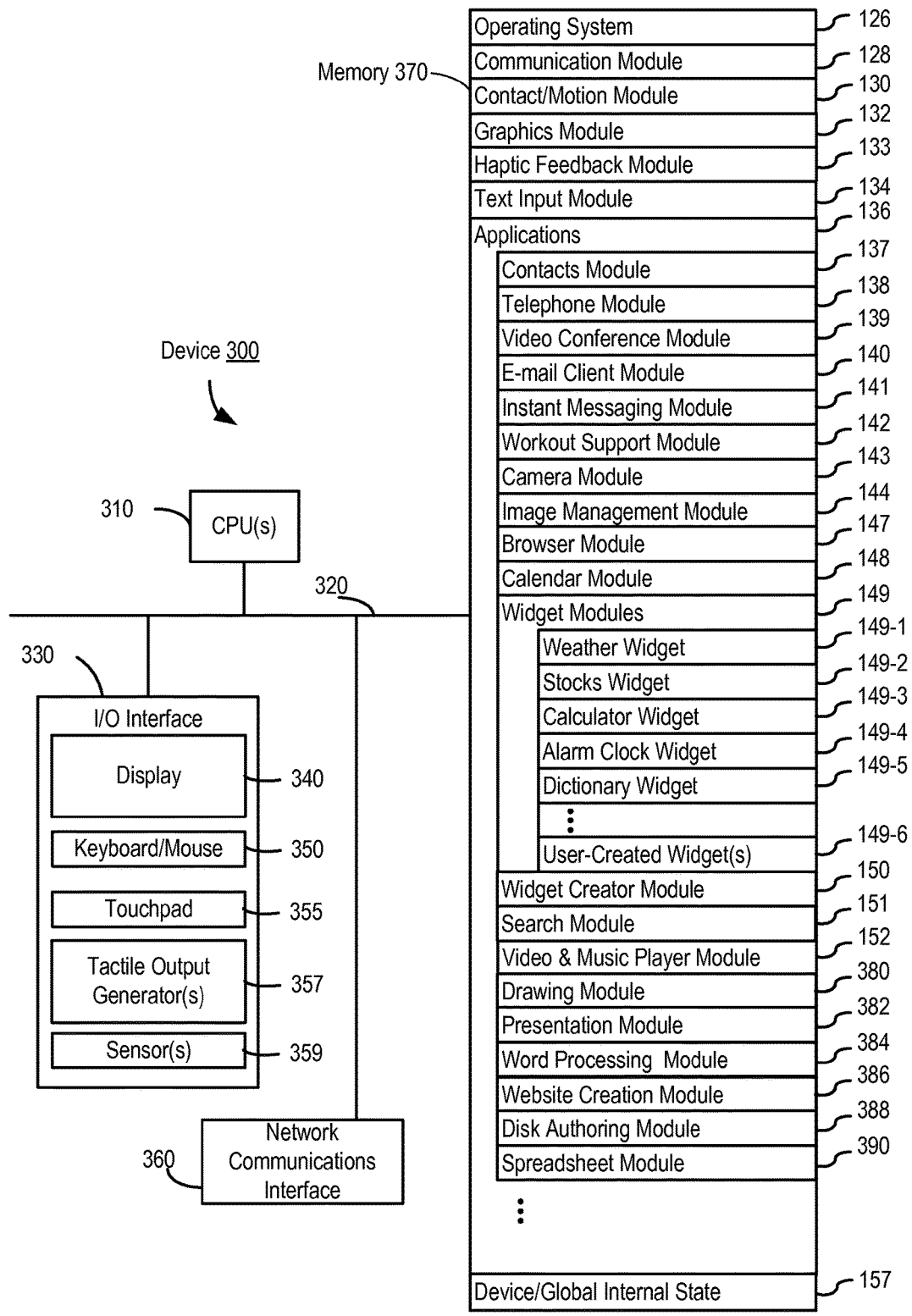
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:

Contacts module 137 (sometimes called an address book or contact list);
Telephone module 138;
Video conferencing module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
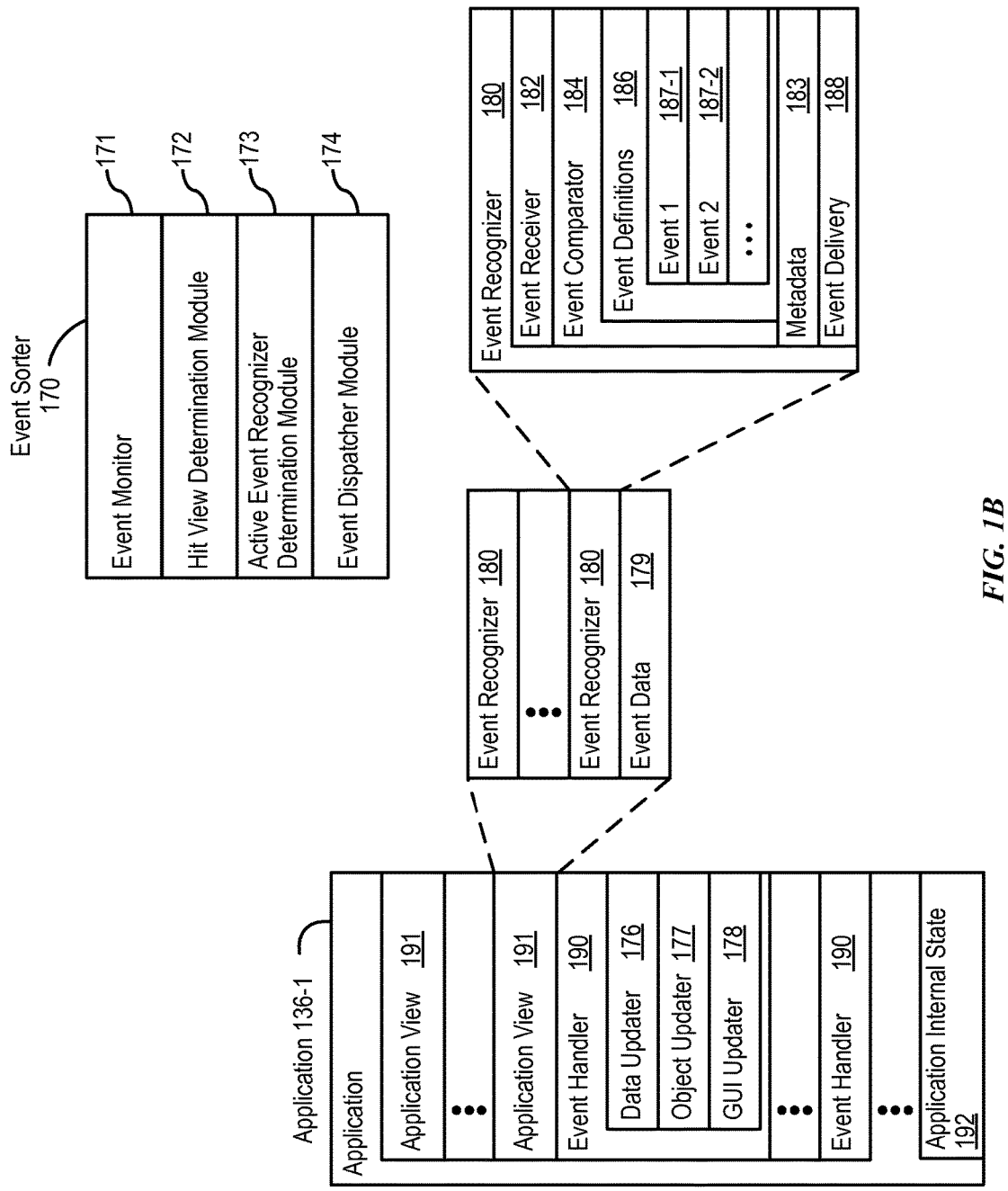
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 177 updates the telephone number used in contacts module 137, or stores a video file used in video player module. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
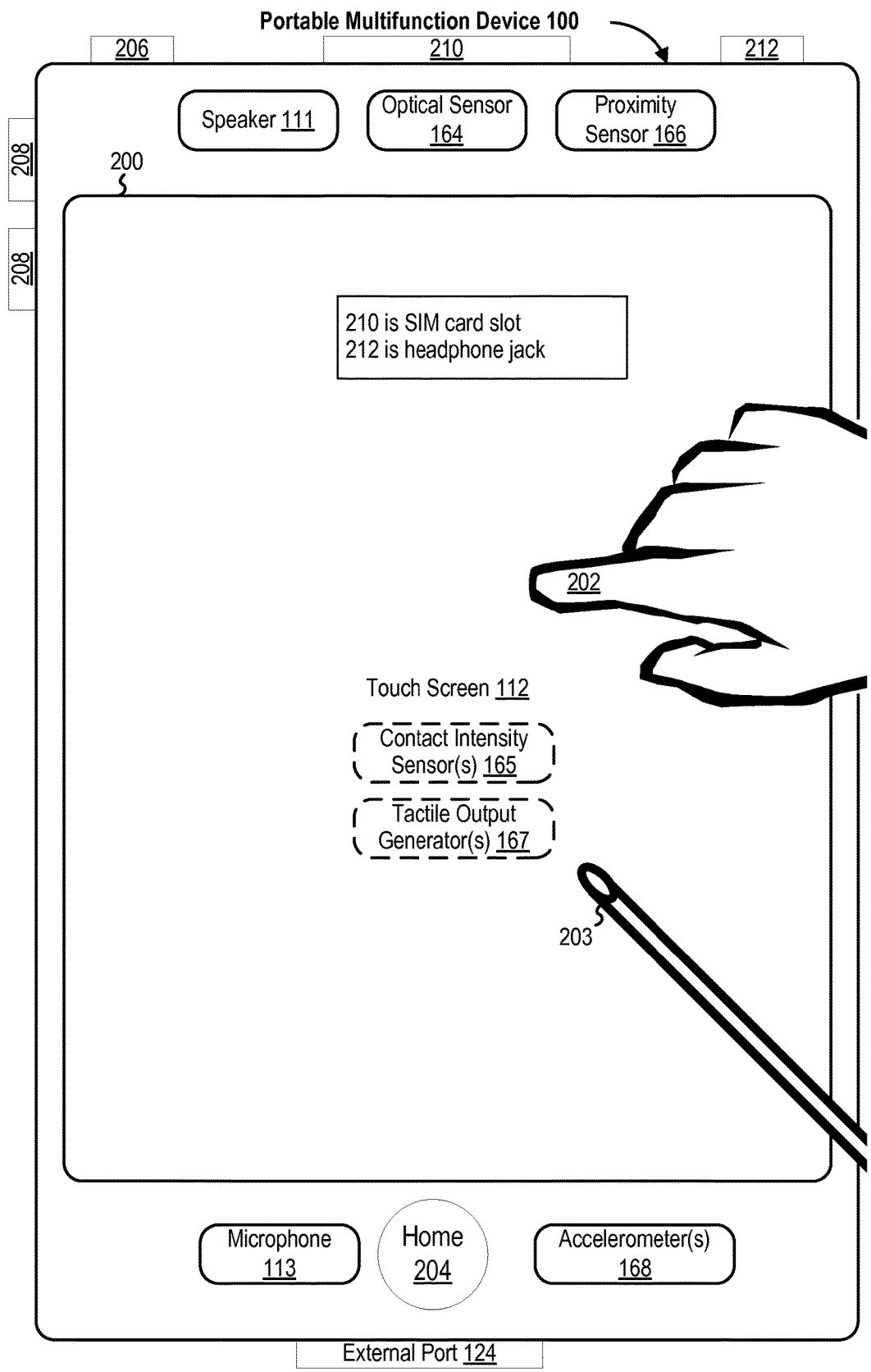
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
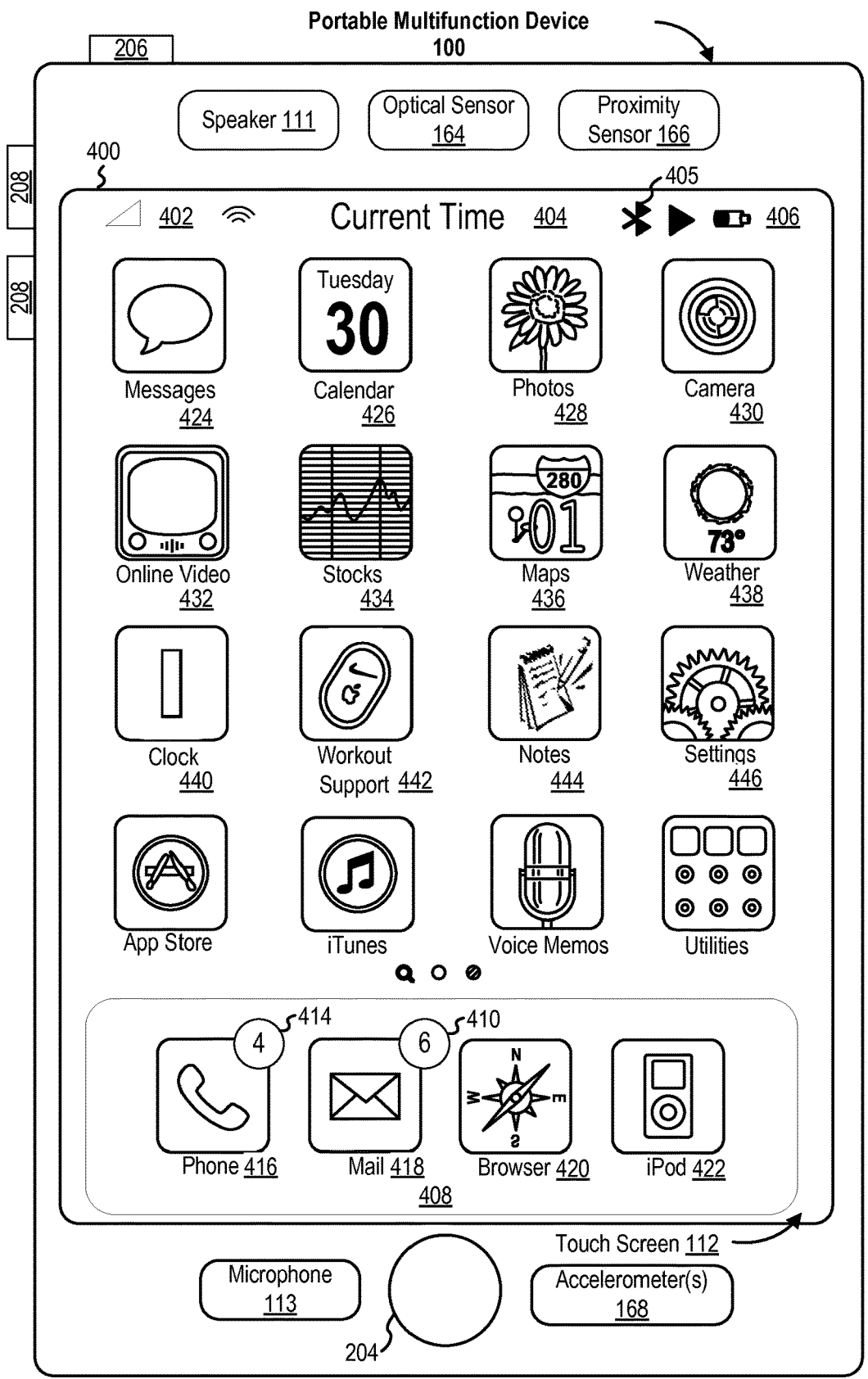
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
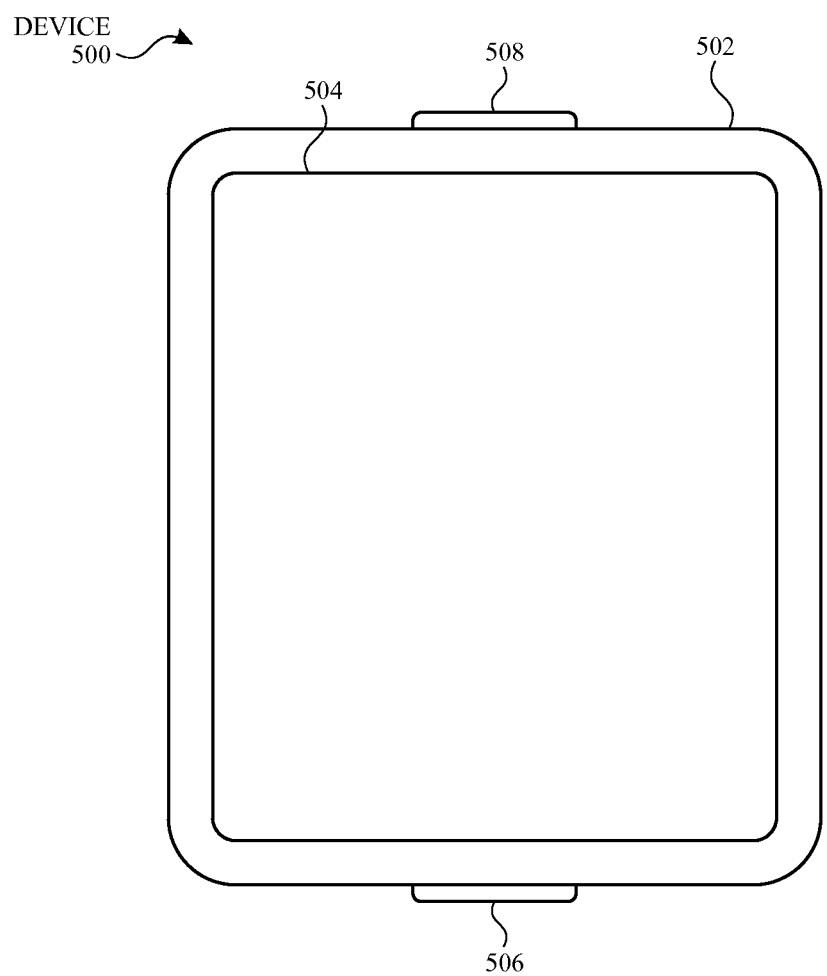
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
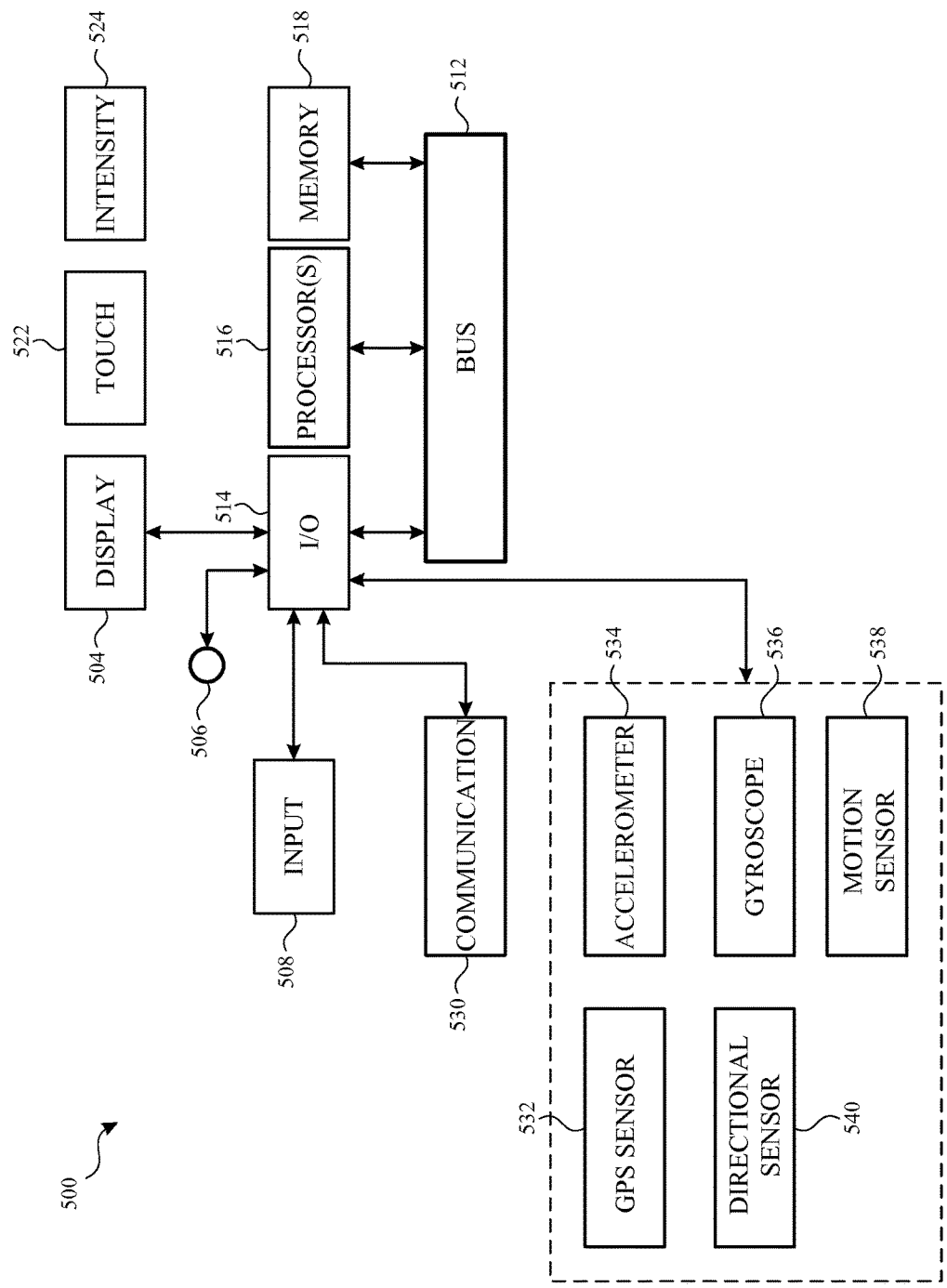
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 2000-2200 (FIGS. 20-22). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch-screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

Figure 5C:
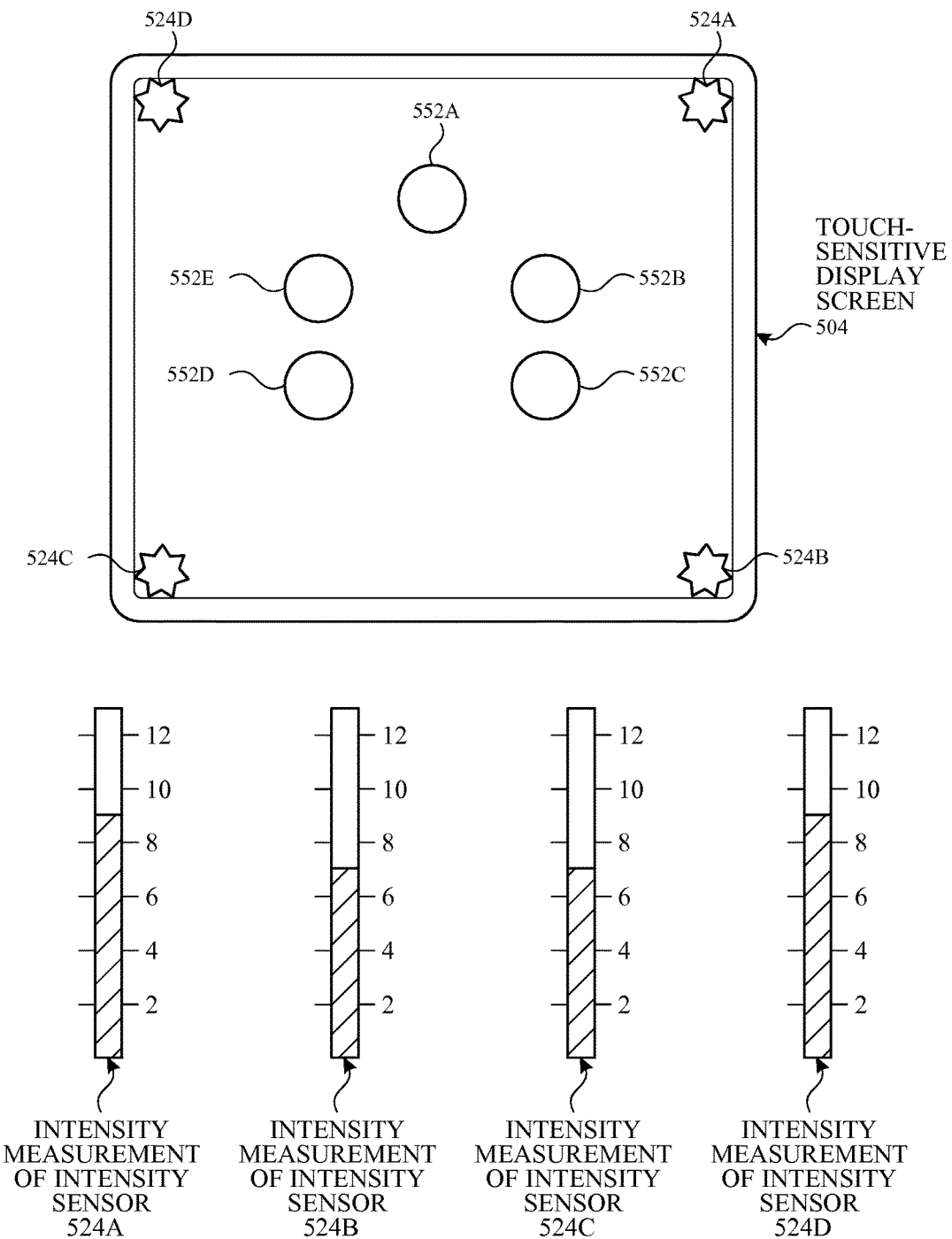
FIG. 5C illustrates detection of contacts with intensity sensors.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that may be implemented on a multifunction device with a display and a touch-sensitive surface, such as devices 100, 300, and/or 500, to improve a user's experience in viewing and managing dynamically updated application overview screens.

5. User Interfaces for Viewing Overviews of Application Information

Device 500 can display user interfaces for viewing overviews of information obtained from a variety of applications. An overview screen may represent an application and include a set of information obtained from the application. However, an overview screen is not part of the application itself; instead, an overview screen may provide a "snapshot" of data obtained from an application. In some embodiments, device 500 can display multiple overview screens representing multiple applications.

Examples of applications that may be represented by an overview screen include calendar applications, weather applications, map applications, stock market applications, music applications, fitness monitoring applications, system monitoring services (such as battery monitoring), system functions (such as a mute function) or other type of applications. In some embodiments, the application represented may be an installed application executing on device 500 that is not displayed on touchscreen 504. In some embodiments, the application may be executing on an external electronic device in communication with device 500, and device 500 may receive the set of information from the external device.

Figure 6A:
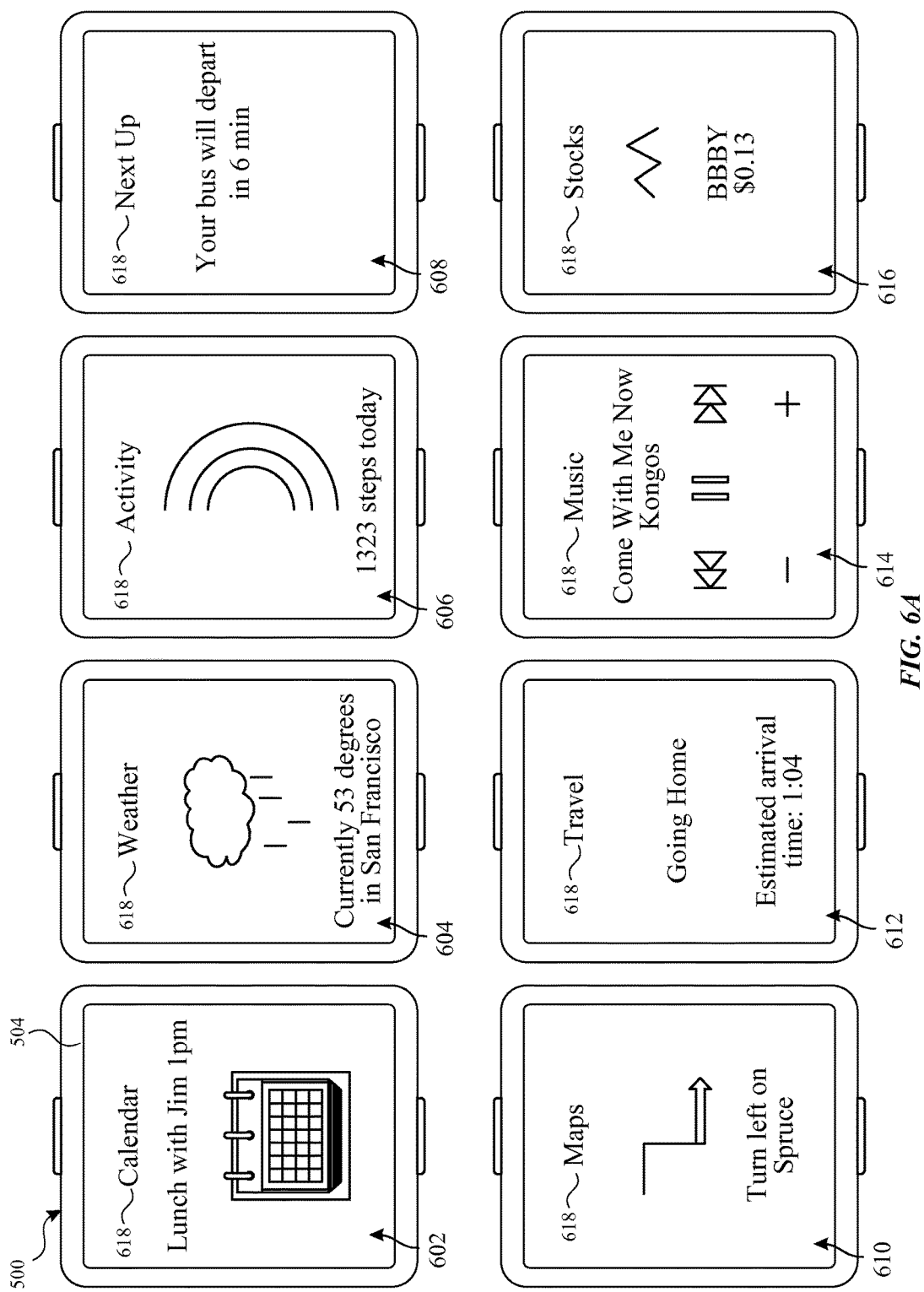
FIGS. 6A-6B illustrate exemplary user interfaces.

FIG. 6A depicts a set of exemplary overview screens 602-616 that can be displayed by device 500 on touchscreen 504. Each overview screen may represent an application and include a set of information obtained from the application. For example, calendar overview screen 602 represents a calendar application. The set of information displayed in calendar overview screen 602 includes an appointment time and description obtained from the calendar application. In some embodiments, a calendar overview screen may include a next upcoming appointment based on data obtained from a calendar application, for example. Weather overview screen 604 represents a weather application. The set of information displayed in the weather overview screen 604 includes current temperature and precipitation data obtained from the weather application.

In some embodiments, an overview screen can include an application affordance 618 for launching the application represented by the overview screen. In some embodiments, the application affordance can be a text label or an icon. In some embodiments, the overview screen itself serves as an affordance for launching the application.

Figure 6B:
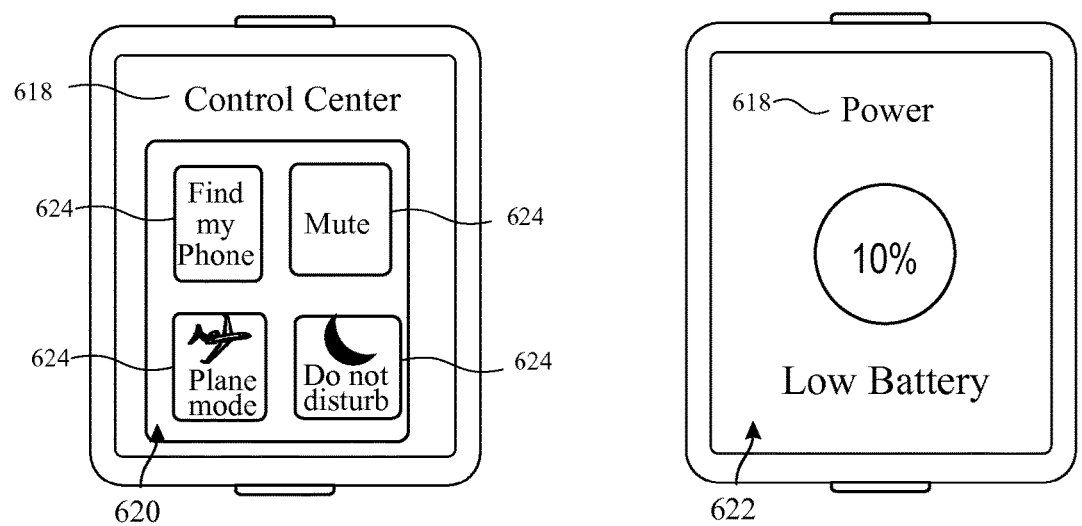

FIG. 6B depicts additional overview screens that can be displayed by device 500. As previously discussed, an application represented by an overview screen may be a service or function. In this case, the overview screen may include summary or control information related to that service or function. For example, overview screen 620 presents control information (in the form of control affordances 624) for controlling device 500 or an external device in communication with device 500. Overview screen 622 provides battery status information summarizing a battery status of device 500 or an external device. Other overview screens include other types of information obtained from the represented application.

Figure 7:
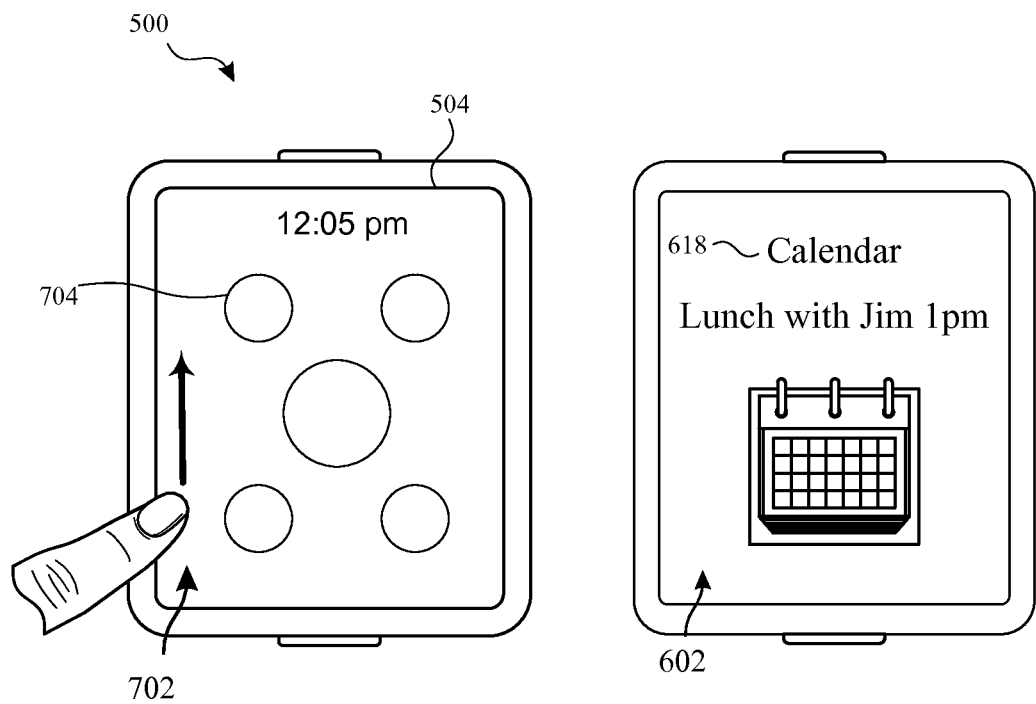
FIG. 7 illustrates an exemplary user interface.

In some embodiments, device 500 can display an overview screen in response to detecting a user input, such as a touch, tap, or swipe on touchscreen 504. For example, as depicted in FIG. 7, in response to detecting an upward swipe on touchscreen 504 while displaying home screen 702, device 500 can display an overview screen, such as overview screen 602. In some embodiments, device 500 can display an overview screen in response to detecting a tap on an affordance 704 on home screen 702, for example, or in response to a flick or swipe on touchscreen 504 (as depicted in FIG. 7).

Figure 11A:
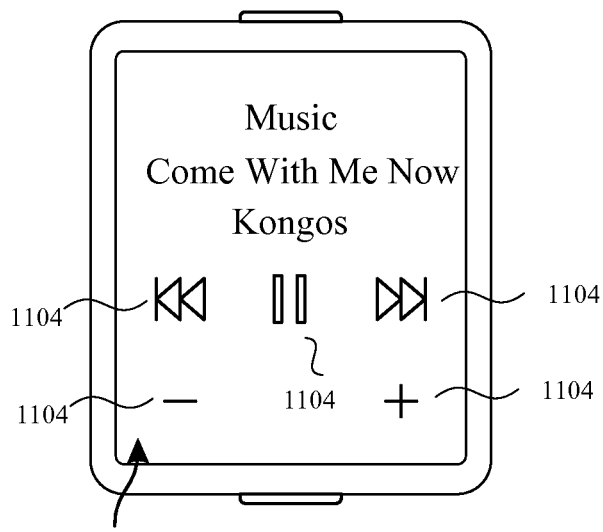
FIGS. 11A-11B illustrate exemplary user interfaces.
Figure 11B:
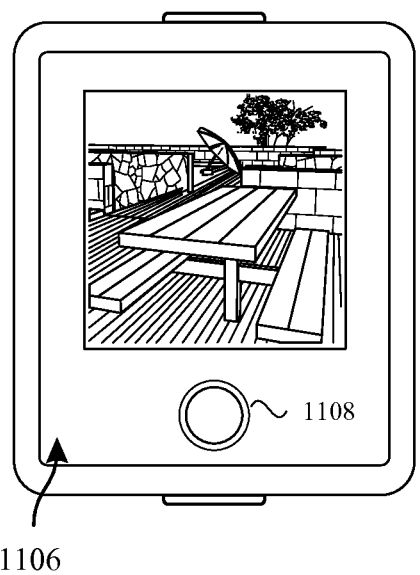

In some embodiments, the set of information displayed on an overview screen can be dynamically updated in accordance with data from the application. As depicted in FIGS. 8A-B, for example, as the weather application represented by the weather overview screen 604 updates the current weather data, the set of information displayed on the weather overview screen 604 may be dynamically updated in accordance with the data from the application. As another example, in some embodiments, device 500 can display a camera overview screen representing a camera application (as depicted in FIG. 11B, for example). The camera overview screen may include a live, dynamically updated preview of the camera viewfinder based on a set of information obtained from the camera application.

In some embodiments, an overview screen may be dynamically updated approximately continuously. In some embodiments, the overview screen may be updated at a predetermined time interval, such as every 5 seconds, for example.

As previously mentioned with respect to FIG. 6, in some embodiments, an overview screen may include an application affordance 618. In response to detecting a selection of application affordance 618, device 500 can launch the application (which, as previously discussed, may be a service or function) represented by the overview screen. In some embodiments, launching the application includes replacing display of the overview screen with display of the application.

In some embodiments, the overview screen itself may be an application affordance, such that device 500 can launch the application in response to detecting a contact on touchscreen 504 at a location that corresponds to any part of the overview screen.

Figure 9A:
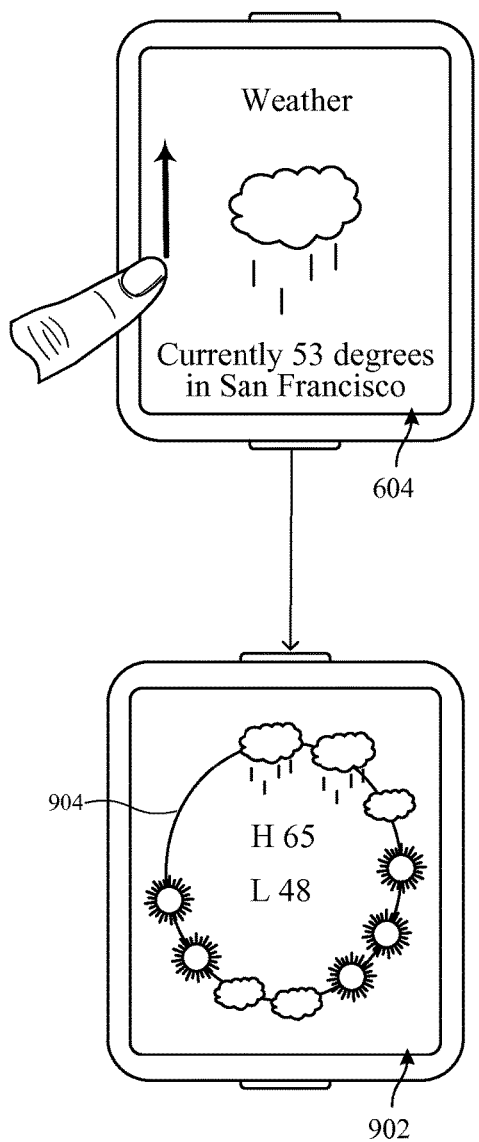
FIGS. 9A-9B illustrate exemplary user interfaces.
Figure 9B:
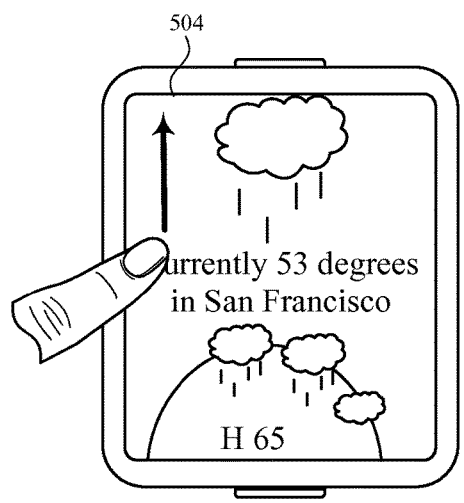

In some embodiments, in response to detecting a contact on touchscreen 504 at a location corresponding to a displayed overview screen, device 500 can display additional information obtained from the application represented by the overview screen. For example, as depicted in FIG. 9A, device 500 can initially display a weather overview screen 604 that includes the current temperature and precipitation status at the current location of device 500, where the current temperature and precipitation data is obtained from the weather application represented by the weather overview screen 604. In response to detecting a contact on the weather overview screen 604, such as an upward swipe, device 500 can respond by providing additional information based on data obtained from the weather application. In the example of FIG. 9A, the additional information includes a user interface object 904 indicating a ten-hour weather forecast and a daily high and low temperature. In some embodiments, in response to detecting the contact, device 500 can discretely replace display of the first set of information with the second set of information. In some embodiments, as depicted in FIG. 9B, in response to detecting the contact, device 500 can replace display of the first set of information with display of the second set of information by scrolling the first set of information off of touchscreen 504 while scrolling the second set of information onto touchscreen 504 adjacent to the first set of information.

In some embodiments, the contact for displaying the additional information may be a touch or tap on the overview screen. In some embodiments, the contact may be a vertical or horizontal swipe on touchscreen 504. In some embodiments, a user may touch or tap an overview screen to launch the application represented by the overview screen (as described earlier), and swipe the overview screen to display more detailed information obtained from the application.

In some embodiments, device 500 can dynamically update the additional information (e.g., affordance 904 in FIG. 9A) in accordance with data from the application, in the same manner as described previously with respect to FIGS. 8A-B.

Figure 10:
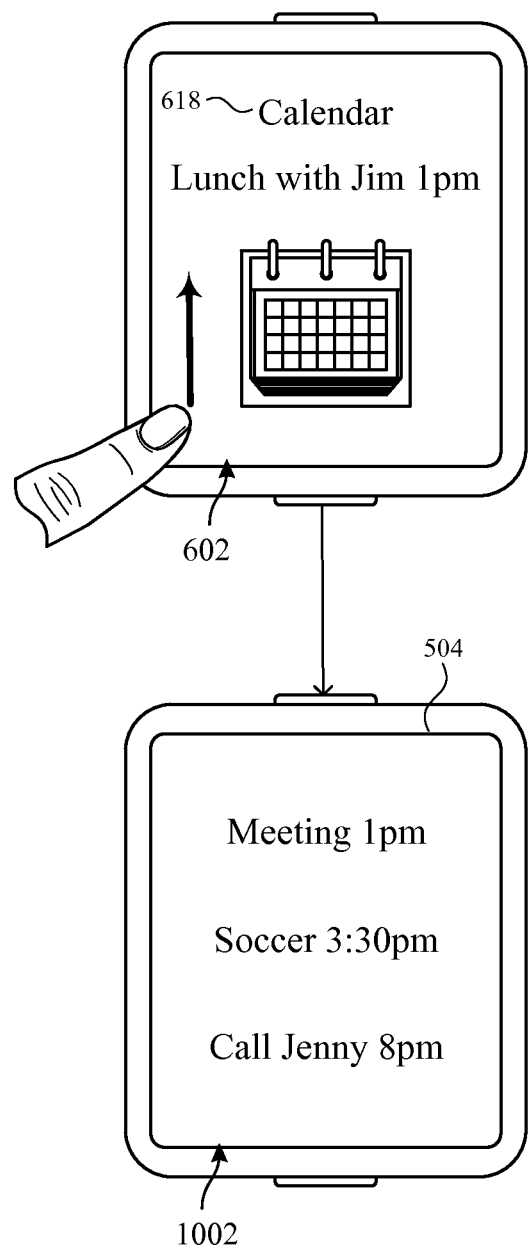
FIG. 10 illustrates an exemplary user interface.

FIG. 10 depicts another exemplary overview screen, calendar overview screen 602. Calendar overview screen includes application affordance 618 for launching a calendar application represented by calendar overview screen 602. In this example, the information displayed on the calendar overview screen 602 is the next upcoming appointment, obtained from the calendar application represented by the calendar overview. In response to detecting an upward swipe on the calendar overview 602, device 500 can display additional detailed information based on data obtained from the calendar application on screen 1002. In this example, the additional information includes upcoming meetings and appointments obtained from the calendar application.

In some embodiments, an overview screen displaying the additional information may serve as an application affordance, such that a contact anywhere on the overview screen launches the application represented by the overview screen. For example, calendar overview screen 1002 may be an application affordance. In response to detecting a contact on touchscreen 504 at a location corresponding to overview screen 1002, device 500 can launch the application represented by calendar overview screen 1002.

In some embodiments, an overview screen may be part of a set of overview screens representing a set of multiple applications, such as the set of overview screens depicted in FIGS. 6A-B. Thus, in some embodiments, in response to detecting a user input invoking display of an overview screen as described with respect to FIG. 7, device 500 can select an initial overview screen to display from the set of overview screens. For example, in some embodiments, device 500 can select the most recently displayed overview screen from the set of overview screens to display in response to a user input invoking display of an overview screen.

In some embodiments, the set of overview screens may be an ordered set. That is, each overview screen may be associated with a relative position in the ordered set of overview screens, ranging from the first position to the last position. In this case, in response to detecting a user input for invoking an overview screen, device 500 can select a particular overview screen from the set to display based on a positions of the overview screens in the set. For example, in some embodiments, device 500 can select the overview screen in the first position of the set for display. In some embodiments, a user can configure the order of the overview screens to control which overview screen is initially displayed when the display of an overview screen is invoked.

6. Interactive Overview Screens

In some embodiments, a user can interact with an application via an overview screen to control the application represented by the overview screen. For example, as depicted in FIG. 11A, music overview screen 1102 includes transport control affordances 1104 for controlling a media player application represented by overview screen 1102. Transport controls may include play, pause, fast forward, reverse, and volume controls, for example. In response to detecting a selection of a transport control affordance 1104, device 100 can provide data to the media player application to cause the media player application to perform the operation indicated by the selected transport control affordance.

Similarly, as depicted in FIG. 11B, a camera overview screen 1106 may provide one or more camera control affordances for controlling a camera application. For example, a camera overview screen 1106 may provide a shutter control affordance 1108 which, when selected, causes device 500 to provide data to the camera application to cause the camera to capture an image.

In some embodiments, device 500 can provide the data to an installed application executing on device 500. In some embodiments, device 500 can provide the data to an application executing on an external device that is in communication with device 500.

7. Context-Dependent Overview Screens

In some embodiments, the information obtained from an application and displayed in an overview screen may be context-dependent; that is, the information may depend upon an operating context of device 500. For example, the maps overview screen 1202 depicted in FIG. 12A may display driving directions 1204 if the represented map application is currently providing driving directions. Alternatively, if the map application is not currently providing driving directions, as depicted in FIG. 12B, the map overview screen 1202 may instead display a current location 1206 of device 500 (as determined by a GPS sensor on device 500, for example).

Similarly the navigation overview screen 1208 depicted in FIG. 12C may display the time 1210 of an upcoming bus departure if device 500 determines that the user typically takes a bus at a particular time and/or location, and that device 500 is currently at that time and/or location. If device 500 instead determines that the user is already in transit, then as depicted in FIG. 12D, device 500 may display an estimated arrival time 1210 on navigation overview screen 1208.

In some embodiments, device 500 can determine an operating context based on contextual data. Such contextual data may include, for example, data from sensors, such as GPS, accelerometer, gyro, direction, or motion sensors. Contextual data may include time or date data, historic device usage data, association with a network or connection to one or more devices, application status data (e.g., active or inactive), and/or data obtained from one or more applications, such as calendar or travel applications. Such data may include, for example, appointments or reservations. A person of skill in the art will understand that there are many other types of contextual data that device 500 may use to determine a context of device 500.

In some embodiments, an overview screen can represent one application if device 500 is operating in a first context, and another (different) application if device 500 is operating in a second context. For example, if device 500 is operating in a first context, the navigation overview may represent a map application. If device 500 is operating in a second context, the navigation overview may represent an airline flight status application. For example, in FIG. 12 C, the navigation overview may represent a transit status application. In FIG. 12D, the navigation overview may represent the transit status application or a map application.

8. Switching Between Overview Screens

Figure 13:
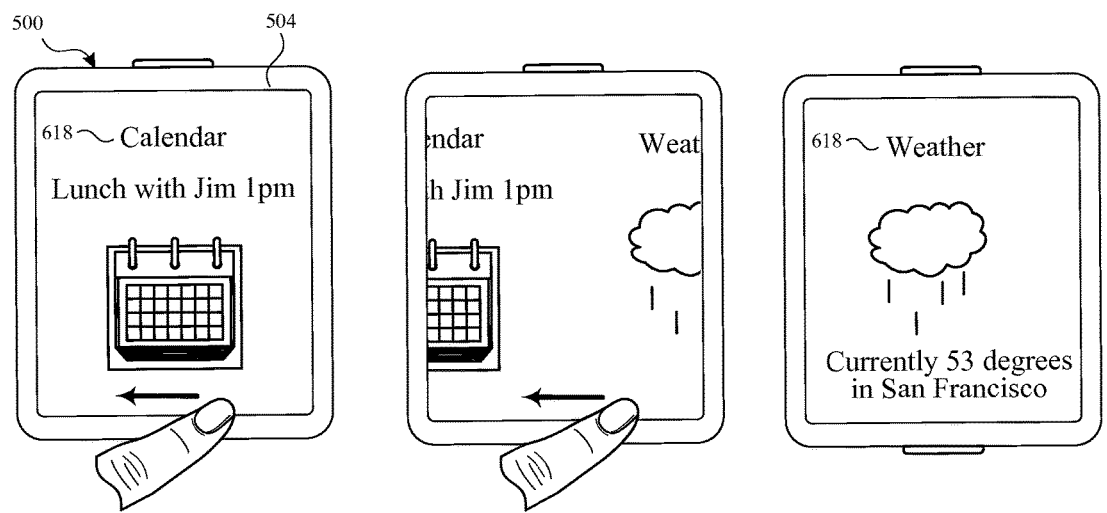
FIG. 13 illustrates an exemplary user interface.

As previously discussed, in some embodiments, an overview screen may be part of a set of overview screens, such as the set depicted in FIGS. 6A-B. In this case, a user may wish to switch between various overview screens to display information obtained from different applications. In some embodiments, while displaying a first overview screen, device 500 can switch to a second overview screen in response to detecting a swipe or flick on touchscreen 504. In some embodiments, device 500 can replace display of a first overview screen with display of a second overview screen in response to detecting a horizontal swipe on touchscreen 504. In some embodiments, as depicted in FIG. 13, replacing display of a first overview screen with display of a second overview screen involves translating the first overview screen off of touchscreen 504 while simultaneously translating the second overview screen onto touchscreen 504, such that portions of both overview screens are temporarily displayed on touchscreen 504 at the same time. In some embodiments, a right-to-left horizontal swipe on touchscreen 504 while displaying a second overview screen can cause device 504 to replace the second overview screen with a third overview screen having a position that is immediately after the first overview screen in the ordered set of overview screens. Similarly, a left-to-right swipe can cause device 500 to replace the second overview screen with a first overview screen having a position that is immediately before the first overview screen in the ordered set of overview screens. Thus, in some embodiments, device 500 can horizontally scroll through overview screens in the order in which they appear in the ordered set of overview screens.

In some embodiments, switching from a first overview screen to a second overview screen involves overlaying the second overview screen on the first overview screen, such that a portion of the first overview screen is still visible. In some embodiments, switching from a first overview screen to a second overview screen involves changing the focus of device 500 from the first overview screen to the second overview screen, or by centering the second overview screen on touchscreen 504. In such cases, a portion of the first overview screen may still be visible after switching to the second overview screen.

9. Adding, Deleting, and Reordering Overview Cards

In some cases, a user may wish to add, delete, or rearrange overview screens in an ordered set of overview screens, so that they can be accessed and viewed in a different order. For example, a user may wish to reorder the set of overview screens so that a different first overview screen appears when the overview screen is initially invoked as described with respect to FIG. 7. Furthermore, a user may wish to add an overview screen to the set of overview screens to represent an application that has been newly installed on device 500, or delete an overview screen that is rarely needed.

In some embodiments, device 500 can display an overview screen dashboard to allow a user to add, delete, or reorder overview screens in an ordered set. In some embodiments, the dashboard can display a reduced-size version of multiple overview screens, in the order in which they appear in the ordered set, so that a user can easily review and update the current set of overview screens.

Figure 14:
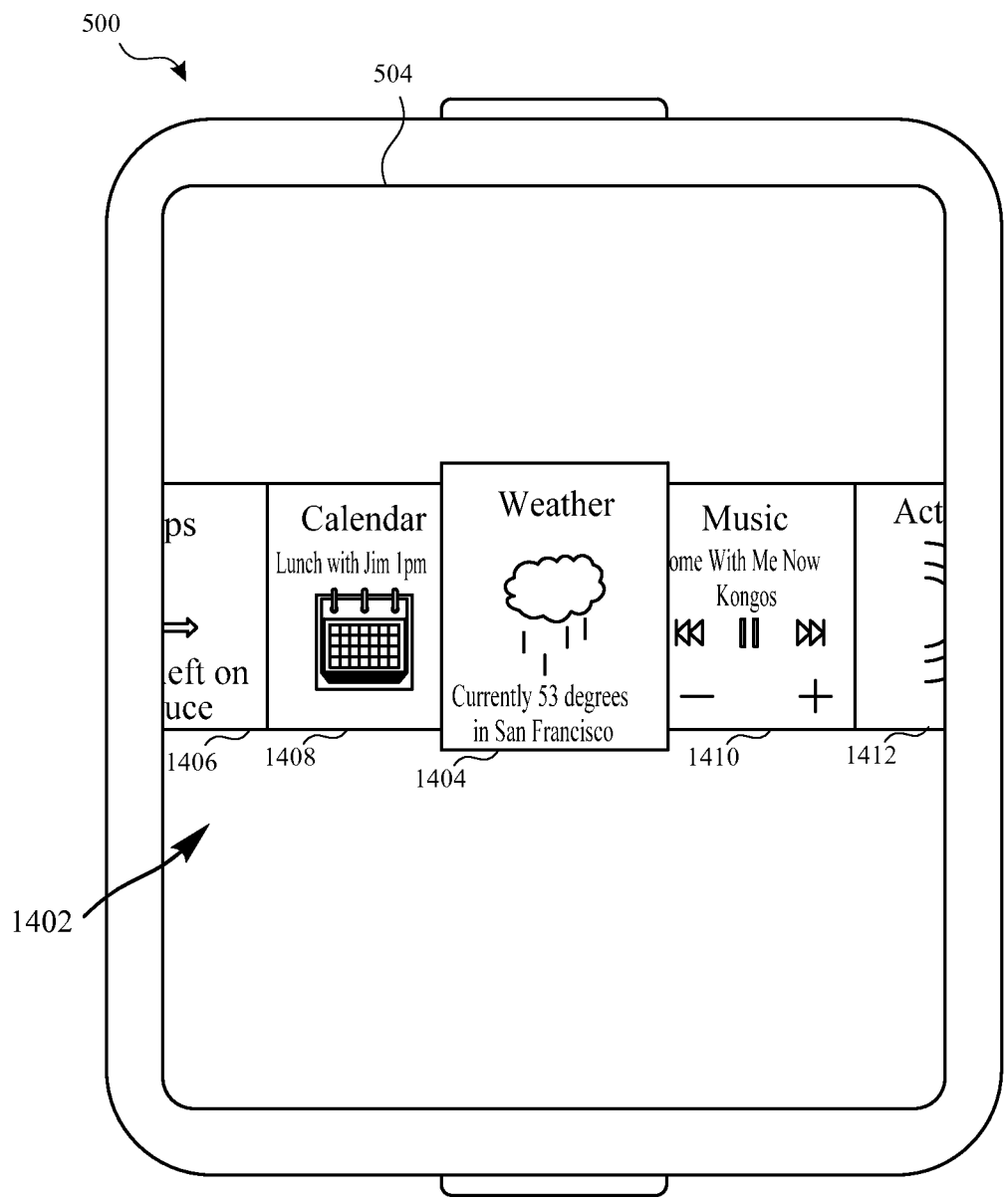
FIG. 14 illustrates an exemplary user interface.

FIG. 14 depicts an exemplary overview screen dashboard 1402 for adding, deleting, or reordering overview screens. In some embodiments, device 500 can display dashboard 402 in response to detecting a contact on a displayed overview screen, such as described with respect to FIGS. 7-13. In some embodiments, in response to detecting a contact on touchscreen 504 at a location corresponding to an overview screen, device 500 can determine whether a characteristic intensity of the contact is greater than a threshold intensity. If so, device 500 can display dashboard 1402. If device 500 determines that the characteristic intensity is below the threshold intensity, device 500 can instead respond in another manner, such as by displaying additional information (as described with respect to FIGS. 9A, 9B, and 10), for example. Thus, in some embodiments, a user may invoke display of a dashboard with a hard press on touchscreen 504, and invoke display of additional information with a softer touch, tap, or swipe on touchscreen 504.

The dashboard 1402 depicted in FIG. 14 includes five overview screens 1404-1412 displayed at a reduced size and horizontally adjacent across touchscreen 504. In some embodiments, the dashboard includes a central overview screen 1404 that is displayed at a larger size than the other overview screens. In some embodiments, the central overview screen is the overview screen that was displayed when the user interface was invoked. Thus, in this example, the dashboard 1402 may have been invoked while the weather overview screen 1404 was displayed. In some embodiments, the dashboard can be horizontally scrolled to display additional overview screens. In some embodiments, the central overview screen may change in accordance with the horizontal scroll; that is, if the dashboard is scrolled to the left, the music overview screen 1410 may become the central overview screen. In some embodiments, the central overview screen is the "focus" of the dashboard, and when the user exits the dashboard, display of the dashboard is replaced by display of the central overview screen 1404.

Figure 15A:
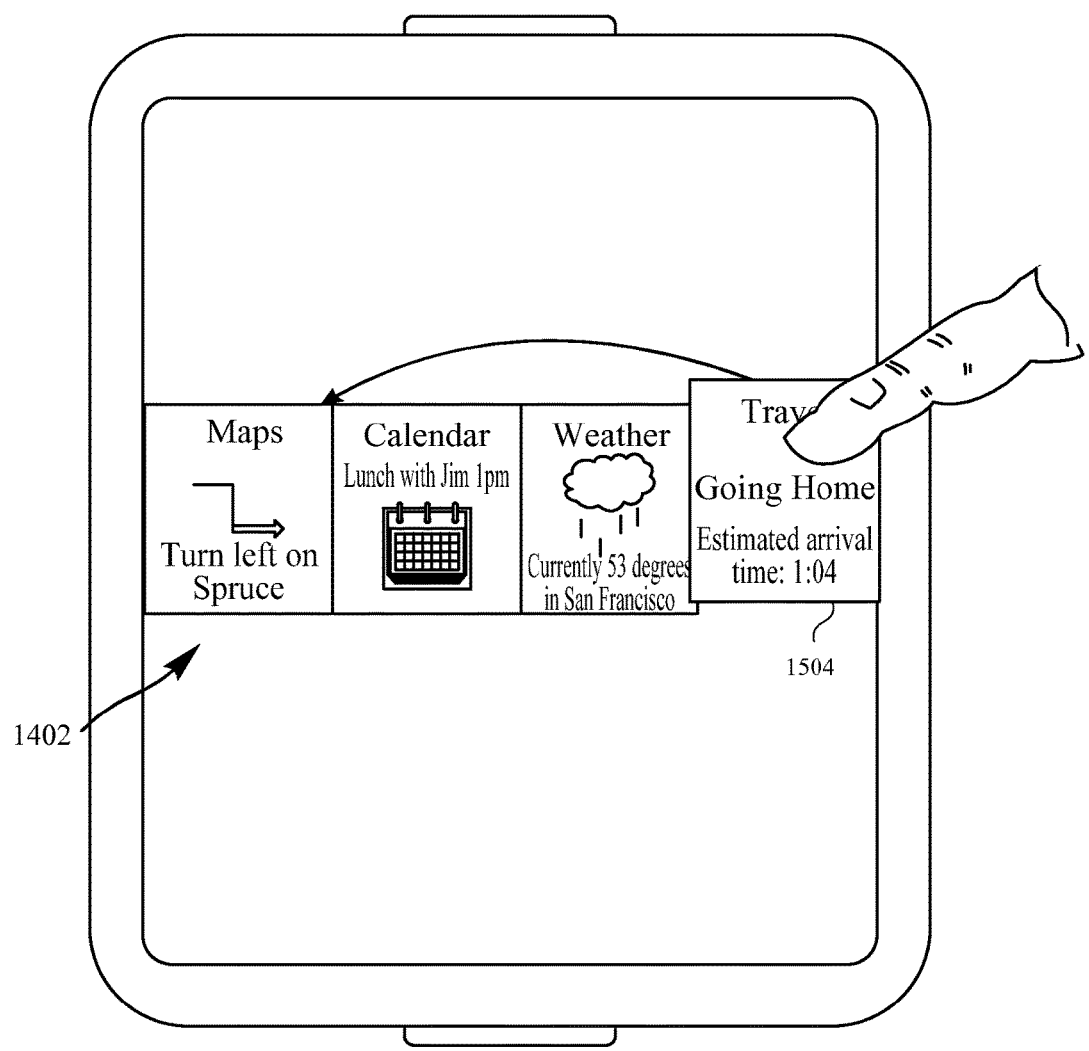
FIGS. 15A-15B illustrate exemplary user interfaces.
Figure 15B:
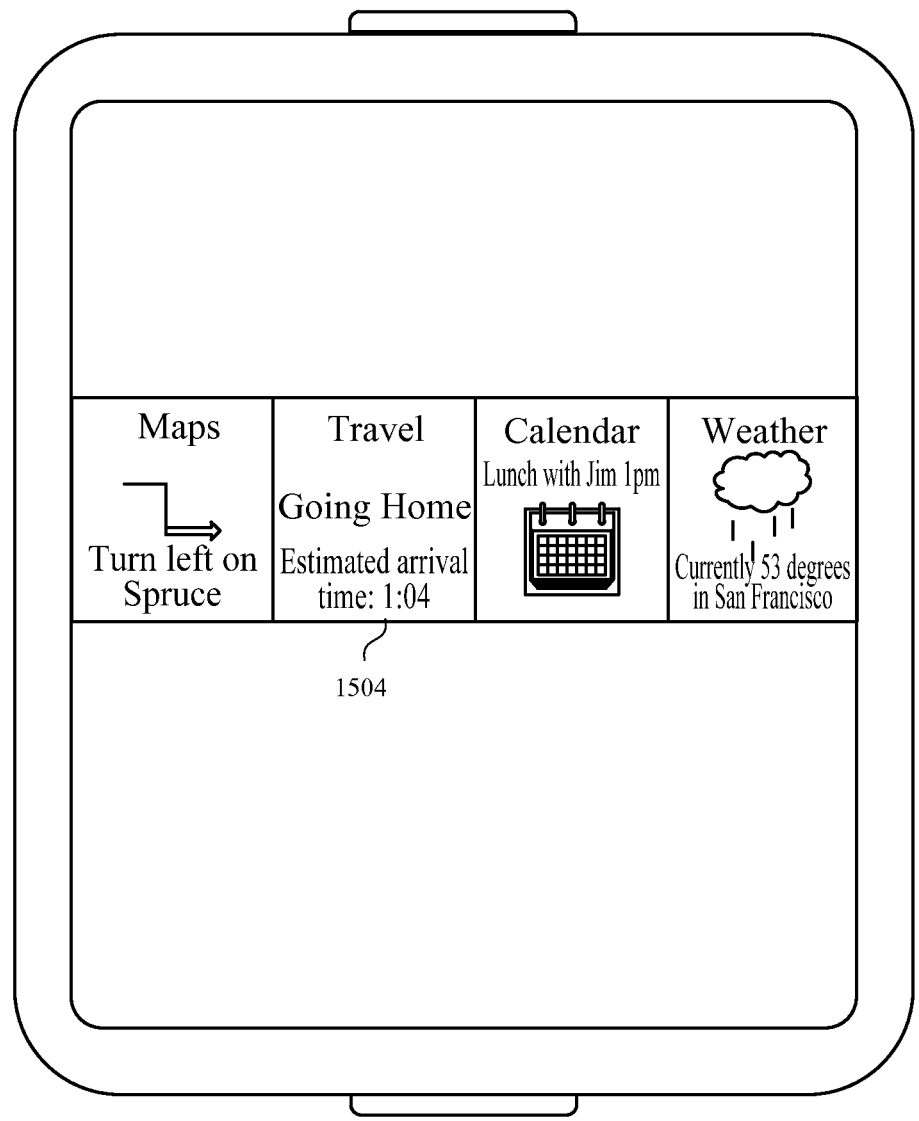

As depicted in FIGS. 15A-B, in some embodiments, in response to detecting a touch-and-drag contact on overview screen 1504 in dashboard 1402 that drags the overview screen 1504 to a new position in the dashboard, device 500 can update the position of overview screen 1504 in the dashboard and also change its position correspondingly in the ordered set of overview screens. FIG. 15A depicts the dashboard 1402 with overview screens in an initial order. FIG. 15B depicts the dashboard updated with the new position of overview screen 1504.

Figure 16:
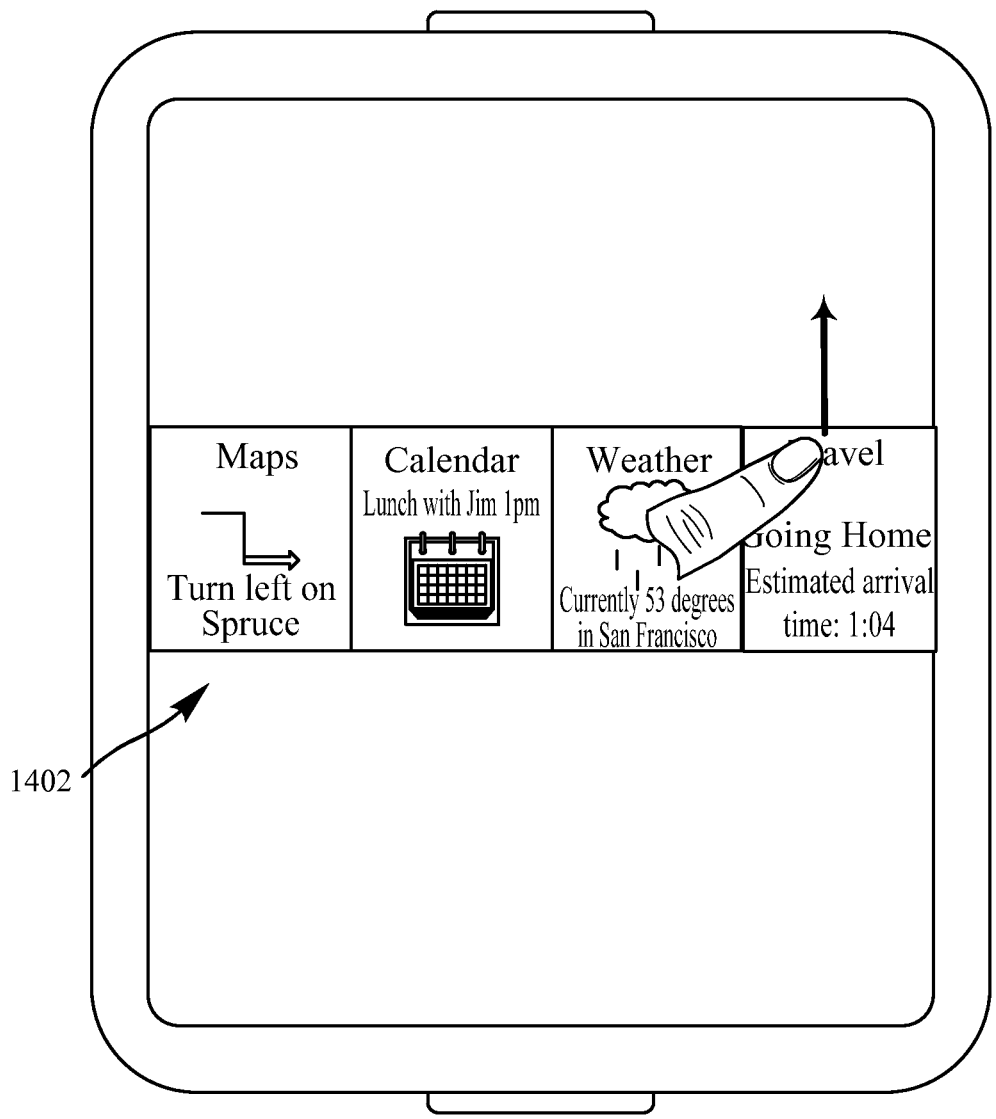
FIG. 16 illustrates an exemplary user interface.

In some embodiments, device 500 can delete an overview screen from the set of overview screens in response to detecting an upward swipe on touchscreen 504 starting at a location that corresponds to the location of the overview screen in the dashboard, such as depicted in FIG. 16. In some embodiments, an overview screen that is deleted from the set of overview screens is subsequently excluded from being displayed in the dashboard, and from being displayed in response to a user input invoking display of an overview screen.

Figure 17:
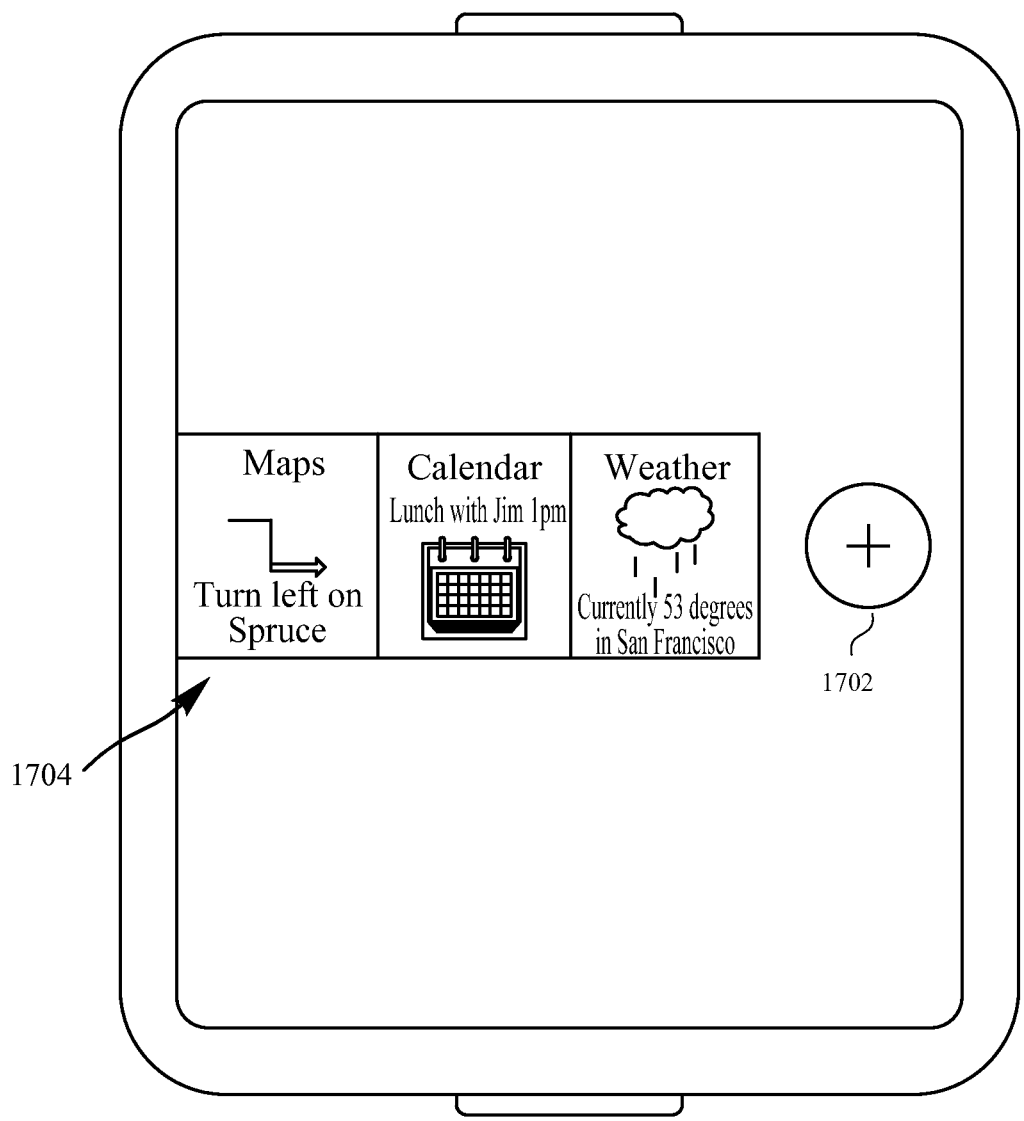
FIG. 17 illustrates an exemplary user interface.
Figure 18:
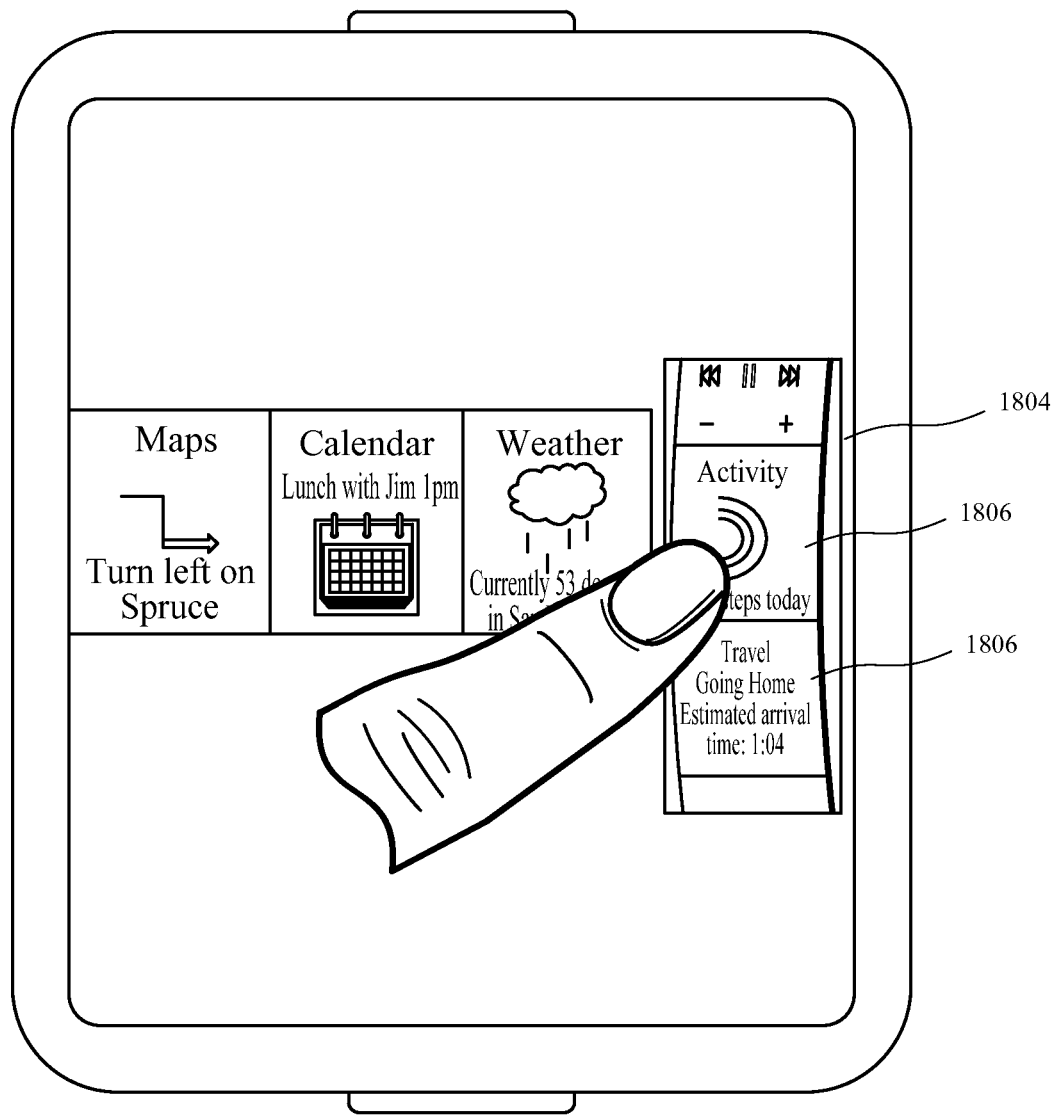
FIG. 18 illustrates an exemplary user interface.

As depicted in FIG. 17, in some embodiments, device 100 can display an add affordance 1702 at the end of an overview screen dashboard 1704 for adding an overview screen to the ordered set of overview screens. In response to detecting a user selection of the add affordance 1702, as depicted in FIG. 18, device 100 can display a user interface 1804 for selecting a new overview screen 1806 that may be added to the ordered set of overview screens and displayed in the overview screen dashboard. User interface 1804 is a rotatable carousel of overview screens. In some embodiments, the user interface may instead be a list of overview screens, for example.

Figure 19:
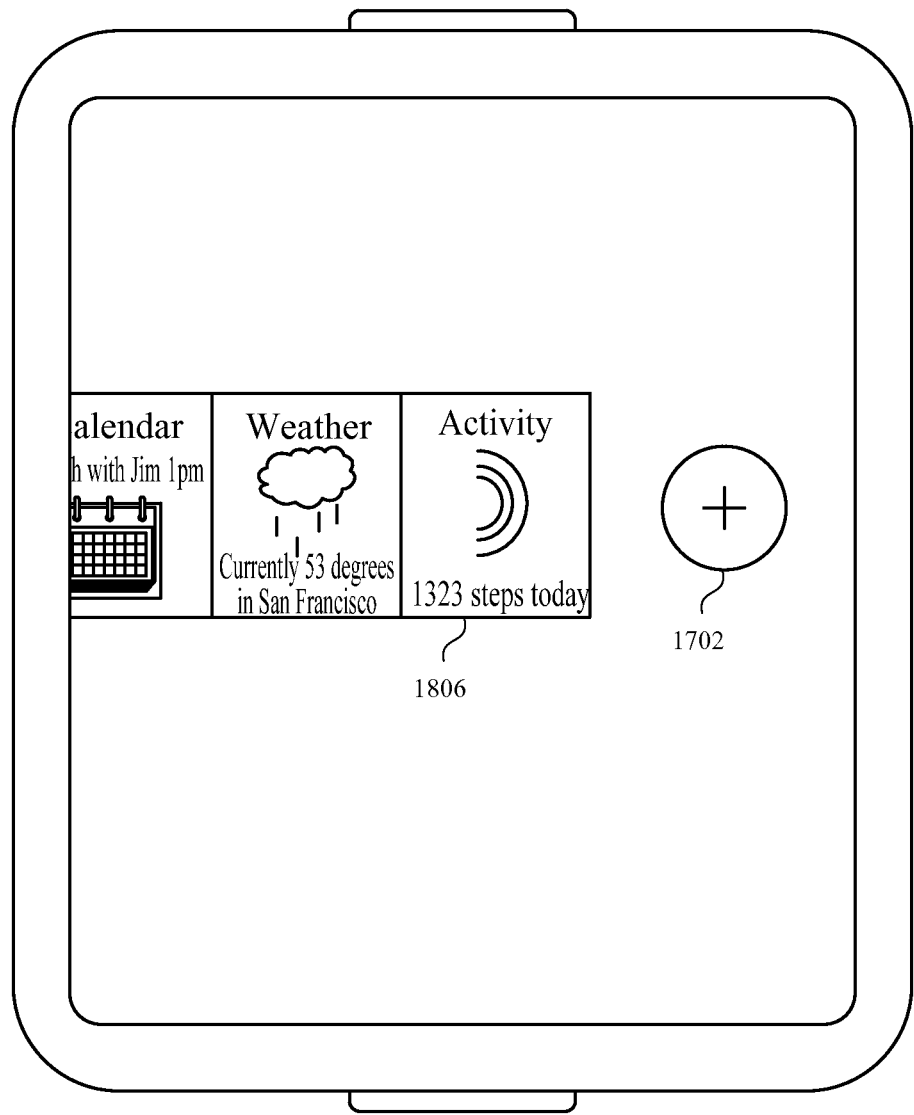
FIG. 19 illustrates an exemplary user interface.

In response to detecting a selection of a new overview screen 1806 from user interface 1804, device 100 can display the new overview screen 1806 at the end of the overview screen dashboard and add the new overview screen to the ordered set of overview screens in the last position. As depicted in FIG. 19, in some embodiments, device 500 can re-display the add affordance 1702 in the dashboard adjacent to the new overview screen 1806 to allow a user to add additional overview screens.

The user may wish to exit the dashboard in order to return to display of an overview screen, for example, or to return to a home screen. In some embodiments, in response to detecting a contact on touchscreen 504 while displaying an overview screen dashboard, device 500 can determine whether a characteristic intensity of the contact is above a threshold intensity. If the characteristic intensity is above the threshold, device 500 can replace display of the dashboard with display of an overview screen, such as the central overview screen or another overview screen. Thus, in some embodiments, a user may exit the dashboard by performing a hard press on touchscreen 504.

In some embodiments, in response to detecting a depression of a depressible and rotatable input mechanism on device 500 (such as depicted in FIG. 5A, at element 506) while displaying an overview screen dashboard, device 500 can replace display of the dashboard with display of a home screen, such as home screen 702 depicted in FIG. 7. In some embodiments, a home screen is different from the overview screens in the set of overview screens.

In some embodiments, device 500 can automatically delete an overview screen from the set of overview screens if it is accessed less frequently than a threshold frequency. For example, if an overview screen has not been accessed in six months, or has historically been accessed less than once per month over a three-month period, then device 500 may automatically delete the overview screen from the set. Similarly, in some embodiments, device 500 can automatically re-order an ordered set of overview screens so that frequently viewed overview screens are moved to earlier positions in the set.

10. Processes for Managing Overview Screens

FIG. 20 is a flow diagram illustrating process 2000 for managing application overview screens. Process 2000 may be performed at an electronic device with a display and a touch-sensitive surface, like device 100, 300, or 500 (FIGS. 1-5B). At block 2002, the device detects a contact on the touch-sensitive display. At block 2004, in response to detecting the contact, the device displays a user interface screen representing a corresponding application or other summary screen. The user interface screen comprises an affordance for launching the application, and a set of information obtained from the application. The set of information is updated in accordance with data from the application. Optionally, the device detects a second contact on the touch-sensitive display. In response to detecting the second contact, the device displays a second set of information obtained from the application. The second set of information is updated in accordance with data from the application.

Note that details of the processes described above with respect to process 2000 (e.g., FIGS. 20 and 7-10) are also applicable in an analogous manner to the other processes described herein. For example, processes 2100 and 2200 may include one or more of the characteristics of the various processes described above with reference to process 2000. For brevity, these details are not repeated in the descriptions of the other processes. The various methods and techniques described above with reference to method 2000 may be optionally implemented as one or more units, such as those described with regard to FIG. 23.

Figure 21:
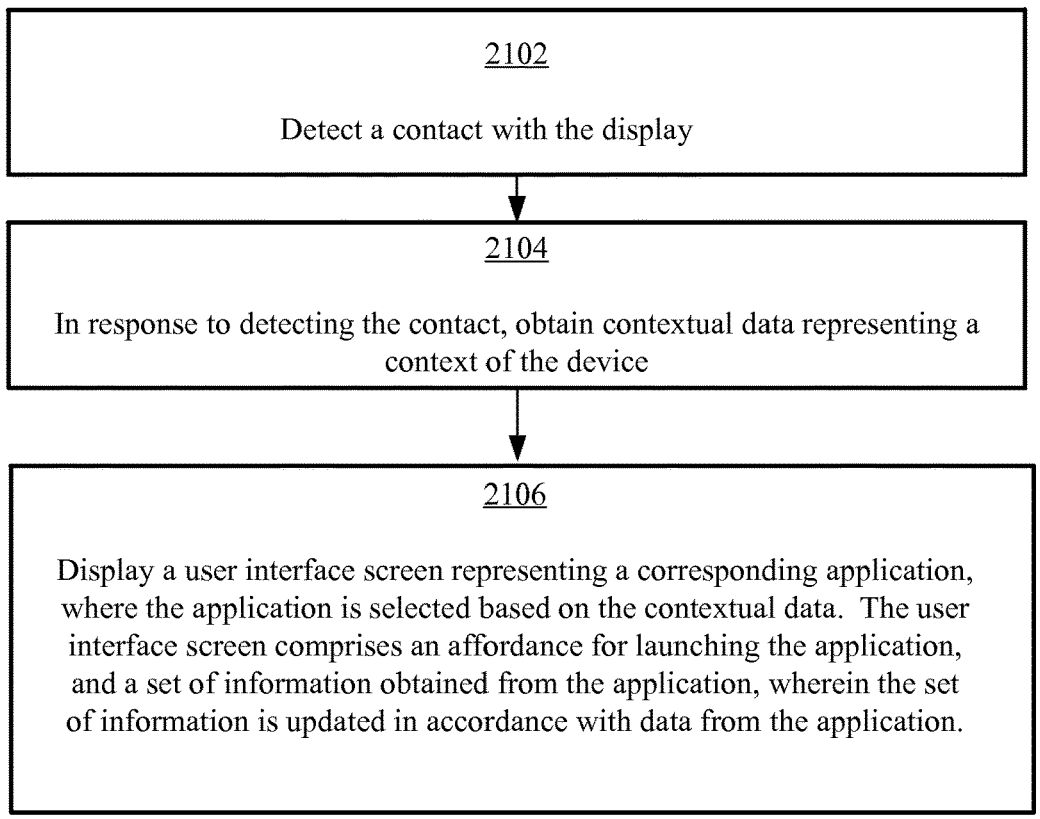
FIG. 21 illustrates an exemplary process for managing application overview screens.

FIG. 21 is a flow diagram illustrating process 2100 for managing application overview screens. Process 2100 may be performed at an electronic device with a display and a touch-sensitive surface, like device 100, 300, or 500 (FIGS. 1-5B). At block 2102, the device detects a contact on the touch-sensitive display. At block 2104, in response to detecting the contact, the device obtains contextual data representing a context of the device. At block 2106, the device displays a user interface screen representing a corresponding application, wherein the application is selected based on the contextual data. The user interface screen includes an affordance for launching the application, and a set of information obtained from the application, wherein the set of information is updated in accordance with data from the application.

Note that details of the processes described above with respect to process 2100 (e.g., FIGS. 21 and 12A-D) are also applicable in an analogous manner to the other processes described herein. For example, processes 2000 and 2200 may include one or more of the characteristics of the various processes described above with reference to process 2100. For brevity, these details are not repeated in the descriptions of the other processes. The various methods and techniques described above with reference to method 2100 may be optionally implemented as one or more units, such as those described with regard to FIG. 23.

FIG. 22 is a flow diagram illustrating process 2200 for managing application overview screens. Process 2200 may be performed at an electronic device with a display and a touch-sensitive surface, like device 100, 300, or 500 (FIGS. 1-5B). At block 2202, the device detects a contact on the touch-sensitive display. At block 2204, in response to detecting the first contact, the device displays a first user interface screen of an ordered set of user interface screens. The set of user interface screens represents a set of applications. The first user interface screen comprises a first affordance for launching a first application of the set of applications, and a first set of information obtained from the first application. The first set of information is updated in accordance with data from the first application. At block 2206, the device detects a second contact on the touch-sensitive display. In response to detecting the second contact, determine whether the characteristic intensity of the second contact is above a threshold intensity. At block 2210, in accordance with a determination that the characteristic intensity of the second contact is above the threshold intensity, the device displays a user interface for reordering the set of user interface screens. At block 2212, in accordance with a determination that the characteristic intensity of the second contact is below the threshold intensity, and in response to detecting the second contact at a location on the display corresponding to the first affordance, the device launches the first application.

Note that details of the processes described above with respect to process 2200 (e.g., FIGS. 22 and 14) are also applicable in an analogous manner to the other processes described herein. For example, processes 2000 and 2100 may include one or more of the characteristics of the various processes described above with reference to process 2200. For brevity, these details are not repeated in the descriptions of the other processes. The various methods and techniques described above with reference to method 2200 may be optionally implemented as one or more units, such as those described with regard to FIG. 23.

Figure 23:
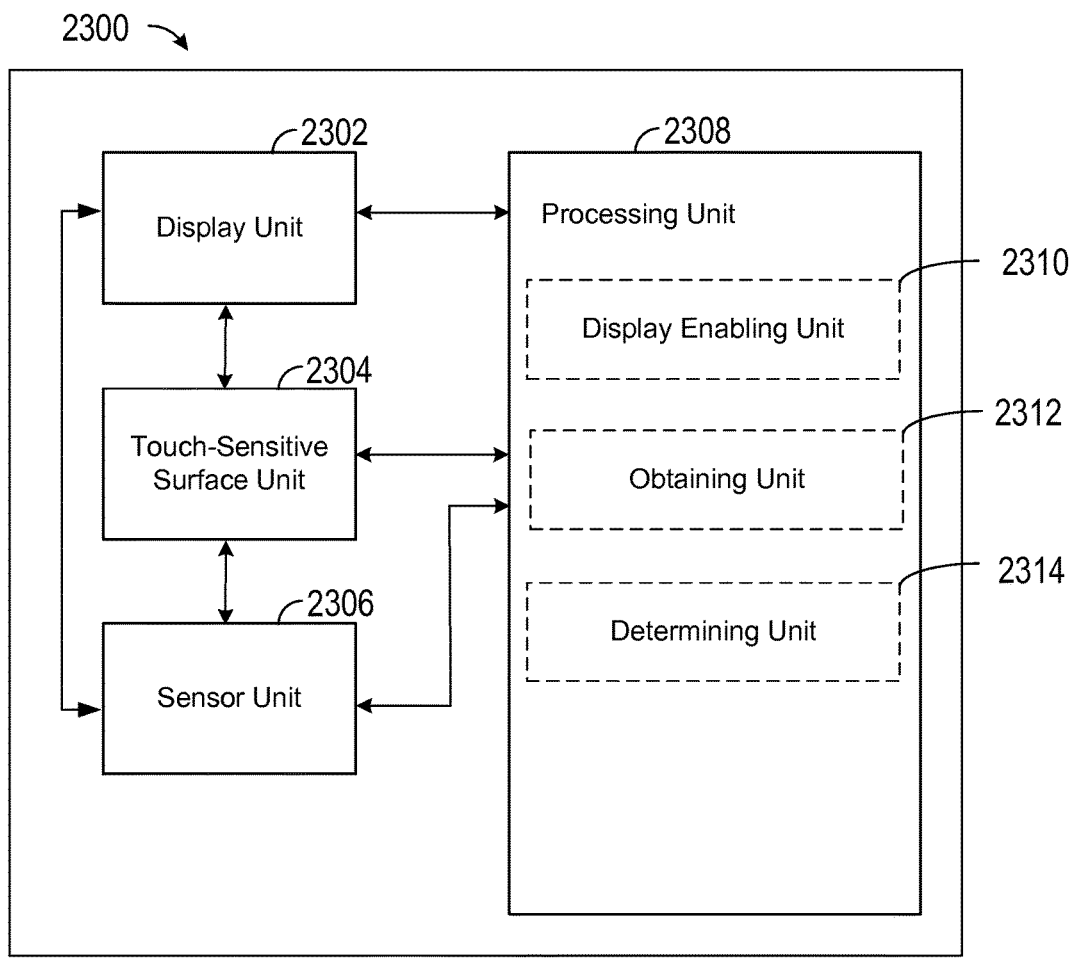
FIG. 23 illustrates exemplary components of an electronic device.

The units of FIG. 23 may be used to implement the various techniques and methods described above with respect to FIGS. 20-22.

As shown in FIG. 23, an electronic device 2300 includes a display unit 2302 configured to display user interfaces; a touch-sensitive surface unit 2304 configured to receive user touches; one or more sensor units 2306 configured to detect intensity of touches with the touch-sensitive surface unit; and a processing unit 2308 coupled to the display unit 2302, the touch-sensitive surface unit 2304, and the sensor units 2306. In some embodiments, the processing unit includes a display enabling unit 2310, an obtaining unit 2312, and a determining unit 2314. The functional blocks of the device 2300 are, optionally, implemented by hardware, software, or a combination of hardware and software to carry out the principles of the various described examples. It is understood by persons of skill in the art that the functional blocks described in FIG. 23 are, optionally, combined or separated into sub-blocks to implement the principles of the various described examples. Therefore, the description herein optionally supports any possible combination or separation or further definition of the functional blocks described herein.

In some embodiments, the display enabling unit 2310 is configured to cause a display of a user interface (or portions of a user interface) in conjunction with the display unit 2302. For example, the display enabling unit 2310 may be used for displaying user interfaces and overview screens, for example.

In some embodiments, the obtaining unit 2312 is configured to obtain information. For example, the obtaining unit 2312 may be used for: obtaining a first set of application information, obtaining a second set of application information, and obtaining contextual data, for example.

In some embodiments, the determining unit 2314 is configured to make determinations. For example, the determining unit 2314 may be used for determining whether a characteristic intensity is above or below a threshold intensity, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

Figure 24:
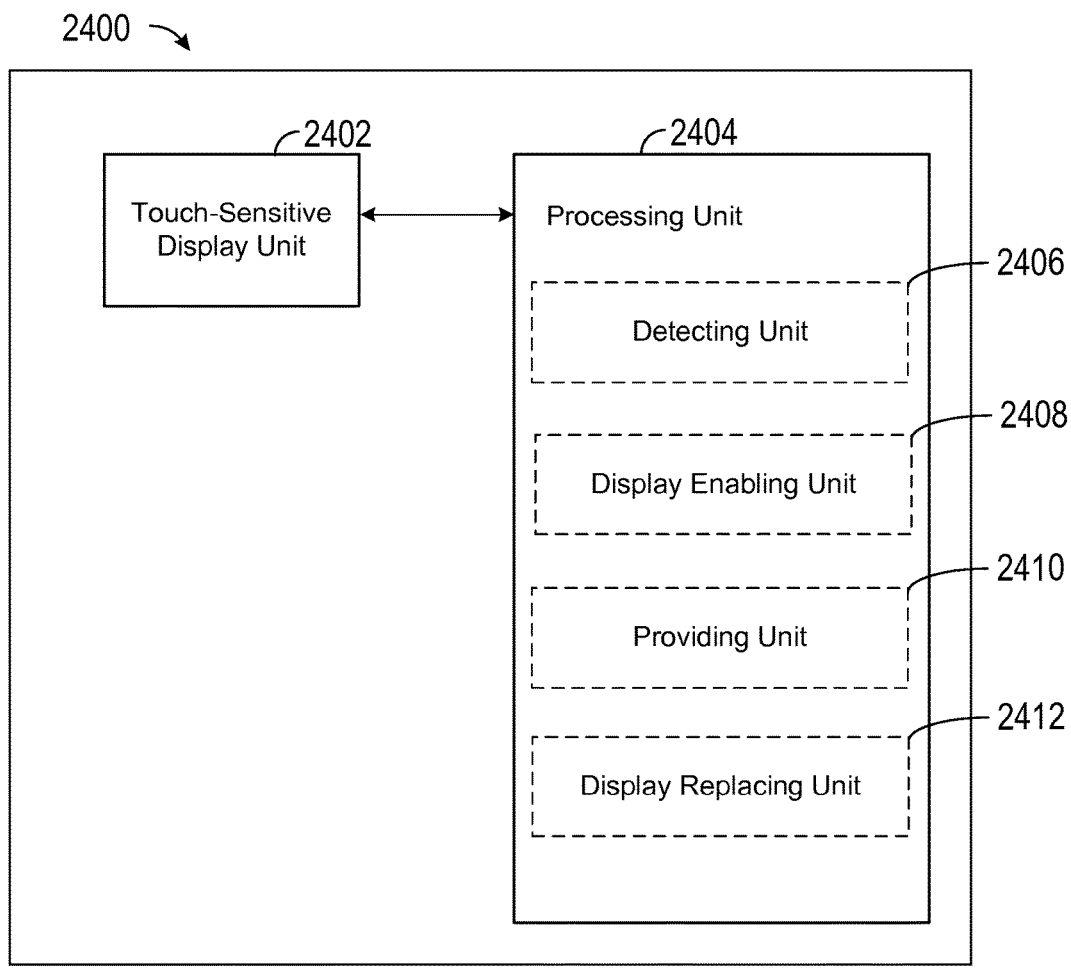
FIG. 24 illustrates exemplary components of an electronic device.

In accordance with some embodiments, FIG. 24 shows a functional block diagram of an electronic device 2400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 24 are, optionally, combined or separated into sub-blocks to implement the principles of the various described embodiments. Therefore, the description herein optionally supports any possible combination or separation or further definition of the functional blocks described herein.

As shown in FIG. 24, an electronic device 2400 includes a touch-sensitive display unit 2402 configured to display a graphic user interface and configured to receive contacts; and a processing unit 2404 coupled to the touch-sensitive display unit. In some embodiments, the processing unit 2404 includes a detecting unit 2406, a display enabling unit 2408, a providing unit 2410, and a display replacing unit 2412.

The processing unit 2404 is configured to: detect (e.g., with detecting unit 2406) a contact with the touch-sensitive display unit, and in response to detecting the contact, enable display (e.g., with display enabling unit 2408) of a user interface screen representing a corresponding application, the user interface screen comprising: an affordance for launching the application; and a set of information obtained from the application, wherein the set of information is updated in accordance with data from the application.

In some embodiments, the affordance for launching the application is the displayed user interface screen.

In some embodiments, the corresponding application is executing on the electronic device and is not displayed on the touch-sensitive display unit.

In some embodiments, the application is executing on an external device, and the set of information is received from the external device.

In some embodiments, the processing unit 2404 is further configured to: detect (e.g., with detecting unit 2406) a selection of the affordance for launching the application; and in response to detecting the selection of the affordance, replace display (e.g., with display replacing unit 2412) of the user interface screen with display of the application.

In some embodiments, the contact is a swipe on the touch-sensitive display unit.

In some embodiments, the set of information is a first set of information, and the processing unit 2404 is further configured to: detect (e.g., with detecting unit 2406) a second contact on the touch-sensitive display unit at a location corresponding to the user interface screen; and in response to detecting the second contact, enable display (e.g., with display enabling unit 2408) of a second set of information obtained from the application, wherein the second set of information is different from the first set of information, and wherein the second set of information is updated in accordance with data from the application.

In some embodiments, the second contact is a substantially vertical swipe on the touch-sensitive display unit.

In some embodiments, the displayed user interface screen is selected from a set of user interface screens that represent a set of corresponding applications.

In some embodiments, the displayed user interface screen is selected based on the most recently viewed user interface screen in the set of user interface screens.

In some embodiments, the displayed user interface screen is selected based on configuration data on the electronic device.

In some embodiments, the user interface screen further comprises a user interface object representing an operation that can be executed by the corresponding application, and the processing unit 2404 is further configured to: detect (e.g., with detecting unit 2406) a third contact on the touch-sensitive display unit at a location corresponding to the user interface object; and in response to detecting the third contact, provide (e.g., with providing unit 2410) data to the application to cause it to perform the operation.

In some embodiments, the processing unit 2404 is further configured to: detect (e.g., with detecting unit 2406) a fourth contact on the touch-sensitive display unit; in response to detecting the fourth contact, enable display (e.g., with display enabling unit 2408) of a second user interface screen selected from the set of user interface screens, wherein the second user interface screen represents a corresponding second application, the second user interface screen comprising: an affordance for launching the second application; and a set of information obtained from the second application, wherein the set of information is updated in accordance with data from the second application.

In some embodiments, the fourth contact is a substantially horizontal swipe.

In some embodiments, displaying the second user interface screen replaces display of the first user interface screen.

In some embodiments, the set of user interface screens is an ordered set, and the second user interface screen is adjacent in order to the user interface screen.

The operations described above with reference to FIG. 20 are, optionally, implemented by components depicted in FIGS. 1A-1B or FIG. 24. For example, detect operation at block 2002, display operation at block 2004, and optional detect and display operations at block 2004 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether contact on the touch-sensitive surface corresponds to a predefined event or sub event, such as a request to display a user-interface screen representing a corresponding application (e.g., an application other than application 136-1). When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed on the touch-sensitive display. Similarly, it would be clear to a person having ordinary skill in the art how other processes can be implemented based on the components depicted in FIGS. 1A-1B.

Figure 25:
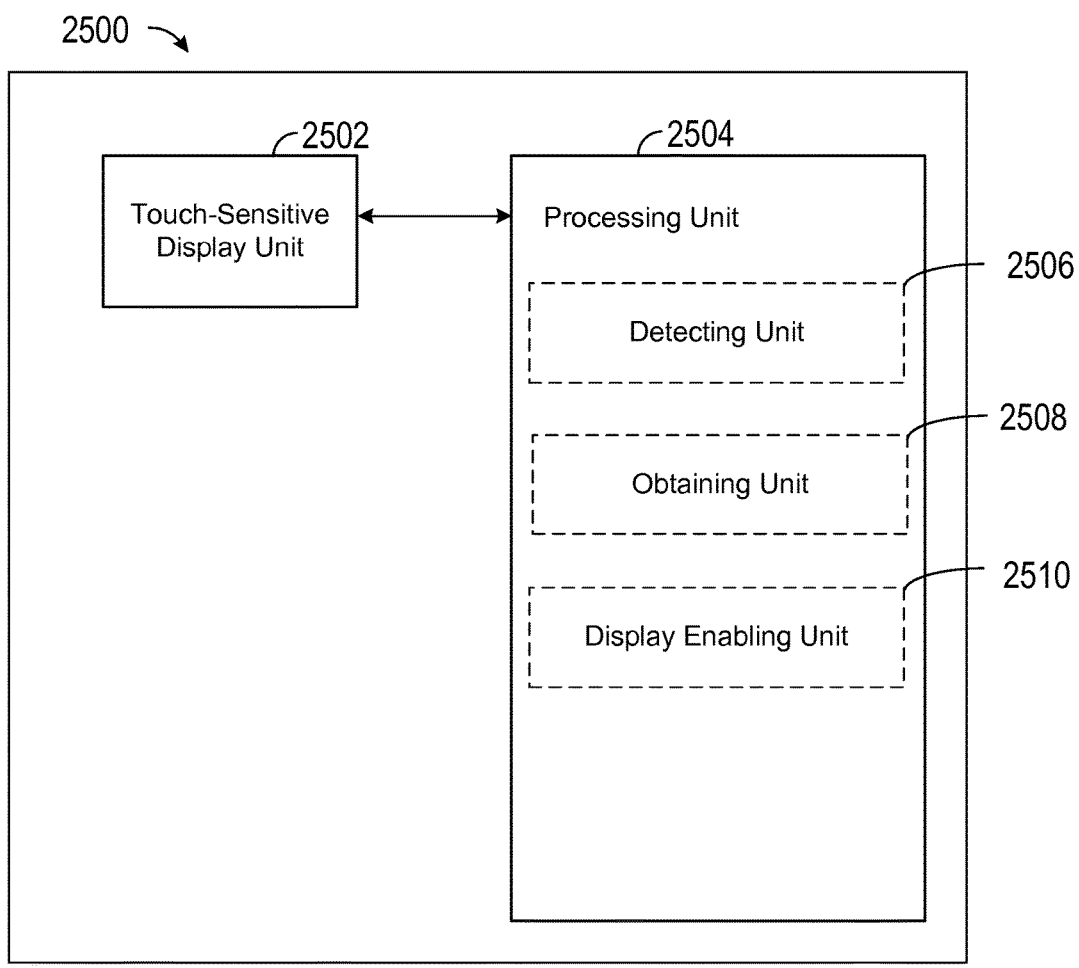
FIG. 25 illustrates exemplary components of an electronic device.

In accordance with some embodiments, FIG. 25 shows a functional block diagram of an electronic device 2500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 25 are, optionally, combined or separated into sub-blocks to implement the principles of the various described embodiments. Therefore, the description herein optionally supports any possible combination or separation or further definition of the functional blocks described herein.

As shown in FIG. 25, an electronic device 2500 includes a touch-sensitive display unit 2502 configured to display a graphic user interface and configured to receive contacts; and a processing unit 2504 coupled to the touch-sensitive display unit. In some embodiments, the processing unit 2504 includes a detecting unit 2506, an obtaining unit 2508, and a display enabling unit 2510.

The processing unit 2504 is configured to: detect (e.g., with detecting unit 2506) a contact on the touch-sensitive display unit; in response to detecting the contact, obtain (e.g., with obtaining unit 2508) contextual data representing a context of the device. The processing unit 2504 is further configured to enable display (e.g., using display enabling unit 2510) of a user interface screen representing a corresponding application, wherein the application is selected based on the contextual data, the user interface screen comprising: an affordance for launching the application, and a set of information obtained from the application, wherein the set of information is updated in accordance with data from the application.

In some embodiments, the contextual data comprises a current location of the device.

In some embodiments, the contextual data comprises a current time.

In some embodiments, the set of information obtained from the application depends on a status of the application.

The operations described above with reference to FIG. 21 are, optionally, implemented by components depicted in FIGS. 1A-1B or FIG. 25. For example, detect operation at block 2102, obtain operation at block 2104, and display operation at block 2106 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a contact on the touch-sensitive surface corresponds to a predefined event or sub event, such as a request to obtain contextual data and display a user interface screen based on the contextual data. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed on the touch-sensitive display. Similarly, it would be clear to a person having ordinary skill in the art how other processes can be implemented based on the components depicted in FIGS. 1A-1B.

Figure 26:
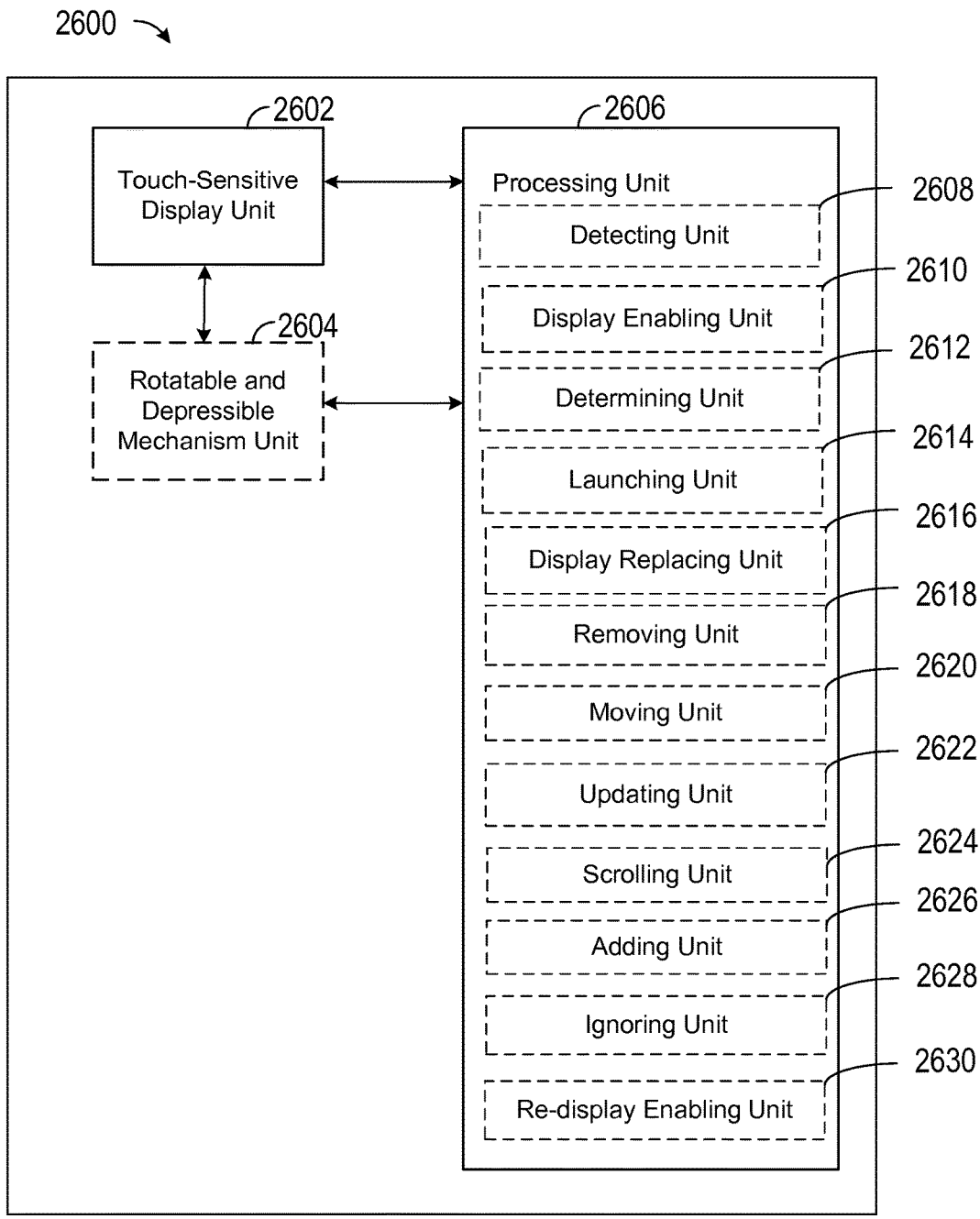
FIG. 26 illustrates exemplary components of an electronic device.

In accordance with some embodiments, FIG. 26 shows a functional block diagram of an electronic device 2600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 26 are, optionally, combined or separated into sub-blocks to implement the principles of the various described embodiments. Therefore, the description herein optionally supports any possible combination or separation or further definition of the functional blocks described herein.

As shown in FIG. 26, an electronic device 2600 includes a touch-sensitive display unit 2602 configured to display a graphic user interface and configured to receive contacts; optionally, a rotatable and depressible mechanism unit 2604 configured to receive rotations and depressions; and a processing unit 2606 coupled to the touch-sensitive display unit, and coupled to the optional rotatable and depressible mechanism unit 2604. In some embodiments, the processing unit 2606 includes a detecting unit 2608, a display enabling unit 2610, a determining unit 2612, a launching unit 2614, a display replacing unit 2616, a removing unit 2618, a moving unit 2620, an updating unit 2622, a scrolling unit 2624, an adding unit 2626, an ignoring unit 2628, and a re-display enabling unit 2630.

The processing unit 2606 is configured to: detect (e.g., with detecting unit 2608) a first contact on the touch-sensitive display unit; in response to detecting the first contact, enable display (e.g., with display enabling unit 2610) of a first user interface screen of an ordered set of user interface screens, wherein the set of user interface screens represents a set of applications, the first user interface screen comprising: a first affordance for launching a first application of the set of applications, and a first set of information obtained from the first application, wherein the first set information is updated in accordance with data from the first application. The processing unit 2606 is further configured to detect (e.g., with detecting unit 2608) a second contact on the touch-sensitive display unit; in response to detecting the second contact, determine (e.g., with determining unit 2612) whether a characteristic intensity of the second contact is above a threshold intensity; in accordance with a determination that the characteristic intensity of the second contact is above the threshold intensity, enable display (e.g., with display enabling unit 2610) of a user interface for reordering the set of user interface screens; and in accordance with a determination that the characteristic intensity of the second contact is below the threshold intensity, and in response to detecting the second contact at a location on the touch-sensitive display corresponding to the first affordance, launch (e.g., with launching unit 2614) the first application.

In some embodiments, enabling display of a user interface for reordering the set of user interface screens comprises: replace display (e.g., with display replacing unit 2616) of the first user interface screen with display of a plurality of user interface screens from the ordered set of user interface screens, wherein the displayed plurality of user interface screens comprises the first user interface screen, and wherein the user interface screens are displayed at a reduced size and arranged horizontally adjacent to each other in the order of the ordered set.

In some embodiments, the displayed plurality of user interface screens comprises a central user interface screen, and wherein the central user interface screen is displayed at a larger size than the other user interface screens in the plurality of user interface screens.

In some embodiments, the processing unit 2606 is further configured to: while displaying the user interface for updating the set of user interface screens, detect (e.g., with detecting unit 2608) a third contact on the touch-sensitive display unit at a location corresponding to a displayed third user interface screen of the plurality of user interface screens; and in response to detecting the third contact: remove (e.g., with removing unit 2618) the third user interface screen from the plurality of displayed user interface screens; and remove (e.g., with removing unit 2618) the third user interface screen from the ordered set of user interface screens.

In some embodiments, the processing unit 2606 is further configured to: while displaying the user interface for updating the set of user interface screens, detect (e.g., with detecting unit 2608) a touch-and-drag contact on a displayed fourth user interface screen of the plurality of user interface screens; in response to detecting the touch-and-drag contact, move (e.g., with moving unit 2620) the fourth user interface screen to a new position in the displayed plurality of user interface screens in accordance with the touch-and-drag contact; and update (e.g., with updating unit 2622) the order of the ordered set of user interface screens in accordance with the new position of the fourth user interface screen.

In some embodiments, the processing unit 2606 is further configured to: while displaying the user interface for updating the set of user interface screens, detect (e.g., with detecting unit 2608) a fourth contact on the touch-sensitive display unit; in response to detecting the fourth contact, scroll (e.g., with scrolling unit 2624) the plurality of user interface screens in accordance with the fourth contact to display one or more additional user interface screens in the ordered set of user interface screens, wherein the central user interface screen is changed in accordance with the scroll.

In some embodiments, the displayed plurality of user interface screens comprises the last user interface screen in the ordered set of user interface screens, and the processing unit 2606 is further configured to: while displaying the user interface for updating the set of user interface screens, enable display (e.g., with display enabling unit 2610) of an add affordance after the last user interface screen; detect (e.g., with detecting unit 2608) a fifth contact on the touch-sensitive display unit at a location corresponding to the add affordance; in response to detecting the fifth contact: enable display (e.g., with display enabling unit 2610) of an option for selecting a new user interface screen to add to the ordered set of user interface screens, wherein the new user interface screen represents a new application. The processing unit 2606 is further configured to detect (e.g., with detecting unit 2608) a selection of the new user interface screen; and in response to detecting the selection: add (e.g., with adding unit 2626) the new user interface screen to the ordered set of user interface screens in the last position, and enable display (e.g., with display enabling unit 2610) of the new user interface screen in the last position of the displayed plurality of user interface screens.

In some embodiments, the processing unit 2606 is further configured to: further in response to detecting the selection, enable re-display (e.g., with re-display enabling unit 2630) of the add affordance adjacent to the new user interface screen.

In some embodiments, the processing unit 2606 is further configured to: while displaying the plurality of user interface screens, detect (e.g., with detecting unit 2608) a sixth contact on the touch-sensitive display unit; in response to detecting the sixth contact, determine (e.g., with determining unit 2612) whether a characteristic intensity of the sixth contact is above a threshold intensity; in accordance with a determination that the characteristic intensity of the sixth contact is above the threshold intensity, replace display (e.g., with display replacing unit 2616) of the plurality of user interface screens with display of a fifth user interface screen of the plurality of user interface screens; and in accordance with a determination that the characteristic intensity of the sixth contact is below the threshold intensity, ignore (e.g., with ignoring unit 2628) the sixth contact.

In some embodiments, the electronic device further comprises a rotatable and depressible mechanism unit 2604 configured to receive rotations and depressions, and the processing unit 2606 is coupled to the rotatable and depressible mechanism unit 2604, and the processing unit 2606 is further configured to: while displaying the plurality of user interface screens, detect (e.g., with detecting unit 2608) a depression of the rotatable and depressible mechanism unit 2604; and in response to detecting the depression, replace display (e.g., with display replacing unit 2616) of the plurality of user interface screens with display of a home screen, wherein the home screen is different from the user interface screens in the plurality of user interface screens.

In some embodiments, the fifth user interface screen is the central user interface screen.

The operations described above with reference to FIG. 22 are, optionally, implemented by components depicted in FIGS. 1A-1B or FIG. 26. For example, detect operation at block 2202, display operation at block 2204, detect operation at block 2206, determine operation at block 2208, display operation at block 2210, and launch operation at block 2212 may be implemented by event sorter 170, event recognizer 180, and event handler 190. E.g., event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a contact on the touch-sensitive surface corresponds to a predefined event or sub event, such as a request to display a user interface screen representing a corresponding application (e.g., an application other than application 136-1). When a respective predefined event or sub-event is detected, event recognizer 180 activates an event handler 190 associated with the detection of the event or sub-event. Event handler 190 may utilize or call data updater 176 or object updater 177 to update application 136-1 internal state 192. In some embodiments, event handler 190 accesses a respective GUI updater 178 to update what is displayed on the touch-sensitive display. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs, the one or more programs comprising instructions, which when executed by one or more processors of an electronic device with a touch-sensitive display, cause the device to:
    detect, at a first time, a first input corresponding to a request to display a first user interface screen;
    in response to detecting the first input, display a first instance of a first user interface screen representing a corresponding first application, wherein the first user interface screen is an affordance for launching the first application, the first instance of the first user interface screen including a set of information obtained from the first application;
    while displaying the first instance of the first user interface screen, detect a first respective gesture on the touch-sensitive display;
    in response to detecting the first respective gesture, display a first instance of a second user interface screen representing a corresponding second application that is different from the first application, wherein the second user interface screen is an affordance for launching the second application, the first instance of the second user interface screen including a set of information obtained from the second application;
    detect, at a second time after the first time, a second input corresponding to a request to display the first user interface screen;
    in response to detecting the second input, display a second instance of the first user interface screen representing the corresponding first application, the second instance of the first user interface screen including a first updated set of information obtained from the first application, wherein the first updated set of information was obtained from the first application without a user request;
    while displaying the second instance of the first user interface screen, detect a second respective gesture on the touch-sensitive display;
    in response to detecting the second respective gesture, display a second instance of the second user interface screen representing a corresponding second application, the second instance of the second user interface screen including a second updated set of information obtained from the second application, wherein the second updated set of information was obtained from the second application without a user request;
    while displaying the second instance of the second user interface screen, detect a contact with the touch-sensitive display;
    in response to detecting the contact, display a dashboard including a plurality of overview screens, at least one of the plurality of overview screens corresponding to the first application;
    while displaying the dashboard, receive a third user input corresponding to selection of a first overview screen of the plurality of overview screens;
    in response to the third user input:
        cease to display the first overview screen of the plurality of overview screens; and
        display an add affordance that was not displayed prior to the third user input;
    detect selection of the add affordance;
    in response to detecting selection of the add affordance, display a plurality of candidate overview screens;
    detect a selection of a candidate overview screen of the plurality of candidate overview screens; and
    display the selected candidate overview screen on the dashboard.

2. The non-transitory computer-readable storage medium according to claim 1, wherein the corresponding first application is executing on the electronic device and is not displayed on the touch-sensitive display.

3. The non-transitory computer-readable storage medium according to claim 1, wherein the first application is executing on an external device, and wherein the set of information obtained from the first application is received from the external device.

4. The non-transitory computer-readable storage medium according to claim 1, further comprising instructions to cause the device to:
    detect a selection of the affordance for launching the first application; and
    in response to detecting the selection of the affordance for launching the first application, replace display of the user interface screen with display of the first application.

5. The non-transitory computer-readable storage medium according to claim 1, wherein at least one of the first and second inputs is a swipe on the touch-sensitive display.

6. The non-transitory computer-readable storage medium according to claim 1, wherein the set of information is a first set of information, further comprising instructions to cause the device to:
    while displaying the first instance of the second user interface screen, detect a third respective gesture on the touch-sensitive display;

in response to detecting the third respective gesture, display a first instance of a third user interface screen representing a corresponding third application that is different from the first or second applications, wherein the third user interface screen is an affordance for launching the third application, the first instance of the third user interface screen including a set of information obtained from the third application; and while displaying the second instance of the second user interface screen, detect a fourth respective gesture on the touch-sensitive display;

in response to detecting the fourth respective gesture, display a second instance of the third user interface screen representing the corresponding third application, the second instance of the third user interface screen including a third updated set of information obtained from the third application, wherein the third updated set of information was obtained from the third application without user request.

7. The non-transitory computer-readable storage medium according to claim 6, wherein at least one of the third and fourth respective gestures is a substantially vertical swipe on the touch-sensitive display.

8. The non-transitory computer-readable storage medium according to claim 1, wherein the displayed first user interface screen is selected from a set of user interface screens that represent a set of corresponding applications.

9. The non-transitory computer-readable storage medium according to claim 8, wherein the displayed first user interface screen is selected based on the most recently viewed user interface screen in the set of user interface screens.

10. The non-transitory computer-readable storage medium according to claim 8, wherein the displayed first user interface screen is selected based on configuration data on the electronic device.

11. The non-transitory computer-readable storage medium according to claim 1, wherein the first user interface screen further comprises a user interface object representing an operation that can be executed by the corresponding first application, further comprising instructions to cause the device to:
  detect a third input on the touch-sensitive display at a location corresponding to the user interface object; and
  in response to detecting the third input, provide data to the first application to cause it to perform the operation.

12. The non-transitory computer-readable storage medium according to claim 1, wherein the first respective gesture is a substantially horizontal swipe.

13. The non-transitory computer-readable storage medium according to claim 1, wherein displaying the second user interface screen replaces display of the first user interface screen.

14. The non-transitory computer-readable storage medium according to claim 8, wherein the set of user interface screens is an ordered set, and wherein the second user interface screen is adjacent in order to the first user interface screen.

15. A method, comprising:
at an electronic device with a touch-sensitive display:
  detecting, at a first time, a first input corresponding to a request to display a first user interface screen;
  in response to detecting the first input, display a first instance of a first user interface screen representing a corresponding first application, wherein the first user interface screen is an affordance for launching the first application, the first instance of the first user interface screen including a set of information obtained from the first application;
  while displaying the first instance of the first user interface screen, detect a first respective gesture on the touch-sensitive display;
  in response to detecting the first respective gesture, display a first instance of a second user interface screen representing a corresponding second application that is different from the first application, wherein the second user interface screen is an affordance for launching the second application, the first instance of the second user interface screen including a set of information obtained from the second application;
  detecting, at a second time after the first time, a second input corresponding to a request to display the first user interface screen;
  in response to detecting the second input, display a second instance of the first user interface screen representing the corresponding first application, the second instance of the first user interface screen including a first updated set of information obtained from the first application, wherein the first updated set of information was obtained from the first application without a user request;
  while displaying the second instance of the first user interface screen, detect a second respective gesture on the touch-sensitive display;
  in response to detecting the second respective gesture, display a second instance of the second user interface screen representing a corresponding second application, the second instance of the second user interface screen including a second updated set of information obtained from the second application, wherein the second updated set of information was obtained from the second application without a user request;
  while displaying the second instance of the second user interface screen, detect a contact with the touch-sensitive display;
  in response to detecting the contact, display a dashboard including a plurality of overview screens, at least one of the plurality of overview screens corresponding to the first application;
  while displaying the dashboard, receive a third user input corresponding to a first overview screen of the plurality of overview screens;
  in response to the third user input:
    cease to display the first overview screen of the plurality of overview screens; and
    display an add affordance that was not displayed prior to the third user input;
  detect selection of the add affordance;
  in response to selection of the add affordance, display a plurality of candidate overview screens;
  detect a selection of a candidate overview screen of the plurality of candidate overview screens; and
  display the selected candidate overview screen on the dashboard.

16. The method of claim 15, wherein the corresponding first application is executing on the electronic device and is not displayed on the touch-sensitive display.

17. The method of claim 15, wherein the first application is executing on an external device, and wherein the set of information obtained from the first application is received from the external device.

18. The method of claim 15, further comprising instructions to cause the device to:

detect a selection of the affordance for launching the first application; and in response to detecting the selection of the affordance for launching the first application, replace display of the user interface screen with display of the first application.

19. The method of claim 15, wherein at least one of the first and second inputs is a swipe on the touch-sensitive display.

20. The method of claim 15, wherein the set of information is a first set of information, further comprising instructions to cause the device to:

while displaying the first instance of the second user interface screen, detect a third respective gesture on the touch-sensitive display;

in response to detecting the third respective gesture, display a first instance of a third user interface screen representing a corresponding third application that is different from the first or second applications, wherein the third user interface screen is an affordance for launching the third application, the first instance of the third user interface screen including a set of information obtained from the third application; and while displaying the second instance of the second user interface screen, detect a fourth respective gesture on the touch-sensitive display;

in response to detecting the fourth respective gesture, display a second instance of the third user interface screen representing the corresponding third application, the second instance of the third user interface screen including a third updated set of information obtained from the third application, wherein the third updated set of information was obtained from the third application without user request.

21. The method of claim 20, wherein at least one of the third and fourth respective gestures is a substantially vertical swipe on the touch-sensitive display.

22. The method of claim 15, wherein the displayed first user interface screen is selected from a set of user interface screens that represent a set of corresponding applications.

23. The method of claim 22, wherein the displayed first user interface screen is selected based on the most recently viewed user interface screen in the set of user interface screens.

24. The method of claim 22, wherein the displayed first user interface screen is selected based on configuration data on the electronic device.

25. The method of claim 15, wherein the first user interface screen further comprises a user interface object representing an operation that can be executed by the corresponding first application, further comprising instructions to cause the device to:

detect a third input on the touch-sensitive display at a location corresponding to the user interface object; and in response to detecting the third input, provide data to the first application to cause it to perform the operation.

26. The method of claim 15, wherein the first respective gesture is a substantially horizontal swipe.

27. The method of claim 15, wherein displaying the second user interface screen replaces display of the first user interface screen.

28. The method of claim 22, wherein the set of user interface screens is an ordered set, and wherein the second user interface screen is adjacent in order to the first user interface screen.

29. An electronic device, comprising:
a touch-sensitive display;
one or more processors;
a memory; and
one or more programs, wherein the one or more programs are stored in the memory and configured to be executed by the one or more processors, the one or more programs including instructions for:

detecting, at a first time, a first input corresponding to a request to display a first user interface screen;

in response to detecting the first input, display a first instance of a first user interface screen representing a corresponding first application, wherein the first user interface screen is an affordance for launching the first application, the first instance of the first user interface screen including a set of information obtained from the first application;

while displaying the first instance of the first user interface screen, detect a first respective gesture on the touch-sensitive display;

in response to detecting the first respective gesture, display a first instance of a second user interface screen representing a corresponding second application that is different from the first application, wherein the second user interface screen is an affordance for launching the second application, the first instance of the second user interface screen including a set of information obtained from the second application;

detecting, at a second time after the first time, a second input corresponding to a request to display the first user interface screen;

in response to detecting the second input, display a second instance of the first user interface screen representing the corresponding first application, the second instance of the first user interface screen including a first updated set of information obtained from the first application, wherein the first updated set of information was obtained from the first application without a user request;

while displaying the second instance of the first user interface screen, detect a second respective gesture on the touch-sensitive display;

in response to detecting the second respective gesture, display a second instance of the second user interface screen representing a corresponding second application, the second instance of the second user interface screen including a second updated set of information obtained from the second application, wherein the second updated set of information was obtained from the second application without a user request;

while displaying the second instance of the second user interface screen, detecting a contact with the touch-sensitive display;

in response to detecting the contact, displaying a dashboard including a plurality of overview screens, at least one of the plurality of overview screens corresponding to the first application;

while displaying the dashboard, receiving a third user input corresponding to a first overview screen of the plurality of overview screens;

in response to the third user input:
ceasing to display the first overview screen of the plurality of overview screens; and
displaying an add affordance that was not displayed prior to the third user input;

detecting selection of the add affordance;

in response to selection of the add affordance, displaying a plurality of candidate overview screens;

detecting a selection of a candidate overview screen of the plurality of candidate overview screens; and displaying the selected candidate overview screen on the dashboard.

30. The electronic device of claim 29, wherein the corresponding first application is executing on the electronic device and is not displayed on the touch-sensitive display.

31. The electronic device of claim 29, wherein the first application is executing on an external device, and wherein the set of information obtained from the first application is received from the external device.

32. The electronic device of claim 29, further comprising instructions to cause the device to:

detect a selection of the affordance for launching the first application; and in response to detecting the selection of the affordance for launching the first application, replace display of the user interface screen with display of the first application.

33. The electronic device of claim 29, wherein at least one of the first and second inputs is a swipe on the touch-sensitive display.

34. The electronic device of claim 29, wherein the set of information is a first set of information, further comprising instructions to cause the device to:

while displaying the first instance of the second user interface screen, detect a third respective gesture on the touch-sensitive display;

in response to detecting the third respective gesture, display a first instance of a third user interface screen representing a corresponding third application that is different from the first or second applications, wherein the third user interface screen is an affordance for launching the third application, the first instance of the third user interface screen including a set of information obtained from the third application; and while displaying the second instance of the second user interface screen, detect a fourth respective gesture on the touch-sensitive display;

in response to detecting the fourth respective gesture, display a second instance of the third user interface screen representing the corresponding third application, the second instance of the third user interface screen including a third updated set of information obtained from the third application, wherein the third updated set of information was obtained from the third application without user request.

35. The electronic device of claim 34, wherein at least one of the third and fourth respective gestures is a substantially vertical swipe on the touch-sensitive display.

36. The electronic device of claim 29, wherein the displayed first user interface screen is selected from a set of user interface screens that represent a set of corresponding applications.

37. The electronic device of claim 36, wherein the displayed first user interface screen is selected based on the most recently viewed user interface screen in the set of user interface screens.

38. The electronic device of claim 36, wherein the displayed first user interface screen is selected based on configuration data on the electronic device.

39. The electronic device of claim 29, wherein the first user interface screen further comprises a user interface object representing an operation that can be executed by the corresponding first application, further comprising instructions to cause the device to:

detect a third input on the touch-sensitive display at a location corresponding to the user interface object; and in response to detecting the third input, provide data to the first application to cause it to perform the operation.

40. The electronic device of claim 29, wherein the first respective gesture is a substantially horizontal swipe.

41. The electronic device of claim 29, wherein displaying the second user interface screen replaces display of the first user interface screen.

42. The electronic device of claim 36, wherein the set of user interface screens is an ordered set, and wherein the second user interface screen is adjacent in order to the first user interface screen.

\* \* \* \* \*